US012003111B1

(12) United States Patent
Khalid et al.

(10) Patent No.: US 12,003,111 B1
(45) Date of Patent: Jun. 4, 2024

(54) SYSTEM AND METHOD FOR CONTROLLING A HYBRID MICROGRID SYSTEM

(71) Applicant: KING FAHD UNIVERSITY OF PETROLEUM AND MINERALS, Dhahran (SA)

(72) Inventors: Muhammad Khalid, Dhahran (SA); Muhammad Maaruf, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 85 days.

(21) Appl. No.: 17/975,120

(22) Filed: Oct. 27, 2022

(51) Int. Cl.
  $H02J\ 3/38$ (2006.01)
  $H02J\ 3/32$ (2006.01)
  $H02M\ 3/158$ (2006.01)

(52) U.S. Cl.
  CPC ............... $H02J\ 3/381$ (2013.01); $H02J\ 3/32$ (2013.01); $H02M\ 3/1582$ (2013.01); $H02J\ 2300/24$ (2020.01); $H02J\ 2300/28$ (2020.01)

(58) Field of Classification Search
  CPC ............... H02J 3/38; H02J 3/381; H02J 3/32
  See application file for complete search history.

(56) References Cited

FOREIGN PATENT DOCUMENTS

| AU | 2021101279 A4 | 5/2021 |
|---|---|---|
| CN | 114172398 A | 3/2022 |
| IN | 202041048086 A | 11/2020 |

OTHER PUBLICATIONS

Ahmad Aziz Al Alahmadi, et al., "Hybrid Wind/PV/Battery Energy Management-Based Intelligent Non-Integer Control for Smart DC-Microgrid of Smart University", IEEE Access, vol. 9, Jul. 9, 2021, pp. 98948-98961.

(Continued)

*Primary Examiner* — Adi Amrany
(74) *Attorney, Agent, or Firm* — Oblon, McClelland, Maier & Neustadt, L.L.P.

(57) ABSTRACT

A system and a method for controlling a hybrid microgrid system (HMS) is disclosed. The HMS includes a WTG, an RSC, a GSC, a DC-link connecting the RSC and the GSC, a PV system that outputs a DC current to the DC-link, a rechargeable battery, a bidirectional BBC connected between the DC-link and the rechargeable battery, and a controller. The method for controlling the HMS includes: preparing a definition set including a characteristic element $c_i$ and equations defining desired value $c_i^*$, a fractional order sliding mode surface $\zeta_i$, and a control law element $u_i^{cnt}$; monitoring $c_i(t)$ and the HMS status; calculating the equations based on monitored information; and controlling the HMS based on the $u_i^{cnt}(t)$ calculated and in accordance with a global sliding mode control with fractional order terms. The $\zeta_i$ comprises a fractional time integral and fractional time derivative of $e_i(t)$, where $e_i(t)=c_i(t)-c_i^*(t)$. The $u_i^{cnt}(t)$ satisfies $$\zeta_i(t)\frac{d\zeta_i(t)}{dt} < 0,$$

when $\zeta_i(t) \neq 0$.

20 Claims, 15 Drawing Sheets

(56) References Cited

OTHER PUBLICATIONS

Bo Yang, et al., "Passivity-based fractional-order sliding-mode control design and implementation of grid-connected photovoltaic systems", Journal of Renewable and Sustainable Energy, vol. 10, Issue 4, Jul. 2, 2018, pp. 1-21.

Abdel-Raheem Youssef, et al., Advanced multi-sector P&O maximum power point tracking technique for wind energy conversion system, International Journal of Electrical Power and Energy Systems, vol. 107, 2019, pp. 89-97.

Sofia Boulmrharj, et al., Online battery state-of-charge estimation methods in micro-grid systems, Journal of Energy Storage, vol. 30, 2020, pp. 1-18.

Jing Wang, et al., "Fractional order sliding mode control via disturbance observer for a class of fractional order systems with mismatched disturbance", Mechatronics, vol. 53, 2018, pp. 8-19.

Yuanlong Xie, et al., "Coupled fractional-order sliding mode control and obstacle avoidance of a four-wheeled steerable mobile robot", ISA Transactions, vol. 108, 2021, pp. 282-294.

Boubacar Housseini, et al., "Robust Nonlinear Controller Design for On-Grid/Off-Grid Wind Energy Battery-Storage System", IEEE Transactions on Smart Grid, vol. 9, No. 6, Nov. 2018, pp. 5588-5598.

Nasrin Chatrenour, et al., "Improved double integral sliding mode MPPT controller based parameter estimation for a stand-alone photovoltaic system", Energy Conversion and Management, vol. 139, 2017, pp. 97-109.

Mohammad Kamruzzaman Khan Prince, et al., "Modeling, Parameter Measurement, and Control of PMSG-based Grid-connected Wind Energy Conversion System", Journal of Modern Power Systems and Clean Energy, vol. 9, No. 5, Sep. 2021, pp. 1054-1065.

SYSTEM AND METHOD FOR CONTROLLING A HYBRID MICROGRID SYSTEM

STATEMENT REGARDING PRIOR DISCLOSURE BY THE INVENTORS

Aspects of this technology are described in an article titled "Global sliding-mode control with fractional-order terms for the robust optimal operation of a hybrid renewable microgrid with battery energy storage" in J. Electronics on Dec. 28, 2021, incorporated herein by reference in its entirety.

STATEMENT OF ACKNOWLEDGEMENT

The inventors acknowledge the support provided by the Center of Renewable Energy and Power Systems at King Fahd University of Petroleum & Minerals under Project No. INRE2106 and King Abdullah City for Atomic and Renewable Energy (K.A.CARE).

BACKGROUND

Technical Field

The present disclosure is directed to a non-linear control of a hybrid microgrid system, and more particularly relates to a system and method for controlling a hybrid microgrid system in accordance with global sliding mode control with fractional order terms.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Over past few decades consumption of energy in urban as well as in rural areas has increased due to industrialization, rapid economic development, and social progress. The energy has been generated mostly from fossil fuels. Generating the energy from fossil fuels has certain harmful effects, such as climate change, green house effect, and environmental pollution. On the other hand, over consumption of the fossil fuels depletes natural resources at a fast rate. Reflecting such circumstances, need for introducing and expanding use of renewable energy sources such as wind, solar, hydro, and geothermal as alternative energy sources has been well recognized, since they are freely and abundantly available, efficient, reliable, and have no adverse environmetal effects.

Advances in power electronics technology has led to increase in energy conversion efficiencies and continuing fall in costs of photovoltaic (PV) systems and wind turbines (WT). Global capacities of installed solar and wind power were 586 GW and 623 GW, respectively at the beginning of 2020. See for example, Jamal, S. et al., A review of Energy Management and Power Management Systems for Microgrid and Nanogrid Applications, *Sustainability* 2021, 13, 10331.

The PV systems and WT systems have complementary properties. During the day output from the PV system is high, whereas power generation by WT is low. On the other hand, during the night, solar irradiance is unavailable; the PV system does not generate power, while output power of the WT has tendency to be high. Thus, the PV system and the wind turbines are often tied to a common DC bus or to a common AC bus via boost converters to form a hybrid micro grid system (HMS). See for examples, Alayi, R et al., Optimal Load Frequency Control of Island Microgrids via a PID Controller in the Presence of Wind Turbine and PV. *Sustainability* 2021, 13, 10728, and Al-Quraan, A. et al., Modeling, Design and Control of a Standalone Hybrid PV-Wind Micro-Grid System, *Energies* 2021, 14, 4849.

The HMS is generally a collection of interlinked renewable and conventional energy resources connected to users and controlled by systems to ensure efficient energy usage and storage. The HMS is also capable to operate in both a grid connected mode and an islanded mode. See for example, Akram, U. et al., An Innovative Hybrid Wind-Solar and Battery-Supercapacitor Microgrid System-Development and Optimization. *IEEE Access* 2017, 5, 25897-25912, and also https://en.wikipedia.org/wiki/Microgrid.

The HMS is configured to permit insufficiency and uncertainty of the renewale energy sources. However, sometimes the renewable energy produced by the HMS is larger than an energy demand by the users. In such situations, a battery energy storage system (BESS) is utilized to store an excess power. When the energy demand is large and grid connected systems are unable to fulfill the energy demands, the BESS fulfills the energy demand by discharging its stored energy.

A sliding mode control is known as a robust control method applicable to a system with dynamic behaviour. See for examples, V. Utkin, Sliding Mode Control Design Principles and Applications to Electric Drives, IEEE Trans. Industrial Electronics, Vol. 40, No. 1, February 1993, and https://en.wikipedia.org/wiki/Sliding_mode_control, entire contents of both is incorporated by reference herein.

Recently, a global sliding mode control with fractional order operators have been reported in applications to robot control and vehicle control. See, Wang, J. et al., Fractional order sliding mode control via disturbanc observer for a class of fractional order systems with mismatched disturbance, *Mechatronics* 2018, 53, 8-19, and Xie, Y. et al., Coupled fractional-order sliding mode control and obstacle avoidance of a four-wheeled steerable mobile robot, *ISA Trans.* 2021, 108, 282-294, entire content of both is incorporated by reference herein.

SUMMARY

In an exemplary embodiment, a method for controlling a hybrid microgrid system (HMS) is disclosed. The HMS includes a renewable energy source, a grid side converter (GSC) configured to output a power to a point of common coupling (PCC), a DC-link configured to receive a power from the renewable energy source and to supply a power to the GSC, a rechargeable battery configured to exchange a power via the DC-link, a load configured to receive a power via the PCC, a utility grid configured to exchange power via the PCC; and a controller configured to control the HMS by executing a program and in accordance with the method defined as a global sliding mode control with fractional order terms (GSMCFO) method. The program comprises a definition set customized for the HMS and to be referred in applying the GSMCFO method to the HMS.

The method for controlling the HMS includes preparing the definition set including a characteristic element $c_i$ to be measured, and equations defining a desired value $c_i^*$ of the characteristic element $c_i$, a fractional order sliding mode (FOSM) surface $\zeta_i$ for the characteristic element $c_i$, and a control law element $u_i^{cnt}$ of the characteristic element $c_i$. The method further includes monitoring the characteristic element $c_i(t)$ and a related status of the HMS. The method further includes calculating at least one of the equations based on the characteristic element $c_i(t)$ and the related status of the HMS monitored. The method further includes controlling the HMS based on the control law element $u_i^{cnt}(t)$ calculated and in accordance with the GSMCFO method.

The equation defining the FOSM surface $\zeta_i(t)$ of the characteristic element $c_i(t)$ comprises a fractional time integral of a tracking error $e_i(t)$ and a fractional time derivative of the tracking error $e_i(t)$. The tracking error $e_i(t)$ for the characteristic element $c_i(t)$ is defined as, $$e_i(t) = c_i(t) - c_i^*(t)$$

Also, the equation defining the control law element $u_i^{cnt}(t)$ is configured to satisfy a condition, $$\zeta_i(t) \frac{d\zeta_i(t)}{dt} < 0,$$

so far as $\zeta_i(t)$ is not zero.

In another exemplary embodiment, a hybrid microgrid system (HMS) is disclosed. The HMS includes a renewable energy source, a grid side converter (GSC) configured to output a power to a point of common coupling (PCC), a DC-link configured to receive a power from the renewable energy source and to supply a power to the GSC, a rechargeable battery configured to exchange a power via the DC-link; a load configured to receive a power via the PCC; a utility grid configured to exchange a power via the PCC, and a controller including a processor, a memory, a bus-line, and I/O port.

The controller is configured to control the HMS by executing a program installed in the memory and in accordance with a global sliding mode control with fractional order terms (GSMCFO) method. The program includes a definition set customized for the HMS system and to be referred in applying the GSMCFO method to the HMS. The definition set includes a characteristic element $c_i$ to be measured, and the equations defining a desired value $c_i^*$ of the characteristic element $c_i$, a fractional order sliding mode (FOSM) surface $\zeta_i$ of the characteristic element $c_i$, and a control law element $u_i^{cnt}$ of the characteristic element $c_i$.

The controller is further configured to monitor the characteristic element $c_i(t)$ and a related status of the HMS, calculate at least one of the equations based on the characteristic element $c_i(t)$ and the related status of the HMS monitored, and control the HMS based on the control law element $u_i^{cnt}(t)$ calculated and in accordance with the GSMCFO method.

The equation defining the FOSM surface $\zeta_i(t)$ for the characteristic element $c_i(t)$ comprises a fractional time integral of a tracking error $e_i(t)$ and a fractional time derivative of the tracking error $e_i(t)$, with $e_i(t) = c_i(t) - c_i^*(t)$. Also, the equation defining the control law element $u_i^{cnt}(t)$ is configured to satisfy a condition:

$$\zeta_i(t) \frac{d\zeta_i(t)}{dt} < 0,$$

so far as $\zeta_i(t)$ is not zero.

In another exemplary embodiment, a controller of a hybrid microgrid system (HMS) is disclosed. The HMS includes a renewable energy source, a grid side converter (GSC) configured to output a power to a point of common coupling (PCC), a DC-link configured to receive a power from the renewable energy source and to supply a power to the GSC, a rechargeable battery configured to exchange a power via the DC-link, a load configured to receive a power via the PCC, a utility grid configured to exchange a power via the PCC, and the controller including a processor, a memory, a bus-line, and I/O port. 20 The controller is configured to control the HMS by executing a program and in accordance with a global sliding mode control with fractional order terms (GSMCFO) method. The program includes a definition set customized for the HMS and to be referred in applying the GSMCFO method to the HMS. The definition set includes a characteristic element $c_i$ to be measured, and equations defining a desired value $c_i^*$ of the characteristic element $c_i$, a fractional order sliding mode (FOSM) surface $\zeta_i$ of the characteristic element $c_i$ and a control law element $u_i^{cnt}$ of the characteristic element $c_i$. In one aspect, the controller is configured to monitor the characteristic element $c_i(t)$ and a related status of the HMS, calculate at least one of the equations defined in the definition set with the program and based on the characteristic element $c_i(t_1)$ and the related status monitored, and control the HMS based on the control law element $u_i^{cnt}(t1)$ calculated, and in accordance with the GSMCFO.

The equation defining the FOSM surface $\zeta_i(t)$ of the characteristic element $c_i(t)$ includes a fractional time integral of a tracking error $e_i(t)$ given by $e_i(t) = c_i(t) - c_i^*(t)$ and a fractional time derivative of the tracking error $e_i(t)$. Also, the equation defining the control law element $u_i^{cnt}(t)$ is configured to satisfy a condition:

$$\zeta_i(t) \frac{d\zeta_i(t)}{dt} < 0,$$

so far as $\zeta_i(t)$ is not zero.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
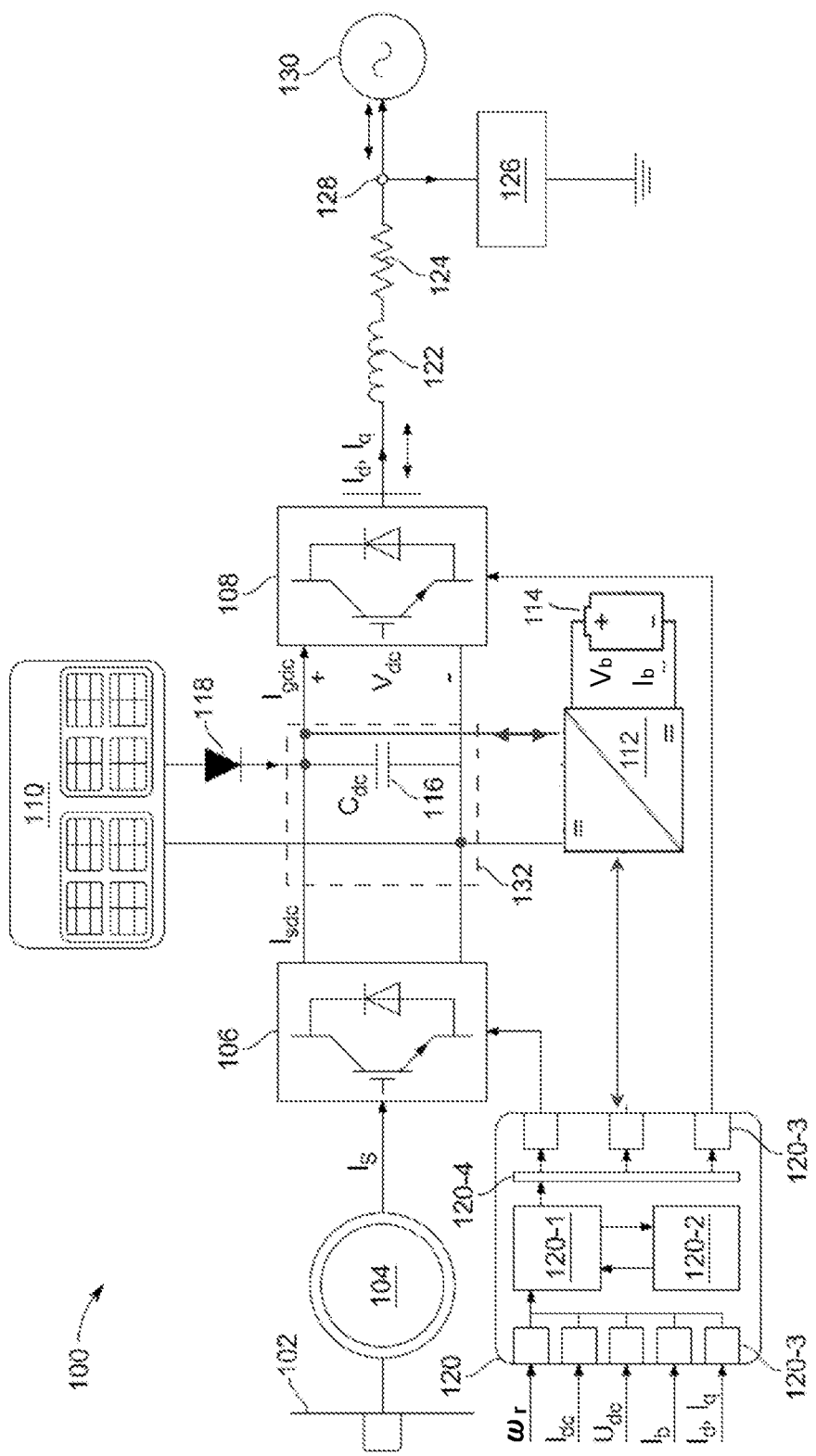
FIG. 1 is a schematic diagram of a hybrid microgrid system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As described earlier, the HMS is configured to tackles the insufficiency and uncertainty of the renewable energy sources. In order to realize an efficient and cost-effective configuration of the HMS, numbers of power electronics components and power conversion stages have to be minimized. Further, it is also important to harness the maximum power from the PV system and the wind turbine even under astable operating conditions.

Some of the researches have proposed connecting the PV array directly to the common DC bus without using a boost converter in between, so as to minimize the numbers of the power conversion stages and the power electronics components. In such approaches where the boost converter was removed, usually a linear controller, utilizing a linear control mechanism such as proportional integral (PI) control was used for controlling switching operation of other converters, and for maintaining the power balance in the HMS. However, the linear controllers so far reported suffer from one or more drawbacks hindering their adoption.

For example, the linear control mechanism in such cases provides unsatisfactory transients and steady-state performances under circumstances of parametric uncertainties or sudden change in operating point due to fluctuating nature of renewable energy sources and load variations on consumption side. Also, those HMS take a long time to settle in presence of disturbances when the controller follows a linear control mechanism.

Accordingly, it is highly desired to realize an improved control method for the HMS with both a robustness and a short transient time under the circumstances of sudden changes in operating conditions.

A method of controlling the HMS and the HMS with improved efficiency and robustness against varying parameters are disclosed as detailed below. The proposed HMS is constructed with a cost competitive configuration. A controller of the HMS is configured to control the HMS with a global sliding-mode control method with fractional-order terms (GSMCFO) that improves both the transient time and robustness of the HMS, due to greater flexibility of fractional calculus (hereinafter interchangeably referred to as GSMCFO controller).

The GSMCFO controller provides a maximum power point tracking (MPPT) of the PV systems and wind power (WT) generators. Also, the GSMCFO controller provides a) excellent transient and robust steady-state performances of the HMS under parametric uncertainties, b) regulation of DC-link voltage irrespective of the operating conditions, c) extraction of maximum power from both the PV systems and the WT systems with a rotor side converter (RSC), d) active power transfer to the grid via a grid side converter (GSC), and e) maintaining the power balance of the HMS by effective charging/discharging of battery energy storage system (BESS).

FIG. 1 is a schematic diagram of a HMS 100, according to certain embodiments. The HMS 100 includes: a wind turbine (WT) generator including a WT 102 and an electric generator 104, a permanent magnet synchronous generator (PMSG); a rotor side converter (RSC) 106; a DC-link 132; a solar photovoltaic (PV) system 110; a battery energy storage system (BESS) 114; a bidirectional buck-boost converter (BBBC) 112; a grid side converter (GSC) 108; a GSMCFO controller 120; a grid side filter 122 and 124; a point of common coupling 128; a load 126 and a grid 130.

The PMSG 104 includes a stator and a rotor, the latter is mechanically linked with the WT and is configured to be driven by the WT 102 and to convert a mechanical power generated by the WT 102 into an equivalent electrical energy. The RSC 106 is electrically connected with the PMSG 104 and configured to convert an AC current from the output of the PMSG 104 into an equivalent DC current.

The DC-link 132 is electrically connected with an output line of the RSC 106 at one end of the DC-link 132, and with an input line of the GSC 108 at the other end of the DC-link 132. The DC-link 132 is configured to provide a common wired connection, a DC-bus, from the RSC 106 to the GSC for a plurality of other resources. The DC-link 132 includes a capacitor $C_{dc}$ 133 connected in between the positive terminal and the negative terminal of the DC-link 132.

The PV system 110 is connected to the DC-link 132 directly, that is, without any converters. The PV system 110 is configured to output a DC current that directly adds up to the input current of the DC-link 132. A diode 118 is connected in series with the PV system 110. A positive terminal (P side) of the diode 118 is connected to a positive output terminal of the PV arrays, whereas a negative terminal (N side) of the diode 118 is connected to a positive terminal of the DC-link 132. The diode is configured to prevent a reverse current from the DC-link 132 back to the PV system 110, thereby avoiding reverse-flow damages to the PV system 110. The diode 118 is selected from a group containing, but not limited to a PIN diode, an avalanche diode, a P-N junction diode, a Zener diode, etc. In other implementations, a switch is inserted instead of the diode, where the switch is configured to turn on or off by detecting a voltage difference between the positive output terminal of the PV system and the DC-link.

The BESS 114 is constituted by a rechargeable battery selected from a group containing, but not limited to Lithium-Ion (Li—ON), Nickel-Cadmium (NiCd), Nickel-Metal Hydride (NiMH), Lead-Acid batteries and such batteries. The BESS 114 is configured to supply an energy to the HMS 100 when a load demand, that is, "a power demanded at the load 126 at the PCC" is more than an energy required to be produced by the renewable energy sources of the HMS 100 due to intermittent conditions of the environment.

The BBBC 112 is electrically connected between the BESS 114 and the DC-link 132. In some implementations, for example, the BBBC 112 is a DC-to-DC converter. The BESS 114 is electrically connected to the DC-link 132 through the BBBC 112. The BBBC 112 is configured to operate either in a buck mode (step down) or a boost mode (Step-up). During charging of the BESS 114, the BBBC 112 operates in a buck mode whereas during discharging, the BBBC 112 operates in a boost mode. The buck mode is operated when the renewable energy sources of the HMS 100 generate more power than the load demand. When the HMS 100 generates more power than the load demand, an excess power is stored in the BESS 114 that is used as a reserved power. When the load fluctuates or some of the renewable resources are momentarily unable to supply power due to intermittent environmental condition, the BBBC 112 operates in boost mode to balance the load demand. In boost mode, stored power in the BESS 144 discharges, which is provided to the load in order to balance the load demand and avoid a load shedding.

The GSC 108 is configured to convert a DC voltage over the DC-link 132 to an AC output voltage/current. The output line of the GSC 108 is configured to supply the AC output current to a point of a common coupling (PCC) 128 via a filter including an inductor $L_f$ 122 and a resistor $R_f$ 124 connected in series.

A load 126 connected to the PCC is configured to receive power from the PCC. The PCC is also connected with a grid 130 and is configured to receive or transfer a power from/to the grid 130. A "power grid" generally means an interconnected local or wide area public network for electricity delivery. The grid 130 here represents an access point to the power grid. Optionally, the HMS is configured isolated from the grid to form an islanded HMS. The load 126 refers to a common load due to residential consumption, industry consumption and the like. The load in residential consumption includes lighting instruments, air conditioners, etc. The load in industry consumption includes machineries etc.

The GSMCFO controller 120 or simply the controller 120 is configured to control the HMS 100 in accordance with a global sliding-mode control utilizing a fractional-order terms (GSMCFO). The controller 120 is configured to achieve the MPPT of both the PV system 110 and the WT generator system 102 and 104, regulation of the voltage of the DC-link 132, and power balance of the HMS by controlling the battery current $I_b$ with excellent transient and steady-state performances even under disturbances and uncertainties in the ambient environment.

The controller 120 includes a processor 120-1, a memory 120-2 with a preinstalled software, input ports 120-3 and output ports 120-5, and a bus line 120-4. The preinstalled software includes an instruction set and a definition set. The controller is configured to fetch the instruction set to the processor 120-1, execute them referring the definition set and based on a monitored status of the HMS.

The instruction set includes instructions for steps to be executed in controlling the HMO in accordance with the GSMCFO. The steps to be executed include monitoring a current status of the HMS, calculating equations defined in the definition set based on the current status monitored, and controlling the HMS based on calculation results.

The definition set includes a characteristic element $c_i$ to be monitored, a desired value $c_i^*$ of the characteristic element $c_i$, and equations defining a fractional order sliding mode (FOSM) surface $\zeta_i$ of the characteristic element $c_i$, an equivalent control law element $u_i^{eqv}$ of the characteristic element $c_i$, and a control law element $u_i^{cnt}$ of the characteristic element $c_i$.

The instruction set also includes an instruction for performing iteration of those steps or part of those steps until the FOSM surface $\zeta_i$ or the tracking error $e_i(t)$ reduces to values equal to or smaller than each criterion predetermined.

The characteristic elements are selected based on modeling of each of constituents of the HMS. The characteristic elements selected for the WT generator system 102 and 104 are an angular frequency $\omega_r(=c_1)$ of the WT and a d axis stator current $I_{ds}(=c_2)$ of the PMSG 104. The characteristics element selected for the DC-link 132 is a DC-link voltage $V_{dc}(=c_3)$. The characteristics element selected for the GSC output are a d-axis AC current $I_d(=c_4)$ and a q-axis AC current $I_q(=c_5)$. The characteristic element selected for the BBBC 112 is a battery current $I_b(=c_6)$.

Preliminaries for GSMCFO Method

Definitions and properties of the fractional-order calculus are briefly reviewed here. The GSMCFO fully utilizes the fractional-order calculus.

A Riemann-Liouville fractional derivation of order $\mu(0<\mu<1)$ of a continuous function $\phi(t)$ is defined by:

$$_{t_0}^{R}\mathcal{D}_t^\mu \phi(t) = \frac{1}{\Gamma(m-\mu)} \frac{d^m}{dt^m} \int_{t_0}^{t} \frac{\phi(\tau)}{(t-\tau)^{\mu-m+1}} d\tau, \tag{1}$$

where, m is a positive integer number, $\Gamma$ is a Gamma function defined as, $$\Gamma(q) = \int_0^\infty x^{q-1} e^{-x} dx. \tag{2}$$

On the other hand, a Riemann-Liouville fractional integration of order $\mu(0<\mu<1)$ of a continuous function $\phi(t)$ is described by:

$$_{t_0}^{R}\mathcal{J}_t^\mu \phi(t) = \frac{1}{\Gamma(\mu)} \int_{t_0}^{t} \frac{\phi(\tau)}{(t-\tau)^{1-\mu}} d\tau. \tag{3}$$

Below three properties of the fractional-order calculus are noticeable.

Property 1: If $0<\mu<1$, then:

$$_{t_0}^{C}\mathcal{D}_t^\mu (_{t_0}^{C}\mathcal{J}_t^\mu \, _{J_t^\mu}\phi(t)) = \phi(t). \tag{4}$$

Property 2: If $0<\mu<1$, then:

$$_{t_0}^{C}\mathcal{D}_t^{\mu-1} (_{t_0}^{C}\mathcal{J}_t^\mu \, _{J_t^\mu}\phi(t)) = \phi(t). \tag{5}$$

Property 3: The fractional derivation or integration is a linear operation:

$$\mathcal{D}_t^\mu (\phi_1(t)+\phi_2(t)) = \mathcal{D}_t^\mu \phi_1(t) + \mathcal{D}_t^\mu \phi_2(t). \tag{6}$$

Modeling of the WT Generator and Application of the GSMCFO Method

The mechanical power captured by the wind turbine (WT) 102 from the wind is given by:

$$P_w = \frac{1}{2}\rho\pi R^2 C_p(\lambda, \beta) V_w^3; \tag{7}$$

$$C_p(\lambda, \beta) = 0.5176\left(\frac{116}{\lambda_i} - 0.4\beta - 5\right)e^{\frac{-21}{\lambda_i}} + 0.0068\lambda; \tag{8}$$

$$\frac{1}{\lambda_i} = \frac{1}{\lambda + 0.08\beta} - \frac{0.035}{\beta^3 + 1}; \tag{9}$$

$$\lambda = \frac{R\omega_r}{V_w}; \tag{10}$$

$$\frac{d\omega_r}{dt} = J^{-1} P[T_m - T_e], \tag{11}$$

where $P_w$ is a mechanical power captured by the WT 102, $V_W$ is a wind speed, $C_p$ is a power coefficient, $\rho$ is an air density, R is a radius of the WT 102, $\omega_r$ is an angular speed of the WT 102, a tip-speed ratio is represented by $\lambda$, $\beta$ is a pitch angle, J is an inertia of a mechanical shaft, P is a number of pole pairs, and $T_e$ and $T_m$ are an electrical and a mechanical torque, respectively. See for example, Housseini, B. et al., Robust Nonlinear Controller Design for On-Grid/Off-Grid Wind Energy Battery-Storage System. *IEEE Trans. Smart Grid* 2018, 9, 5588-5598, entire contents of which is incorporated herein by reference.

Now, assuming a desired tip speed ratio $\lambda^*$ gives a maximum value of the power coefficient $C_p(\lambda, \beta)$ of Eq. (8) for any given wind speed $V_w$, a desired angular speed $\omega_r^*$ of the WT, namely the desired value of the characteristic element $c_1^*$ is given from Eq. (4) as:

$$c_1^* = \omega_r^* = \frac{\lambda V_w}{R}. \tag{12}$$

The voltage and the torque dynamics of the PMSG 104 in the d-q reference frames are given as:

$$V_{ds} = L_d \frac{dI_{ds}}{dt} - \omega_r L_q I_{qs} + R_s I_{ds}; \tag{13}$$

$$V_{qs} = L_q \frac{dI_{qs}}{dt} + \omega_r L_d I_{ds} + \omega_r \Lambda_r + R_s I_{qs}; \tag{14}$$

$$T_e = \frac{3P}{2}[(L_d - L_q)I_{ds}I_{qs} + \Lambda_r I_{qs}], \tag{15}$$

where $V_{ds}$ and $V_{qs}$ are the d-axis and q-axis stator voltages of the PMSG 104, respectively, $L_d$ and $L_q$ are the d-axis and q-axis self-inductances, respectively, $I_{ds}$ and $I_{qs}$ are the d-axis and q-axis stator currents, respectively, $L_q$ is the q-axis self-inductance, $\Lambda_r$ is the rotor flux, and $R_s$ is the stator resistance. As the PMSG 104 is a non-salient PMSG 104, $L_d$ and $L_q$ are equal, the electrical torque $T_e$ is given as:

$$T_e = \frac{3P}{2}\Lambda_r I_{qs}. \tag{16}$$

To minimize the stator iron loss and maximize the efficiency of the PMSG 104, the d-axis stator current is preferably be zero. Thus, the desired value for the characteristic element $c_2^*$ given by the desired d-axis stator current is set to zero:

$$c_2^* = I_{ds}^* = 0. \tag{17}$$

A tracking error $e_1(t)$ for the characteristic element $c_1$, that is, the angular frequency $\omega_r$ of the WT and a tracking error $e_2(t)$ for the characteristic element $c_2$, that is the d-axis stator current $I_{ds}$ at a time t are defined as, $$e_1(t) = \omega_r(t) - \omega_r^*(t), \tag{18}$$

$$e_2(t) = I_{ds}(t) - I_{ds}^*(t) = I_{ds}(t). \tag{19}$$

Further taking time derivations, following relations are obtained:

$$\dot{e}_1 = \frac{P}{J}[T_m - T_e] - \dot{\omega}_r^*(t); \tag{20}$$

$$\ddot{e}_1(t) = a[L_q \omega_r I_{ds} + R_s I_{qs} + \lambda_r \omega_r] + aV_{qs} + H_1 - \ddot{\omega}_r^*(t); \tag{21}$$

$$\dot{e}_2(t) = \frac{1}{L_d}[L_q \omega_r I_{qs} - R_s I_{ds}] + \frac{1}{L_d} V_{ds} + H_2 - \dot{I}_{ds}^*(t), \tag{22}$$

where, $$a = \frac{3P^2 \Lambda_r}{2JL_q},$$

$H_1$ and $H_2$ represent lumped disturbances in the system.

Now, fractional-order sliding-mode (FOSM) surfaces $\zeta_1(t)$ and $\zeta_2(t)$ are defined based on the tracking errors $e_1(t)$ and $e_2(t)$, for the angular speed $\omega_r$ and for the d-axis stator current $I_{ds}$, respectively, as below.

$$\zeta_1(t) = k_1 {}^R\mathcal{J}_t^\mu e_1(t) + \sigma_1 {}^R\mathcal{D}_t^{1-\mu} e_1(t) + {}^R\mathcal{D}_t^{2-\mu} e_1(t), \tag{23}$$

$$\zeta_2(t) = k_2 {}^R\mathcal{J}_t^\mu e_2(t) + {}^R\mathcal{D}_t^{1-\mu} e_2(t), \tag{24}$$

where $\mu \in (0, 1)$, and $k_1$, $k_2$ and $\sigma_1$ are positive constants, ${}^R\mathcal{J}_t^\mu$ denotes a Riemann-Liouville fractional integration, ${}^R\mathcal{D}_t^{1-\mu}$ and ${}^R\mathcal{D}_t^{2-\mu}$ denote Riemann-Liouville fractional derivations.

Taking the Riemann-Liouville fractional derivations of $\zeta_1(t)$ and $\zeta_2(t)$, $${}^R\mathcal{D}_t^\mu \zeta_1(t) = k_1 e_1(t) + \sigma_1 \dot{e}_1(t) + \ddot{e}_1(t), \tag{24}$$

$${}^R\mathcal{D}_t^\mu \zeta_2(t) = k_2 e_2(t) + \dot{e}_2(t). \tag{25}$$

Replacing $\ddot{e}_1(t)$ and $\dot{e}_2(t)$ in the above two equations by inserting (21) and (22), the equations (24) and (25) can be rewritten as, $${}^R\mathcal{D}_t^\mu \zeta_1(t) = \tag{26}$$
$$k_1 e_1(t) + \sigma_1 \dot{e}_1(t) + H_1 + a[L_q \omega_r I_{ds} + R_s I_{qs} + \lambda_r \omega_r] + aV_{qs} - \ddot{\omega}_r^*,$$

$${}^R\mathcal{D}_t^\mu \zeta_2(t) = k_2 e_2(t) + \frac{1}{L_d}[L_q \omega_r I_{qs} - R_s I_{ds}] + \frac{V_{ds}}{L_d} + H_2 - \dot{I}_{ds}^*. \tag{27}$$

Here, the equivalent control law elements $u_1^{eqv}(t)$ and $u_2^{eqv}(t)$ of the characteristic elements $c_1(=\omega_r)$ and $c_2(=I_{ds})$ are derived from conditions giving ${}^R\mathcal{D}_t^\mu \zeta_i(t) = 0$, (I=1, 2) in Eqs. (26) and (27), and chosen as q-axis stator voltage $V_{qs}$ and d-axis stator voltage $V_{ds}$, respectively, referring the two equations. The equations for $u_1^{eqv}(t)$ and $u_2^{eqv}(t)$ are obtained by further replacing $H_i(i=1, 2)$ with ${}^R\mathcal{J}_t^{1-\mu} \delta_i$ (i=1, 2), respectively, as follows:

$$u_1^{eqv}(t) = V_{qs}^{eqv}(t) = -\frac{1}{a}\begin{pmatrix} k_1 e_1(t) + \sigma_1 \dot{e}_1(t) + {}^R\mathcal{J}_t^{1-\mu} \delta_1 - \ddot{\omega}_r^* \\ + a[L_q \omega_r I_{ds} + R_s I_{qs} + \lambda_r \omega_r] \end{pmatrix}, \tag{28}$$

$$u_2^{eqv}(t) = V_{ds}^{eqv}(t) = -L_d \begin{pmatrix} k_2 e_2(t) + \dfrac{[L_q \omega_r I_{qs} - R_S I_{ds}]}{L_d} \\ + {}^R\mathcal{J}_t^{1-\mu} \delta_2 - \dot{I}_{ds}^* \end{pmatrix}. \tag{29}$$

Here the lumped external disturbances and parametric perturbations $H_i$ in the HMS, are assumed to satisfy below conditions:

$$\|H_i\| \leq {}^R\mathcal{J}_t^{1-\mu} \delta_i, \text{ and } \|{}^R\mathcal{D}_t^{1-\mu} H_i\| \leq \delta_{i,(tm\,30)}$$

where $\delta_i$ is a positive function.

Now, the control law elements $u_1^{cnt}(t)$ and $u_2^{cnt}(t)$ of the characteristic elements $c_1(=\omega_r)$ and $c_2(=I_{ds})$ are defined as below based on the equivalent control law elements Eqs. (28) and (29):

$$u_1^{cnt}(t) = \tag{31}$$
$$V_{qs}^{cnt}(t) = V_{qs}^{eqv}(t) - \frac{1}{a}\left[\varrho_1 \, {}^R\mathcal{J}_t^{1-\mu} SG(\zeta_1(t))|\zeta_1(t)|^\alpha + \gamma_1 \, {}^R\mathcal{J}_t^{1-\mu} \zeta_1(t)\right];$$

$$u_2^{cnt}(t) = \tag{32}$$
$$V_{ds}^{cnt}(t) = V_{ds}^{eqv}(t) - L_d\left[\varrho_2 \, {}^R\mathcal{J}_t^{1-\mu} SG(\zeta_2(t))|\zeta_2(t)|^\alpha + \gamma_2 \, {}^R\mathcal{J}_t^{1-\mu} \zeta_2(t)\right],$$

where, $\alpha \in (0, 1)$, $\varrho_i$ and $\gamma_i$ (I=1, 2) are positive constants, and SG $(\zeta_i(t))$ (i=1, 2) represent signum function sgn($\zeta_i(t)$) and its smooth approximations, for example, $$\tanh\left(\frac{\zeta_i(t)}{\vartheta}\right)$$

with $\vartheta > 0$.

It is noted that the FOSM surfaces $\zeta_i(t)$, (i=1, 2) and time derivatives of the FOSM $$\text{surfaces} \frac{d}{dt}\zeta_i(t),$$

(i=1, 2) satisfy below relation Eq. (33) when the control law element $u_i^{cnt}(t)$, (i=1, 2) are applied in controlling the WT and the PMSG.

$$\zeta_i(t)\frac{d\zeta_i(t)}{dt} = \zeta_i(t)^R \mathcal{D}_t^{1-\mu}\left(^R\mathcal{D}_t^{1-\mu}\zeta_i(t)\right) \qquad (33)$$

$$= \zeta_i(t)^R\mathcal{D}_t^{1-\mu}\begin{pmatrix} H_i - {}^R\mathcal{J}_t^{1-\mu}\delta_i \\ -\varrho_i^R\mathcal{J}_t^{1-\mu}SG(\zeta_i(t)) - \gamma_i{}^R\mathcal{J}_t^{1-\mu}\zeta_i(t) \end{pmatrix}$$

$$= \zeta_i\left({}^R\mathcal{D}_t^{1-\mu}H_i - \delta_i\right) - \varrho_i\zeta_i\,\text{sgn}(\zeta_i(t))|\zeta_i(t)|^\alpha - \gamma_i\zeta_i^2(t)$$

$$\leq -\varrho_i|\text{sgn}(\zeta_i(t))||\zeta_i(t)|^{\alpha+1} - \gamma_i|\zeta_i(t)|^2$$

$$< 0. \quad (\text{when } \zeta_i(t) \neq 0)$$

As described above, the GSMCFO method includes calculations of the FOSM surface $\zeta_i(t)$ and the control law elements $u_i^{cnt}(t)$ including a fractional time integral and a fractional time differentiation of the tracking errors $e_1$ and $e_2$. The controller is configured to monitor a status of the HMS, including the characteristics elements $c_1(=\omega_r)$ and the rotor current $c_2$ (=$I_{ds}$), and configured to control the RSC 106 by applying the control law elements $u_i^{cnt}(t)$, (i=1, 2) obtained by fractional calculus, when disturbances are perceived. The control law elements guarantee the characteristics elements $\omega_r$ and $I_{ds}$ to effectively arrive and stay on the sliding mode surfaces $\zeta_1(t)$ and $\zeta_2(t)$, in the presence of external disturbances, parametric perturbation, and unknown dynamics.

When the controller 120 applied the control law elements $u_i^{cnt}(t)$, (i=1, 2), a condition:

$$\zeta_i(t)\frac{d\zeta_i(t)}{dt} < 0$$

is satisfied, as far as $\zeta_i(t)$ is nonzero. Whenever the condition was satisfied, it is an indication that the angular frequency $\omega_r$ and the d-axis stator rotor current $I_{ds}$ are approaching the FOSM surface $\zeta_i(t)$, and sliding along the FOSM surface toward a global stabilized point satisfying $$\zeta_i(t) = \frac{d\zeta_i(t)}{dt} = 0,$$

(i=1, 2).

However, when there is a momentary reduction in the operating frequency $\omega_r$ of the rotor or the rotor current $I_{ds}$, the error function e(t) is detected as non-zero. This indicates a variation of the operating frequency $\omega_r$ of the rotor or the current $I_{ds}$ through the rotor are different compared to the desired rotational frequency $\omega_r$ or the rotor current $I_{ds}$. The momentarily 10 reduction may be due to intermittent noise in the atmosphere such as wind speed reduction for a certain duration. At this time, the program in the definition set in the controller 120 executes multiple equations containing the error function, FOSM surface calculation based on the error function as well as control law element based on the equations of the FOSM surface. Based upon the value of the control law element $u_1^{cnt}(t)$, the controller 120 signals to the RSC 106 to modify the pulse width modulation signals to track the next optimum operating point of the rotor to harness the maximum wind power again. Since the control law element $u_1^{cnt}(t)$ allows $\omega_r$ and $I_{ds}$ to effectively arrive and stay on the sliding mode surfaces $\zeta_1(t)$ and $\zeta_2(t)$, the modified pulse width modulation signals are supplied to the RSC 106, such that the RSC 106 may generate an equivalent proportional current or voltage at its output, even in the presence of atmospheric disturbances, parametric perturbation, or any unknown dynamics. For example, if initially the WT 102 was generating 50 V DC voltage at the output of the RSC 106 at the specific $\omega_r$ and $I_{ds}$, the WT 102 is now generating a reduced voltage (for example, 47 V) in presence of atmospheric disturbances. However, since the FOSM surfaces are highly convergent, the system quickly attains the new stable points, that is, 47 V, without any glitch or overshoot at the output of the RSC 106 because of the fractional sliding mode surfaces $\zeta_1(t)$ and $\zeta_2(t)$.

Modeling of the PV System

The PV system 110 is formed by an arrangement of PV cells (consisting of n- and p-type semiconductor materials) in a framework. The PV cells generate a DC voltage from solar radiation. An equivalent circuit of a PV cell includes a current source, a diode, a series resistor, and a parallel resistor. An output current of the PV system 110 is given by, $$I_{pv} = N_p\left(I_{ph} - I_S\left[\exp\left(\frac{qV_{dio}}{N_sAk_BT}\right) - 1\right] - \frac{V_{dio}}{R_{sh}}\right), \qquad (34)$$

where, $$V_{dio} = \frac{V_{pv} + I_{pv}\frac{N_s}{N_p}R_{se}}{N_s}, \qquad (35)$$

where $I_{ph}$ is a photo-generated current, $I_{pv}$ is the PV output current, $I_S$ is the reverse saturation current, $N_s$ and $N_p$ are the number of series-and parallel-connected PV cells, q is the electron charge, $V_{dio}$ is a diode voltage, A represents a p-n junction factor, $k_B$ represents the Boltzmann constant, T is a cell temperature, and $R_{se}$ and $R_{sh}$ are equivalent series and shunt resistances, respectively.

MPPT Operation of the PV System and Regulating the DC Link Voltage

The controller 120 is configured to perform the maximum power point tracking (MPPT) operation of the PV system 110 at different irradiance levels using an advanced multi-sector perturb and observe approach, and configured to compute corresponding MPPT voltage $V_{pv}^{MPPT}$ and current $I_{pv}^{MPPT}$, simultaneously. See, for example, Youssef, A. R. et al., Advanced multi-sector P&O maximum power point tracking technique for wind energy conversion system. *Int. J. Electr. Power Energy Syst.* 2019, 107, 89-97, entire contents of which is incorporated herein by reference. The MPPT voltage, $V_{pv}^{MPPT}$ is set as the reference voltage for the DC-link $V_{dc}^*$. When the irradiance level is very low (at night), a $V_{pv}^{MPPT}$ is also low (below the minimum allowable DC-link voltage), then the controller 120 is configured to set the $V_{dc}^*$ as the nominal DC-link voltage $V_{dc}^*$. On the other hand, when the irradiance level is too high, a $V_{pv}^{MPPT}$ is also high. If the $V_{pv}^{MPPT}$ was greater than the allowable maximum DC-link voltage, the controller is configured to set the $V_{dc}^*$ as the nominal DC voltage. The HMS can be configured to control the MPPT operation of the controller via the control of the GSC 108.

Modeling of the DC-Link and Application of GSMCFO Method

The power generated from the renewable energy sources in the HMS 100 is transferred to the GSC through the DC-link 132. A dynamic model of the DC-link voltage $V_{dc}(=c_3)$ of the DC-link 132 is derived as follows:

$$C_{dc}\frac{dV_{dc}}{dt} = I_{sdc} + I_{pv} + (1-D)I_b - I_{gdc}, \quad (36)$$

where $C_{dc}$ is the capacitance of the DC-bus, $I_{sdc}$ is the output DC current from the RSC 106, $I_{pv}$ is the output current from the PV system, $I_b$ is the battery current from the BESS 114, D is the duty cycle of the BBBC 112 for the BESS 114, and $I_{gdc}$ is a DC current input to the GSC 108.

Assuming that the RSC 106 and GSC 108 are ideal, the following relations are valid:

$$P_w = I_{sdc}V_{dc}, \quad (37)$$

$$I_{gdc}V_{dc} = \frac{3}{2}V_d I_d, \quad (38)$$

where $I_d$ and $V_d$ are the d-axis AC current and AC voltage of the AC output of the GSC 108, respectively. Using the above equation, the DC voltage dynamic equation can be rewritten as:

$$C_{dc}\frac{dV_{dc}}{dt} = \frac{P_w}{V_{dc}} + I_{pv} + (1-D)I_b - \frac{3}{2}\frac{V_d I_d}{V_{dc}}. \quad (39)$$

The characteristics element $c_3$ is selected as the DC-link voltage $V_{dc}$. Thus, the controller 120 is configured to monitor the DC-link voltage $V_{dc}$. A tracking errors $e_3(t)$ for the DC-link voltage is given by:

$$e_3(t) = V_{dc}(t) - V_{dc}^*(t), \quad (40)$$

where, $V_{dc}^*(t)$ represents a desired value for the DC-link voltage $V_{dc}$.

The desired value $V_{dc}^*$ defined for the DC-link voltage $V_{dc}$ is given as, $$c_3^*(t) = V_{dc}^* = \begin{cases} V_{pv}^{MPPT}; & \text{when } V_{dc}^{min} \leq V_{pv}^{MPPT} \leq V_{dc}^{max}, \\ V_{dc}^{norm}; & \text{when } V_{pv}^{MPPT} < V_{dc}^{min}, \text{ or } V_{pv}^{MPPT} > V_{dc}^{max}, \end{cases} \quad (15)$$

wherein, $V_{pv}^{MPPT}$ represents an output voltage of the PV system under a maximum power point tracking (MPPT) operation, $V_{dc}^{min}$, $V_{dc}^{max}$ and $V_{dc}^{nom}$ represent a minimum allowable value, a maximum allowable value, and a nominal value of the DC-link voltages, each predetermined respectively.

Thus, the tracking error $e_3(t)$ is defined as a difference between a monitored voltage of the DC-link 132 and a desired voltage of the DC-Link 132.

A time derivative of the tracking error $e_3(t)$ is given using Eq. (39) as below:

$$\dot{e}_3(t) = \frac{P_w}{C_{dc}V_{dc}} + \frac{I_{pv}}{C_{dc}} + \frac{(1-D)}{C_{dc}}I_b - \frac{3}{2}\frac{V_d I_d}{C_{dc}V_{dc}} + H_3 - \dot{V}_{dc}^*(t), \quad (41)$$

where $H_3$ represents the additive lumped disturbance in the HMS 100.

The FOSM surface $\zeta_3(t)$ for the DC-link voltage $V_{dc}$ is defined as:

$$\zeta_3(t) = k_3{}^R\mathcal{J}_t^\mu e_c(t) + {}^R\mathcal{D}_t^{1-\mu} e_3(t), \quad (42)$$

where $\mu(0<\mu<1)$ and $k_3$ are positive constants, ${}^R\mathcal{J}_t^\mu$ denotes a Riemann-Liouville fractional integration, ${}^R\mathcal{D}_t^{1-\mu}$ denotes a Riemann-Liouville fractional derivations.

Taking a Riemann-Liouville fractional derivation of $\zeta_3(t)$ gives:

$$\mathcal{D}_t^\mu \zeta_3(t) = k_3 e_3(t) + \dot{e}_c(t) \quad (43)$$

Inserting Eq. (41) for $\dot{e}_3(t)$ into the above equation gives:

$$\begin{aligned}{}^R\mathcal{D}_t^\mu \zeta_3(t) = & \\ & k_3 e_3(t) + \frac{P_w}{C_{dc}V_{dc}} + \frac{I_{pv}}{C_{dc}} + \frac{(1-D)}{C_{dc}}I_b - \frac{3}{2}\frac{V_d I_d}{C_{dc}V_{dc}} + H_3 - \dot{V}_{dc}^*(t).\end{aligned} \quad (44)$$

Here, the equivalent control law elements $u_3^{eqv}(t)$ of the characteristic elements $c_3(=V_{dc})$ is derived from the conditions giving ${}^R\mathcal{D}_t^\mu \zeta_i(t)=0$, (i=3) in Eq. (44), and is selected as the d-axis AC current $I_d$ of the AC output from the GSC 108, referring the equation. The equations for the equivalent control law elements $u_3^{eqv}(t)$ is obtained by further replacing the external lumped disturbance $H_i(i=3)$ with ${}^R\mathcal{J}_t^{1-\mu}\delta_i(i=3)$, as follows:

$$u_3^{eqv}(t) = I_d^{eqv}(t) = \frac{2}{3}\frac{C_{dc}V_{dc}}{V_d}\left(\begin{array}{c}k_3 e_3(t) + \frac{P_w}{C_{dc}V_{dc}} + \frac{I_{pv}}{C_{dc}} \\ + \frac{(1-D)}{C_{dc}}I_b - {}^R\mathcal{J}_t^{1-\mu}\delta_3 - \dot{V}_{dc}^*(t)\end{array}\right) \quad (45)$$

where, ${}^R\mathcal{J}_t^{1-\mu}\delta_3$ represents external perturbations with a positive function $\delta_3$, and assumed to satisfy the condition given by Eq. (30).

Now, the control law elements $u_3^{cnt}(t)$ of the characteristic elements $c_3(=I_d)$ is defined based on the equivalent control law element $u_3^{eqv}(t)$ in Eq. (45) as:

$$u_3^{cnt}(t) = \quad (46)$$

$$I_d^{cnt}(t) = I_d^{eqv}(t) + \frac{2}{3}\frac{C_{dc}V_{dc}}{V_d}\left[\varrho_3 \mathcal{J}_t^{1-\mu} SG(\zeta_3(t))|\zeta_3(t)|^\alpha + \gamma_3 \mathcal{J}_t^{1-\mu}\zeta_3(t)\right],$$

where, $\alpha \in (0, 1)$, $\varrho_3$ and $\gamma_3$ are positive constants, and $SG(\zeta_i(t))(i=3)$ represents a signum function $sgn(\zeta_i(t))$ and its smooth approximations, for example, $$\tanh\left(\frac{\zeta_i(t)}{\vartheta}\right)$$

with $\vartheta > 0$.

As described above, the GSMCFO method applied in controlling the DC-link 132 of the HMS 100 includes calculations of the FOSM surface $\zeta_3(t)$ and the control law elements $u_3^{cnt}(t)$ including a fractional time integral and a fractional time derivative of the tracking error $e_3$. The controller is configured to monitor a status of the HMS, including the characteristics element $c_3$, that is, the DC-link voltage $V_{dc}$, and configured to control the GSC 108 by applying the control law element $u_3^{cnt}(t)(=I_d^{cnt}(t))$ defined for the d-axis AC current $I_d$ of the GSC 108 and obtained by the fractional calculus, when disturbances are perceived. The control law element $u_3^{cnt}(t)(=I_d^{cnt}(t))$ guarantees the characteristic element $c_3(=V_{dc})$ effectively arrive and stay on the FOSM surfaces $\zeta_3(t)$ in the presence of external disturbances, parametric perturbation, and unknown dynamics.

Applying the GSMCFO method and the control law elements $u_3^{cnt}(t)$ by the controller 120 realizes a condition:

$$\zeta_3(t)\frac{d\zeta_3(t)}{dt} < 0,$$

as far as $\zeta_3(t)$ is nonzero, as discussed earlier. Whenever the condition is satisfied, it is an indication that the characteristics element $c_3(=V_{dc})$ of the GSC 108 is approaching the FOSM surface $\zeta_3(t)$, and sliding along the FOSM surface toward a global stabilized point satisfying $$\zeta_3(t)\frac{d\zeta_3(t)}{dt} < 0.$$

It is clear from the above equations that the controller 120 includes the FOSM surface having integration and a differentiation terms of the errors $e_3$. In other words, the equation defining the FOSM surface $\zeta_3(t)$ of the characteristic element $c_3(t)$ comprises a fractional time integral of the tracking error $e_3(t)$ given by $e_3(t)=c_3(t)-c_3^*(t)$ and a fractional time derivative of the tracking error $e_3(t)$.

The equivalent control law element and the control law element $u_1^{cnt}(t)$ are the controlling signals to control the voltage of the DC-link 132 when the disturbances are perceived in the DC-link 132 due to any unknown reason. The control law element and the equivalent control law element makes $e_3$ reach and remain on the surface $\zeta_3(t)=0$ in the presence of external disturbances, parametric perturbation, and unknown dynamics.

Physical Implication

The controller 120 monitors the $V_{dc}$ through the DC-link 132. The controller 120 also executes the programmatic instructions containing equations of FOSM and the equivalent control law and the control law element whenever the control law element $u_i^{cnt}(t)$ satisfies a condition $$\zeta_i(t)\frac{d\zeta_i(t)}{dt} < 0, \quad (47)$$

so far as $\zeta_i(t)$ is nonzero. Whenever the condition satisfies, it is an indication to the controller 120 that the value of $V_{dc}$ is optimum and no correction in the Pulse width modulation signals to track the optimum operating point of the PV system 110 to harness the maximum solar power is needed. At this moment, the error function $e(t)$ is detected as zero.

However, when there is a momentarily reduction in the $V_{dc}$, the error function $e_3(t)$ is detected as non-zero. This indicates a variation of the $V_{dc}$ compared to the desired voltage $V_{dc}^*$ of the DC-link 132. The momentarily reduction may be due to intermittent noise in the atmosphere such as cloudy environment for a certain duration. At this time, the program in the definition set in the controller 120 executes multiple equations containing the error function, FOSM surface calculation based on the error function as well as control law element based on the equations of the FOSM surface. Based upon the value of the control law element $u_3^{cnt}(t)$, the controller 120 signals to the GSC 108 to modify the pulse width modulation signals to track the next optimum operating point of the PV system to harness the maximum solar power again. Since the control law element $u_3^{cnt}(t)$ allows $V_{dc}$ to effectively arrive and stay on the sliding mode surface $\zeta_3^{cnt}(t)$, the modified pulse width modulation signals are supplied to the GSC 108, such that the GSC 108 may generate an equivalent proportional current or voltage at its output, even in the presence of atmospheric disturbances, parametric perturbation, or any unknown dynamics. For example, initially the PV system 110 was generating 45V DC voltage to the DC-link 132, is it now generating a reduced voltage (for example, 39 V) in presence of atmospheric disturbances. However, since the FOSM surfaces are highly convergent, the system quickly attains the new stable points, without any glitch or overshoot at the input side of the GSC 108 because of the fractional sliding mode surface $\zeta_3(t)$.

Modeling of the GSC and Application of GSMCFO Method

The GSC 108 of the HMS 100 is configured to (a) regulate the DC-link voltage, (b) achieve the MPPT performance of the solar PV system, (c) ensure power transfer from the DC side to the AC grid side, and (d) to regulate the active and reactive power at the AC grid side. A cascade control structure is adopted in certain implementations.

Dynamic equations of the GSC in the d-q reference frames can be expressed as follows:

$$V_d = U_d - L_f\omega_g I_q + R_f I_d + L_f\frac{dI_d}{dt}; \quad (48)$$

$$V_q = U_q + L_f\omega_g I_d + R_f I_q + L_f\frac{dI_q}{dt}, \quad (49)$$

where $I_d$ and $I_q$ represent the d-axis and the q-axis AC currents of an AC output of the GSC 108, respectively, and $V_d$ and $V_q$, the d-axis and the q-axis AC voltages of the output of the GSC 108, respectively, $U_d$ and $U_q$ are the d-axis and q-axis voltages at the PCC 128, $L_f$ and $R_f$ are an inductance 122 and a resistance 124 of the grid side filter, respectively and $\omega_g$ is an electrical angular frequency of the output of the GSC 108.

The AC currents of the AC output the GSC are controlled for proper power transfer to the grid side. The active power is controlled by the d-axis AC current. Thus, the desired d-axis current $I_d^*$ is given by $I_d$. The reactive power is desired to be very close to zero by controlling the q-axis current and setting the desired q-axis current as $I_q^*=0$.

Thus, the characteristics elements $c_i(t)$ (i=4, 5) are defined for the GSC are the d-axis AC current $I_d(=c_4(t))$ of the AC output from the GSC 108 for i=4, and the q-axis AC current $I_q(=c_5(t))$ of the AC output from the GSC 108 for i=5. The controller 120 is configured to monitor the characteristic elements $c_4(t)$ $(=I_d)$ and $c_5(t)$ $(=I_q)$.

The d-axis AC current Id giving the desired value $I_d^*$ is given by the power balance condition at the PCC and a power transferred by the GSC to the PCC as below, $$(P_{dem} - P_{ug}) = \frac{3}{2} V_d I_d, \qquad (50)$$

where $P_{dem}$ and $P_{ug}$ represent a power demand at the load and a power exchanged between the PCC and the utility grid, respectively, where $P_{ug}>0$, when provided from the utility grid to the PCC, $P_{ug}<0$, when provided from the PCC side to the utility grid, $V_d$ represent a d-axis AC voltage of the AC output from the GSC.

Thus, the desired values defined for the d-axis and the q-axis AC current are given respectively as, $$c_4^*(t) = I_d^* = I_d = \frac{2}{3} \frac{P_{dem} - P_{ug}}{V_d}, \qquad (51)$$

$$c_5^*(t) = I_q^* = 0, \qquad (52)$$

The tracking errors $e_4(t)$ for the d-axis AC current $I_d$ and $e_5(t)$ for the q-axis AC current $I_q$ are given as:

$$e_4(t) = I_d(t) - I_d^*(t), \qquad (53)$$

$$e_5(t) = I_q(t) - I_q^*(t) = I_q(t). \qquad (54)$$

Differentiating the tracking error $e_4(t)$ and $e_5(t)$ gives:

$$\dot{e}_4(t) = \frac{1}{L_f}[V_d - R_f I_d - U_d + L_f \omega_g I_q] + H_4 - \dot{I}_d^*(t); \qquad (55)$$

$$\dot{e}_5(t) = \frac{1}{L_f}[V_{dq} - R_f I_d - U_d + L_f \omega_g I_q] + H_5 - \dot{I}_q^*(t), \qquad (56)$$

where $H_4$ and $H_5$ are the lumped disturbances in the HMS 100.

FOSM surfaces $\zeta_4(t)$ and $\zeta_5(t)$ for the characteristics elements $c_4(t)(=I_d)$ and $c_5(t)(=I_q)$ are defined respectively as:

$$\zeta_4(t) = k_4 {}^R\mathcal{J}_t^\mu e_4(t) + {}^R\mathcal{D}_t^{1-\mu} e_4(t); \qquad (57)$$

$$\zeta_5(t) = k_5 {}^R\mathcal{J}_t^\mu e_5(t) + {}^R\mathcal{D}_t^{1-\mu} e_5(t); \qquad (58)$$

where $\mu \in (0, 1)$, $k_4$, and $k_5$ are positive constants, ${}^R\mathcal{J}_t^\mu$ and ${}^R\mathcal{D}_t^{1-\mu}$ each denotes a Riemann-Liouville fractional integral and a Riemann-Liouville fractional derivation, respectively.

Riemann-Liouville fractional derivatives of the FOSM surfaces $\zeta_4(t)$ and $\zeta_5(t)$ are given respectively as:

$$^R\mathcal{D}_t^\mu \mathcal{Z}_4(t) = k_4 e_4(t) + \dot{e}_4(t); \qquad (59)$$

$$^R\mathcal{D}_t^\mu \mathcal{Z}_5(t) = k_5 e_5(t) + \dot{e}_5(t). \qquad (60)$$

Substituting Eqs. (51) and (52) for $\dot{e}_4$ and $\dot{e}_5$ of the above equations respectively, gives $$^R\mathcal{D}_t^\mu \zeta_4(t) = k_4 e_4(t) - \dot{I}_d^* + \frac{1}{L_f}[V_d - R_f I_d - U_d + L_f \omega_g I_q + H_4], \qquad (61)$$

$$^R\mathcal{D}_t^\mu \zeta_5(t) = k_5 e_5(t) - \dot{I}_q^* + \frac{1}{L_f}[V_q - R_f I_q - U_q - L_f \omega_g I_d + H_5]. \qquad (62)$$

Here, the equivalent control law elements $u_4^{eqv}(t)$ and $u_5^{eqv}(t)$ of the characteristic elements $c_4(=I_d)$ and $c_5(=I_q)$ are derived from conditions giving ${}^R\mathcal{D}_t^\mu \zeta_i(t)=0$, (i=4, 5) in Eqs. (57) and (58), respectively. Referring the two equations, the equivalent control law elements $u_4^{eqv}(t)$ and $u_5^{eqv}(t)$ are selected as $V_d$ and $V_q$, the d-axis and the q-axis AC voltages of the output of the GSC 108, respectively.

The equations for the equivalent control law elements $u_4^{eqv}(t)$ and $u_5^{eqv}(t)$ are obtained by further replacing $H_i$ (i=4, 5) with ${}^R\mathcal{J}_t^{1-\mu} \delta_i$ (i=4, 5), respectively, as follows:

$$u_4^{eqv}(t) = V_d^{eqv}(t) = -L_f \left( \begin{array}{c} k_4 e_4(t) - \dot{I}_d^* \\ -\frac{1}{L_f}[R_f I_d + U_d - L_f \omega_g I_q - {}^R\mathcal{J}_t^{1-\mu} \delta_4] \end{array} \right); \qquad (63)$$

$$u_5^{eqv}(t) = V_q^{eqv}(t) = -L_f \left( \begin{array}{c} k_5 e_5(t) - \dot{I}_d^* \\ -\frac{1}{L_f}[R_f I_q + U_q - L_f \omega_g I_d - {}^R\mathcal{J}_t^{1-\mu} \delta_5] \end{array} \right), \qquad (64)$$

where, the lumped disturbances $H_i$ in the HMS, are assumed to be bounded and satisfy below conditions:

$$\|H_i\| \leq {}^R\mathcal{J}_t^{1-\mu} \delta_i, \text{ and } \|{}^R\mathcal{D}_t^{1-\mu} H_i\| \leq \delta_i (i=4, 5) \qquad (65)$$

where ${}^R\mathcal{J}_t^{1-\mu} \delta_i$, (i=4, 5) represent external disturbances and parametric perturbations with $\delta_i$ is a positive function.

Now, the control law elements $u_4^{cnt}(t)$ and $u_5^{cnt}(t)$ of the characteristic elements $c_4(=I_d)$ and $c_5(=I_q)$ are defined based on the equivalent control law elements Eqs. (59) and (60), respectively, $$u_4^{cnt}(t) = \qquad (66)$$

$$V_d^{cnt}(t) = V_d^{eqv}(t) - L_f [\varrho_4^R \mathcal{J}_t^{1-\mu} SG(\zeta_4(t))|\zeta_4(t)|^\alpha + \gamma_4 {}^R\mathcal{J}_t^{1-\mu} \zeta_4(t)],$$

$$u_5^{cnt}(t) = \qquad (67)$$

$$V_q^{cnt}(t) = V_q^{eqv}(t) - L_f [\varrho_5^R \mathcal{J}_t^{1-\mu} SG(\zeta_5(t))|\zeta_5(t)|^\alpha + \gamma_5 {}^R\mathcal{J}_t^{1-\mu} \zeta_5(t)],$$

where, $\alpha \in (0, 1)$, $\varrho_i$ and $\gamma_i$ (i=4, 5) are positive constants, and $SG(\zeta_i(t))$ (i=4, 5) represent signum function $sgn(\zeta_i(t))$ and its smooth approximations, for example, $$\tanh\left(\frac{\zeta_i(t)}{\vartheta}\right)$$

with $\vartheta > 0$.

As described above, the GSMCFO method applied to the GSC control of the HMS 100 includes calculations of the FOSM surfaces $\zeta_4(t)$ and $\zeta_5(t)$, the control law elements $u_4^{cnt}(t)$ and $u_r^{cnt}(t)$ including a fractional time integral and a fractional time differentiation of the tracking errors $e_4$ and $e_5$, respectively. The controller is configured to i) monitor a status of the HMS, including the characteristics elements $c_4$ and $c_5$, defined and specified in the definition set as the d-axis AC current $I_d$ and the q-axis AC current $I_q$ of the AC output of the GSC 108, respectively, ii) calculate the control law elements $u_4^{cnt}(t)=V_d^{cnt}(t)$, and $u_5^{cnt}(t)=V_q^{cnt}(t)$, defined with specific equations for the d-axis and the q-axis AC voltages of the output of the GSC 108, respectively, referring the definition set in the preinstalled software and based on monitored status of the HMS, and iii) control the GSC 108 by applying the control law elements $u_4^{cnt}(t)=V_d^{cnt}(t)$, and $u_5^{cnt}(t)=V_q^{cnt}(t)$ calculated, when the tracking errors are perceived. The control law elements guarantee the characteristic elements, the d-axis AC current $I_d$ and the q-axis AC current $I_q$ of the GSC 108 effectively arrive and stay on the FOSM surfaces $\zeta_i(t)(i=4, 5)$ in the presence of external disturbances, parametric perturbation, and unknown dynamics.

Applying the GSMCFO method and the control law elements $u_i^{cnt}(t)$, (i=4, 5) by the controller 120 realizes a condition:

$$\zeta_i(t)\frac{d\zeta_i(t)}{dt}<0,$$

(I=4, 5) as far as $\zeta_i(t)$ is nonzero, as discussed earlier. Whenever the condition is satisfied, it is an indication that the characteristics element $c_i$(i=4, 5), the d-axis AC current $I_d$ and the q-axis AC current $I_q$ of the GSC 108 are approaching the FOSM surface $\zeta_i(t)$, (i=4, 5) and sliding along the FOSM surface toward a global stabilized point satisfying $$\zeta_i(t)=\frac{d\zeta_i(t)}{dt}=0,$$

(i=4, 5).

Modeling of the BBBC with the Rechargeable Battery and Application of GSMCFO Method The bidirectional buck/boost converter (BBBC) 112 is configured to connect the rechargeable battery (BESS) 114 with the DC-link 132 as illustrated in FIG. 1. The aim of the buck/boost control by the BBBC 112 is to facilitate efficient charging/discharging of the BESS to maintain the power balance of the HMS 100.

The BBBC 112 is configured to behave as a buck converter when charging the BESS 114 and as a boost converter when supplying the load 126 or discharging. In other words, when an excess power is generated compared to a power demand, the controller 120 is configured to store the excess power by recharging the BESS 114 via the BBBC 112 that behaves as a buck converter. On the other side, when the demand power is larger than a combined power from the WT, the PV system and the grid 130, the BESS 114 is configured to discharge via the BBBC 112 that behaves as a boost converter during discharging the BESS 114. Detailed mathematical model of the BBBC 112 and electrically connected BESS 114 is described below.

A dynamic model of the BESS 114 is given for charging operation by the BBBC as:

$$L_b\frac{dI_b}{dt}=(V_b-I_bR_b-DV_{dc}),\tag{68}$$

where $L_b$ is the battery inductance, $I_b$ is the battery current, $V_b$ is the battery voltage, $V_{dc}$ is the voltage of the DC-link 132, and D is the duty cycle of the BBBC 112. Dynamics of a state-of-charge (SOC) of the rechargeable battery is given by:

$$\frac{d(SOC)}{dt}=-\frac{\eta_b}{Q_b}I_b,\tag{69}$$

where $Q_b$ and $\eta_b$ stand for the battery capacity and efficiency, respectively.

To maintain the efficiency, longevity and reliability, the SOC is constrained by the minimum SOC ($SOC^{min}$) and the maximum SOC ($SOC^{min}$) as provided below:

$$SOC^{min}<SOC<SOC^{min}.\tag{70}$$

A desired battery current $I_b^*$ is determined based on the power balancing condition in the HMS 100, as below. The battery charging and discharging power $P_b$ of the BESS 114 is controlled in accordance with a power balancing condition given as, $$P_{re}+P_{ug}=P_{dem}+P_b,\tag{71}$$

where, $P_{re}(\geq 0)$ is a sum of powers from renewable energy sources, $P_{ug}$, a power provided from the utility grid, and $P_{dem}(\geq 0)$, a load demand by the load 126. In Eq. (67), the battery power $P_b$ is positive when the BESS is charged. Thus, $P_b$ and a desired value of the battery current $I_b^*$ are given respectively as, $$P_b=P_{re}+P_{ug}-P_{dem},\tag{72}$$

$$I_b^*=\frac{P_b}{V_b}=\frac{P_{re}+P_{ug}-P_{dem}}{V_b}.\tag{73}$$

When a battery current monitored was $I_b(t)$ at time t monitored, a tracking error $e_6(t)$ is given by:

$$e_6(t)=I_b(t)-I_b^*(t).\tag{74}$$

Taking a time derivation of the tracking error $e_6(t)$ and substituting Eq. (64) give, $$\dot{e}_6=\frac{dI_b}{dt}-\dot{I}_b^*(t)=\frac{1}{L_b}(V_b-I_bR_b-DV_{dc}+H_6)-\dot{I}_b^*(t),\tag{75}$$

where $H_6$ represents a lumped disturbance in the HMS 100.

A fractional-order sliding-mode (FOSM) surface $\zeta_6(t)$ is defined as:

$$\zeta_6(t)=k_6{}^R\mathcal{I}_t^\mu e_6+{}^R\mathcal{D}_t^{1-\mu}e_6,\tag{76}$$

where $\mu\in(0, 1)$ and $k_6$ are positive constants, ${}^R\mathcal{I}_t^\mu$ denotes a Riemann-Liouville fractional integration, ${}^R\mathcal{D}_t^{1-\mu}$ denotes a Riemann-Liouville fractional derivation.

Riemann-Liouville fractional derivatives of the FOSM surfaces $\zeta_6(t)$ is given as:

$${}^R\mathcal{D}_t^\mu\zeta_6(t)=k_6e_6+\dot{e}_6(t).\tag{77}$$

Substituting Eq. (71) for $\dot{e}_6$ of the above equations gives $${}^R\mathcal{D}_t^\mu\zeta_6(t)=k_6e_6(t)+\frac{1}{L_b}(V_b-I_bR_b-DV_{dc}+H_6)-\dot{I}_b^*(t),\tag{78}$$

Here, the equivalent control law elements $u_6^{eqv}(t)$ of the characteristic elements $c_6(=I_b)$ is derived from a condition giving ${}^R\mathcal{D}_t^\mu\zeta_6(t)=0$ in Eq. (73). Referring Eq. (73), the equivalent control law elements $u_6^{eqv}(t)$ is selected as the duty ratio D of the BBBC 112.

The equation for the control law elements $u_6^{eqv}(t)=D^{eqv}(t)$ is obtained by further replacing $H_6$ with ${}^R\mathcal{J}_t^{1-\mu}\delta_6$:

$$u_6^{eqv}(t) = D^{eqv}(t) = \frac{L_b}{V_{dc}}\left(K_6 e_6(t) + \frac{1}{L_b}[V_b - I_b R_b + {}^R\mathcal{J}_t^{1-\mu}\delta_6] - I_b^*\right), \quad (79)$$

where, the lumped disturbances $H_6$ in the HMS, is assumed to be bounded and satisfies below conditions:

$$\|H_6\| \leq {}^R\mathcal{J}_t^{1-\mu}\delta_6, \text{ and } {}^R\mathcal{D}_t^{1-\mu}H_6\| \leq \delta_6, \quad (80)$$

where ${}^R\mathcal{J}_t^{1-\mu}\delta_6$ represents external disturbances and parametric perturbations with $\delta_6$ a positive function.

The control law element $u_6^{cnt}(t)=D^{cnt}(t)$ is defined as:

$$u_6^{cnt}(t) = \quad (81)$$
$$D^{cnt}(t) = D^{eqv}(t) - L_f[\varrho_6^R\mathcal{J}_t^{1-\mu}SG(\zeta_6(t))|\zeta_6(t)|^\alpha + \gamma_6{}^R\mathcal{J}_t^{1-\mu}\zeta_6(t)],$$

where, $\alpha \in (0,1)$, $\varrho_6$ and $\gamma_6$ are positive constants, and $SG(\zeta_i(t))(i=6)$ represents a signum function $\text{sgn}(\zeta_i(t))$ and its smooth approximations, for example, $$\tanh\left(\frac{\zeta_i(t)}{\vartheta}\right)$$

with $\vartheta>0$.

As described above, the GSMCFO method applied to the GSC control of the HMS 100 includes calculation of the FOSM surfaces $\zeta_6(t)$, the control law elements $u_6^{cnt}(t)$ including a fractional time integral and a fractional time differentiation of the tracking errors $e_6$. The controller is configured to i) monitor a status of the HMS, including the characteristics element $c_6$ defined and specified in the definition set as the battery current $I_b$, ii) calculate the control law elements $u_6^{cnt}(t)=D^{cnt}(t)$, defined with the specific equation for the duty ratio of the BBBC 112, referring the definition set in the preinstalled software and based on monitored status of the HMS, and iii) control the BBBC 112 by applying the control law element $u_6^{cnt}(t)=D^{cnt}(t)$ calculated, when the tracking error is perceived. The control law element guarantees the characteristic element $c_6$, that is, the battery current $I_b$ effectively arrive and stay on the FOSM surfaces $\zeta_6(t)$ in the presence of external disturbances, parametric perturbation, and unknown dynamics.

Applying the GSMCFO method and the control law elements $u_6^{cnt}(t)$ by the controller 120 realizes a condition:

$$\zeta_6(t)\frac{d\zeta_6(t)}{dt} < 0,$$

as far as $\zeta_6(t)$ is nonzero, as discussed earlier. Whenever the condition is satisfied, it is an indication that the characteristics element $c_6$, that is, the battery current $I_b$ is approaching the FOSM surface $\zeta_6(t)$ and sliding along the FOSM surface toward a global stabilized point satisfying $$\zeta_6(t) = \frac{d\zeta_6(t)}{dt} = 0.$$

The control law element guarantees $I_b$ to effectively arrive and stay on the sliding mode surface $\zeta_6(t)$ in the presence of external disturbances, parametric perturbation, and unknown dynamics.

In some implementations according to certain embodiments, the signum functions $SG(\zeta_i(t))$ in the control law elements $u_i^{cnt}(t)$ are selected as hyperbolic tangent functions $\tanh(\zeta_i/\theta)$, where $\theta(>0)$ is a constant. This is effective to avoid a chattering that may be caused due to a high frequency switching of the discontinuous function $\text{sgn}(\zeta_i(i))$. In such case, the modified control law elements would be as below:

$$V_{qs} = V_{qs\_eqv} - \frac{1}{a}\left[\varrho_1^R\mathcal{J}_t^{1-\mu}\tanh\left(\frac{\zeta_1}{\vartheta}\right)|\zeta_1(t)|^\alpha + \gamma_1^R\mathcal{J}_r^{1-\mu}\zeta_1(t)\right], \quad (82)$$

$$V_{ds} = V_{ds\_eqv} - L_d\left[\varrho_2^R\mathcal{J}_t^{1-\mu}\tanh\left(\frac{\zeta_2}{\vartheta}\right)|\zeta_2(t)|^\alpha + \gamma_2^R\mathcal{J}_r^{1-\mu}\zeta_2(t)\right], \quad (83)$$

$$I_d = I_{d\_eqv} + \frac{2}{3}\frac{C_{dc}V_{dc}}{V_d}\left[\varrho_3\mathcal{J}_r^{1-\mu}\tanh\left(\frac{\zeta_3}{\theta}\right)|\zeta_3(t)|^\alpha + \gamma_3\mathcal{J}_r^{1-\mu}\zeta_3(t)\right], \quad (84)$$

$$V_d = V_{d\_eqv} - L_f\left[\varrho_4^R\mathcal{J}_t^{1-\mu}\tanh\left(\frac{\zeta_4}{\theta}\right)|\zeta_4(t)|^\alpha + \gamma_4^R\mathcal{J}_r^{1-\mu}\zeta_4(t)\right], \quad (85)$$

$$V_q = V_{q\_eqv} - L_f\left[\varrho_5^R\mathcal{J}_t^{1-\mu}\tanh\left(\frac{\zeta_5}{\theta}\right)|\zeta_5(t)|^\alpha + \gamma_5^R\mathcal{J}_r^{1-\mu}\zeta_5(t)\right], \quad (86)$$

$$D = D_{eqv} - L_b\left[\varrho_6^R\mathcal{J}_r^{1-\mu}\tanh\left(\frac{\zeta_6}{\vartheta}\right)|\zeta_6(t)|^\alpha + \gamma_6^R\mathcal{J}_t^{1-\mu}\zeta_6(t)\right]. \quad (87)$$

Here, a mathematical proof is described on a point that the GSMCFO method described above guarantees all states' trajectories converge to the sliding-mode surfaces $\zeta_i=0$, $(i=1,2,\ldots,6)$ within a finite time.

A Lyapunov function candidate is selected as:

$$L = \frac{\zeta_1^2(t)}{2} + \frac{\zeta_2^2(t)}{2} + \frac{\zeta_3^2(t)}{2} + \frac{\zeta_4^2(t)}{2} + \frac{\zeta_5^2(t)}{2} + \frac{\zeta_6^2(t)}{2}. \quad (88)$$

Differentiating L with respect to time gives:

$$\dot{L} = \sum_{i=1}^{6}\zeta_i(t)\dot{\zeta}_i(t) = \sum_{i=1}^{6}\zeta_i(t)^R\mathcal{D}_t^{1-\mu}({}^R\mathcal{D}_t^\mu\zeta_i(t)). \quad (89)$$

Substituting (77)-(82) into (84), one obtains:

$$\dot{L} = \sum_{i=1}^{6}\zeta_i(t)^R\mathcal{D}_t^{1-\mu}\left(\begin{array}{c}\frac{1}{L_f}(H_i - {}^R\mathcal{J}_t^{1-\mu}\delta_i) \\ -\varrho_i^R\mathcal{J}_t^{1-\mu}\tanh\left(\frac{\zeta_i}{\theta}\right)|\zeta_i(t)|^\alpha - \gamma_i^R\mathcal{J}_t^{1-\mu}\zeta_i(t)\end{array}\right) = \quad (90)$$

$$\sum_{i=1}^{6}\zeta_i\left(\begin{array}{c}\frac{1}{L_f}({}^R\mathcal{D}_t^{1-\mu}H_i - \delta_i) \\ -\varrho_i f\tanh\left(\frac{\zeta_i}{\theta}\right)|\zeta_i(t)|^\alpha - \gamma_i\zeta_i(t)\end{array}\right) =$$

$$\sum_{i=1}^{6}\left(\begin{array}{c}\frac{1}{L_f}\zeta_i({}^R\mathcal{D}_t^{1-\mu}H_i - \delta_i) \\ -\varrho_i\tanh\left(\frac{\zeta_i}{\vartheta}\right)|\zeta_i(t)|^{\alpha+1} - \gamma_i\zeta_i^2(t)\end{array}\right).$$

Based on assumptions, $\|^R\mathcal{D}_t^{1-\mu} H_i\| \leq \delta_i$, (i=1, 6) we have:

$$\dot{L} \leq -\sum_{i=1}^{6} \rho_i \left|\tanh\left(\frac{\zeta_i}{\theta}\right)\right| |\zeta_i(t)|^{\alpha+1} - \sum_{i=1}^{6} \gamma_i |\zeta_i(t)|^2; \quad (91)$$

Therefore, we obtain:

$$\dot{L} = \sum_{i=1}^{6} \zeta_i(t)\dot{\zeta}_i(t) \leq -\sum_{i=1}^{6} \varrho_i \|\zeta_i(t)\|_2^{\alpha+1} - \sum_{i=1}^{6} \gamma_i |\zeta_i(t)|^2 \leq 0. \quad (92)$$

Consequently, it can be concluded that all the states' trajectories will converge to their respective sliding-mode surfaces $\zeta_i=0$, (i=1, 2, ..., 6).

Further a convergence time of the states' trajectories is finite as described below. From (87) and with a definition of norm, $$\|\zeta_i(t)\|_2 = \left[\sum_{i=1}^{6} |\zeta_i(t)|^2\right]^{\frac{1}{2}} = (2L)^{\frac{1}{2}},$$

one has:

$$\frac{dL}{dt} \leq -\varrho_i(2L)^{\frac{\alpha+1}{2}} - \gamma_i(2L); \quad (93)$$

Rearranging (88) yields:

$$dt \leq -\frac{dL}{\varrho_i(2L)^{\frac{\alpha+1}{2}} + \gamma_i(2L)} = \quad (94)$$

$$-\frac{1}{2}\frac{(2L)^{-\frac{1}{2}}d(2L)}{\varrho_i(2L)^{\frac{\alpha}{2}} + \gamma_i(2L)^{\frac{1}{2}}} \leq -\frac{d(2L)^{\frac{1}{2}}}{\varrho_i(2L)^{\frac{\alpha}{2}} + \gamma_i(2L)^{\frac{1}{2}}} =$$

$$-\frac{d\|\zeta_i(t)\|_2}{\varrho_i\|\zeta_i(t)\|_2^\alpha + \gamma_i\|\zeta_i(t)\|_2} \leq$$

$$-\frac{\|\zeta_i(t)\|_2^{-\alpha}d\|\zeta_i(t)\|_2}{\varrho_i + \gamma_i\|\zeta_i(t)\|_2^{1-\alpha}} \leq -\frac{1}{\gamma_i(1-\alpha)}\frac{d(\gamma_i\|\zeta_i(t)\|_2^{1-\alpha})}{\varrho_i + \gamma_i\|\zeta_i(t)\|_2^{1-\alpha}}.$$

Integrating both sides of (89) from zero to $t_r$ yields:

$$t_r - 0 \leq -\frac{1}{\gamma_i(1-\alpha)}\int_0^{t_r} \frac{d(\gamma_i\|\zeta_i(t)\|_2^{1-\alpha})}{\rho_i + \gamma_i\|\zeta_i(t)\|_2^{1-\alpha}} \leq \quad (95)$$

$$-\frac{1}{\gamma_i(1-\alpha)}\ln(\varrho_i + \gamma_i\|\zeta_i(t)\|_2^{1-\alpha})\Big|_0^{t_r} \leq \frac{1}{\gamma_i(1-\alpha)}\ln\left(1 + \frac{\gamma_i}{\varrho_i}\|\zeta_i(0)\|_2^{1-\alpha}\right).$$

Eq. (90) indicates that the states' 'rajectories arrive at their respective sliding manifolds $\zeta_i=0$, (i=1, 2, ..., 6) within a finite time $T_r$ given by:

$$T_r = t_r - 0 \leq \frac{1}{\gamma_i(1-\alpha)}\ln\left(1 + \frac{\gamma_i}{\varrho_i}\|\zeta_i(0)\|_2^{1-\alpha}\right). \quad (96)$$

Power balancing Operations of the HMS

As noted above, the controller of the HMS 100 is configured to satisfy the power balance condition given by Eq. (67), $$P_{re} + P_{ug} = P_{dem} + P_b, \quad (97)$$

where, $P_{re}(\geq 0)$ is a sum of powers from renewable energy sources, $P_{ug}$, a power provided from the utility grid, $P_{dem}$ ($\geq 0$), a load demand, and a battery power $P_b$.

As a measure for the power balance, a power imbalance $\Delta P$ of the HMS 100 is defined as, $$\Delta P = P_{re} + P_{ug} - P_{dem} - P_b. \quad (98)$$

Thus, the controller is configured to monitor each on the components of the power imbalance and to realize and maintain the balancing condition, alternatively given as, $$\Delta P = 0. \quad (99)$$

Here, the power $P_{re}$ from the renewable energy sources and the load demand $P_{dem}$ are deemed not adjustable in ordinary cases. The WT generator and the PV system are operated under the MPPT modes in normal situations. The load demand P dem is also assumed non-negotiable. On the other hand, the battery power $P_b$ and the grid power $P_{ug}$ are assumed adjustable in both directions, that is, either providing to the load to offset a shortage, or receiving an excess from the HMS.

The controller of the HMS is configured to monitor each of the components of the power imbalance equation and a value of the power imbalance $\Delta P$. When the power $P_{re}$ from the renewable energy sources fluctuates as conventionally occurs, the controller is configured to realize and maintain the power balance condition $\Delta P=0$, by adjusting the battery power $P_b$ and the grid power $P_{ug}$.

In controlling the battery power, the controller is configured to satisfy a restriction condition on a state of charge (SOC) of the BESS for a reliability purpose, given as, $$SOC^{min} \leq SOC \leq SOC^{max}. \quad (100)$$

When the SOC reaches the maximum value while maintaining the power balance condition by providing the $P_b$ to the BESS, a power imbalance $\Delta P$ is caused when the charging is stopped to be $P_b=0$. In that instance, the imbalance, that is, an excess energy can be absorbed by the grid power $P_{ug}$. When the utility grid was supplying a larger amount than the excess energy $\Delta P$, the grid power is reduced to absorb the excess energy. The utility grid can receive the excess energy without supplying the grid power ($P_{ug}<0$). Some examples for the power balancing operations of the controller are described below.

Case 1: When the power of the PV system 110 is decreased whereas the power due to the WT 102 is constant.

Suppose initially the PV system 110 is generating the 100 KW of power, the WT generator 102 is generating 70 KW of power and the grid 130 is providing 200 KW of power at a load demand at 350 KW, where the battery power is zero.

The power imbalance is calculated $$\Delta P = P_{re} + P_{ug} - P_{dem} - P_b = 170 + 200 - 350 - 0 = 20 \quad (KW)$$

Hence, the surplus 20KW is used to charge the BESS 114 via the BBBC 112. Accordingly, the controller 120 signals the BBBC 112 to start operating in the buck mode. ($P_b=20$ KW) By this operation, the imbalance is reduced to zero. ($\Delta P=0$)

Suppose the PV system 110 is now producing smaller amount of power, for example only 80 KW for 10 seconds. Decrease in the power may be due to cloudy environment. During this period, the power imbalance turns to $\Delta P=-20$ KW. At this initial instance, the controller immediately stops the battery power 20 KW providing to charge the BESS via the BBBC.

After 10$^{th}$ second, when the PV system 110 again starts generating 100 KW of power, the controller 120 again signals the BBBC 112 to start charging the BESS at 20 KW in the boost mode. ($P_b$=20 KW)

Case 2: When the power of the PV system 110 is decreased whereas the power due to the WT generator 102 is constant and the grid 130 injects power Suppose initially same situation as the Case 1; $\Delta P = P_{re} + P_{ug} - P_{dem} - P_b = 170 + 200 - 350 - 0 = 20$ (KW), the power imbalance $\Delta P = 20$ (KW) is balanced by charging the BESS 114 via the BBBC 112. ($P_b$=20 KW) Now, suppose the PV system 110 reduces its generation to a half (50 KW) for 10 seconds. Decrease in the power may be due to cloudy environment. The reduction causes the power imbalance of $\Delta P = -50$ KW.

At this time, the controller immediately signals the BBBC 112 to stop charging ($P_b$: 20 KW to 0) and start discharging the BESS 114 $P_b = -30$ KW to realize the power balance condition. ($\Delta P = -50 + 20 + 30 = 0$)

Suppose further, the SOC of the BESS 114 reaches to the $SOC^{min}$ within 7 seconds, the controller 120 signals the BBBC 112 to stop discharging. At this moment, the controller 120 signals the grid 130 to start supplying an additional 30 KW, a total of 230 KW power to the load in the HMS 100 to meet the power balance requirement. The grid 130 starts supplying the 15 power.

After 10$^{th}$ second the PV system 110 again starts generating 100 KW of power. At this moment, the controller signals the grid 130 to stop injecting the additional 30 KW of power to the HMS 100. Also, the controller 120 again signals the BBBC 112 to start charging the BESS at 20 KW.

Case 3: The SOC of the BESS reaches to the maximum value $SOC^{max}$, while the power of the PV system 110 as well as one of the WT generator 102 are unchanged, then the grid absorbs the excess power Suppose initially the same situation as of the Case 1; $\Delta P = P_{re} + P_{ug} - P_{dem} - P_b = 170 + 200 - 350 - 0 = 20$ (KW), the power imbalance $\Delta P = 20$ (KW) is balanced by charging the BESS 114 via the BBBC 112. ($P_b$=20 KW).

Suppose then at the 11$^{th}$ second, the BESS reaches the condition SOC=$SOC_{max}$. Then, the controller immediately stops charging the BESS, and signals the grid 130 to start absorbing the excess power. Accordingly, the grid 130 starts absorbing the excess power, that is, 20 KW, thus reduces the grid power from 200 KW to 180 KW. The power is balanced in the HMS 100.

Tracking Performances: Simulation Results

Tracking performances of the HMS 100 controlled by the GSMCFO method under circumstance changes are described below. The configuration of the HMS 100 above described was implemented in MATLAB/SIMULINK. Design parameters and their values assumed for components including the WT 102, the PMSG 104, the PV system 110, the BESS 114 and the grid 130 are summarized in Tables 1 and 2. Control parameters for the GSMCFO-method are provided in Table 3. Simulation results obtained for four scenarios are described.

TABLE 1

Parameters of the renewable generation system.

| Wind Turbine Generator | | | Solar PV Generator | | |
|---|---|---|---|---|---|
| Parameter | Symbol | Value | Parameter | Symbol | Value |
| Air density (kg/m$^3$) | $\rho$ | 1.25 | Ambient temperature (C.) | T | 25 |

TABLE 1-continued

Parameters of the renewable generation system.

| Wind Turbine Generator | | | Solar PV Generator | | |
|---|---|---|---|---|---|
| Parameter | Symbol | Value | Parameter | Symbol | Value |
| Radius of wind turbine (m) | R | 28.2 | | | |
| d-axis stator current (mH) | $L_{ds}$ | 9.8 | p-n junction factor | A | 1.8 |
| q-axis stator current (mH) | $L_{qs}$ | 9.8 | Equivalent shunt resistor ($\Omega$) | $R_{sh}$ | 313.33 |
| Rotor flux (Wb) | $\Lambda_r$ | 28 | Equivalent series resistor ($\Omega$) | $R_{se}$ | 0.193 |
| Inertia of mechanical shaft (Kg · m$^2$) | J | 4000 | Short-circuit current (A) | $I_{sc}$ | 2.8 |
| Number of pole pairs | P | 8 | Number of parallel modules | $N_s$ | 68 |
| Optimum tip speed ratio | $\Lambda_{opt}$ | 8.1 | Number of series modules | $N_p$ | 95 |
| Power coefficient | $C_p^{max}$ | 0.48 | Open-circuit voltage (V) | $V_{oc}$ | 32.9 |
| Rated wind generator power (MW) | $P_w$ | 2 | Rated PV power (MW) voltage (V) | $P_{pv}$ | 1 |

TABLE 2

Grid and energy storage parameters

| Battery Energy Storage System | | | Grid Parameter | | |
|---|---|---|---|---|---|
| Parameter | Symbol | Value | Parameter | Symbol | Value |
| Battery efficiency | $\eta_b$ | 0.9 | Filter inductance (mH) | $L_f$ | 16.9 |
| Battery capacity (AH) | $Q_b$ | 1000 | Line inductance (mH) | $L_g$ | 1.69 |
| Rated battery power (MW) | $P_b$ | 1 | Load demand (MW) | $P_l$ | 2 |
| Battery voltage (V) | $V_b$ | 550 | Line-to-line voltage (V) | $U_{ll}$ | 1000 |
| Upper SOC limit (%) | $SOC^{max}$ | 90 | DC-bus capacitance ($\mu$F) | $C_{dc}$ | 1670 |
| Lower SOC limit (%) | $SOC^{min}$ | 20 | | | |

TABLE 3

Control system parameters.

| Parameters | Values | Parameters | Values |
|---|---|---|---|
| $k_1$ | 0.0117 | $k_4$ | 0.0847 |
| $k_2$ | 0.0240 | $k_5$ | 0.0106 |
| $k_3$ | 0.1342 | $k_6$ | 0.2302 |
| $\varrho_1$ | 1.3239 | $\varrho_4$ | 5.6694 |
| $\varrho_2$ | 0.7009 | $\varrho_5$ | 2.0982 |
| $\varrho_3$ | 11.3652 | $\varrho_6$ | 15.7501 |
| $\gamma_1$ | 12.3794 | $\gamma_4$ | 25.0214 |

TABLE 3-continued

Control system parameters.

| Parameters | Values | Parameters | Values |
|---|---|---|---|
| $\gamma_2$ | 9.0402 | $\gamma_5$ | 13.0005 |
| $\gamma_3$ | 19.7391 | $\gamma_6$ | 37.4478 |
| $\alpha$ | 0.4 | $\mu$ | 0.8 |

Scenario 1: Power Generation from Solar PV Only

Under Scenario 1, the wind speed is assumed below the cut-in speed and the wind power is not large enough to overcome the mechanical resistance of the wind turbine. On the other hand, irradiance level varies depending on time. Therefore, the renewable power is generated by solar PV alone.

Figure 2A:
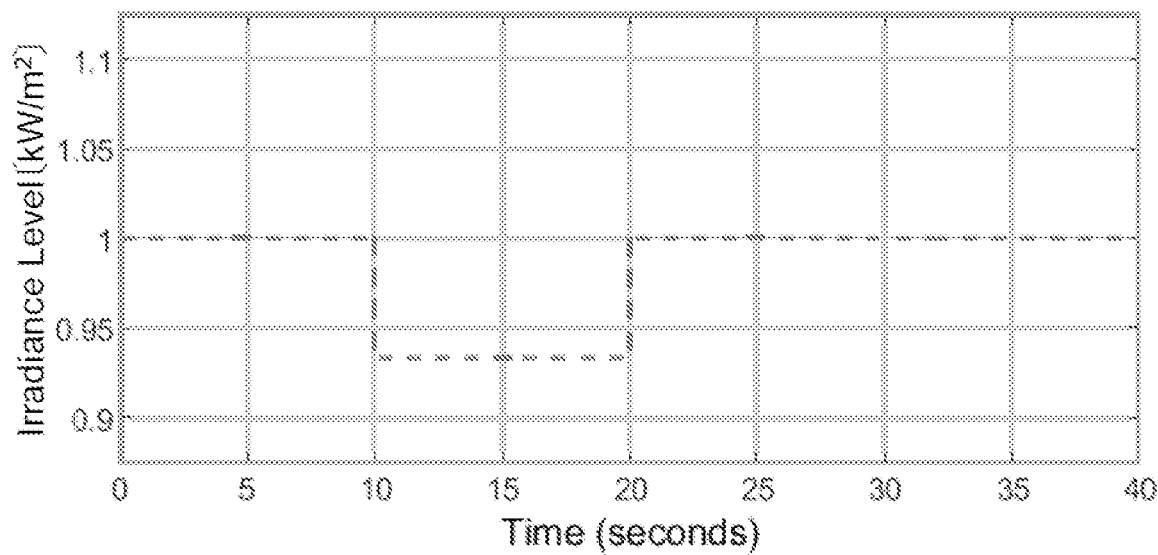
FIG. 2A is an exemplary graph illustrating a variation pattern for a level of ambient irradiance to a hybrid microgrid system according to certain embodiments in Scenario 1.

FIG. 2A is an exemplary graph illustrating a variation pattern in ambient irradiance level in the Scenario 1 for the HMS 100 according to certain embodiments. Here, the wind speed is not illustrated, since it is assumed below the cut-in speed. The irradiance level drops from 1000 W/m$^2$ to 940 W/m$^2$ at t=10 s, due to an intermittent conditions such as cloudy environment, then increases to 1000 W/m$^2$ at t=20 s, respectively. The controller 120 thus set the MPPT voltage of the PV system 110 as the desired voltage $V_{dc}^*$ of the DC-link 132. The total power is only due to the grid 130, BESS 114 and the PV system 110. The controller 120 thus signals the BBBC 112 to start working in the boost mode to support/maintain the power balance in the HMS 100. Therefore, the power of the BESS 114 rises exponentially to a certain level and stays there, for example 0.7W in FIG. 2D for t<=10.

Figure 2B:
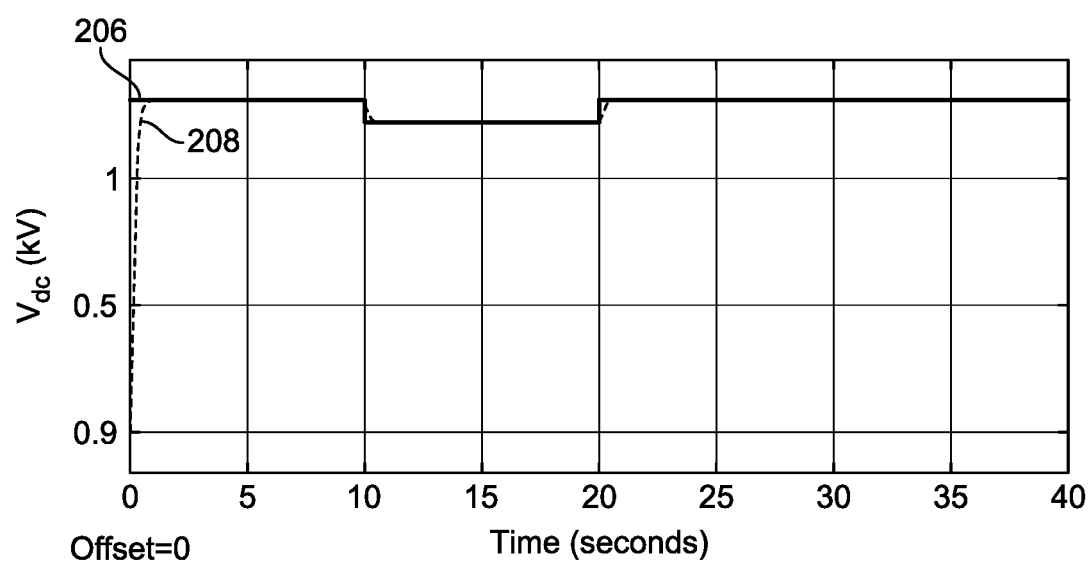
FIG. 2B is an exemplary graph illustrating DC-link voltages of a hybrid microgrid system according to certain embodiments in Scenario 1.

FIG. 2B is an exemplary graph illustrating variations of the DC-link voltages of the HMS 100 in the Scenario 1, according to certain embodiments. A curve 206 represents a desired value ("reference") for the DC-link voltage ($V_{dc}^*$), whereas a curve 208 represents a real time value of DC-link voltage $V_{dc}$. The DC-link voltage $V_{dc}$ decreased for the time interval 10≤t (s) ≤20 as the irradiance level decreased at the same interval as described in FIG. 2A. A transient time of the DC-link voltage $V_{dc}$ observed was less than one second, where no transient overshoot was observed. Those demonstrate a promising tracking performance of the controller 120.

Figure 2C:
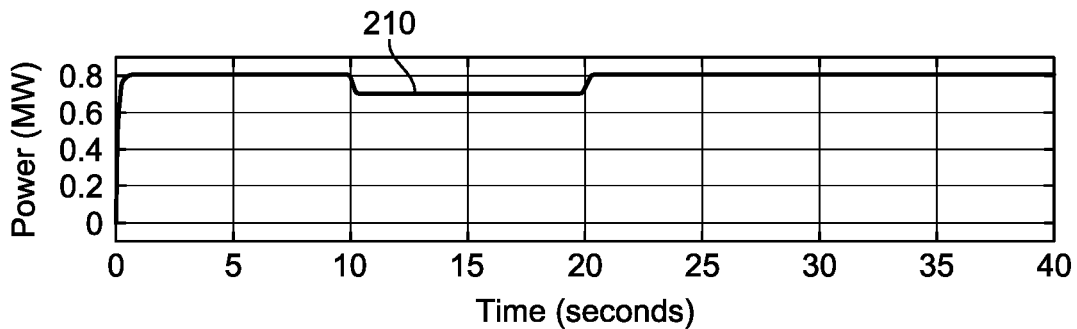
FIG. 2C is an exemplary graph illustrating an output power from a PV system of a hybrid microgrid system according to certain embodiments in Scenario 1.

FIG. 2C is an exemplary graph illustrating an output power 210 from the PV system 110 of the HMS 100 in the Scenario 1 according to certain embodiments. The output power 210 from the PV system decreases for the time interval 10≤t (s)≤20, corresponding to the change of irradiance in FIG. 2A.

Figure 2D:
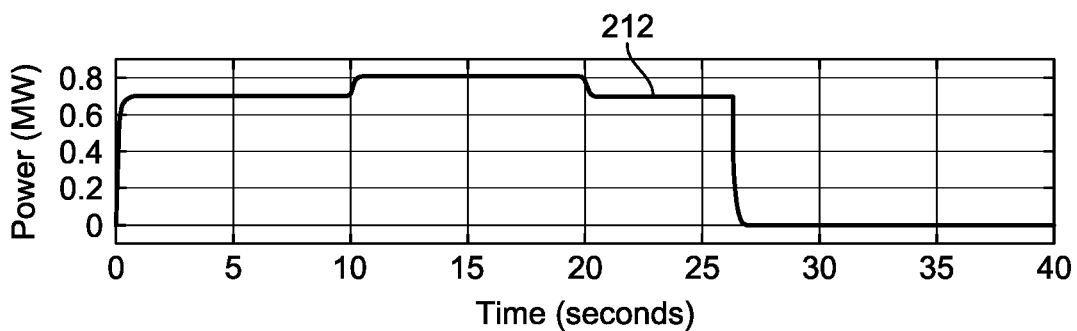
FIG. 2D is an exemplary graph illustrating an output power from a battery energy storage system of a hybrid microgrid system according to certain embodiments in Scenario 1.

FIG. 2D is an exemplary graph illustrating an output power from the BESS 114 of the HMS 100 according to certain embodiments in the Scenario 1. The curve 212 indicates that during the time interval 10≤t (s)≤20, the BESS 114 discharges a more power than its previous power level to balance the load. After this duration, when the output power from the PV system 110 recovers as in FIG. 2C, the BESS 114 reduces the output power to the DC-link 132 at t=20 s as it was operating before t≤10 s. The curve 212 further indicates a sudden decrease at around t =26 s. This is due to a reduction of the SOC of the BESS 114 down to the SOC$^{Min}$, as illustrated in FIG. 2H. At that moment, the BBBC 112 is configured to stop discharging from the BESS 114. The BESS 114 thus stops discharging to the DC-link 132 as it is forbidden to discharge below the SOC$^{Min}$.

Figure 2E:
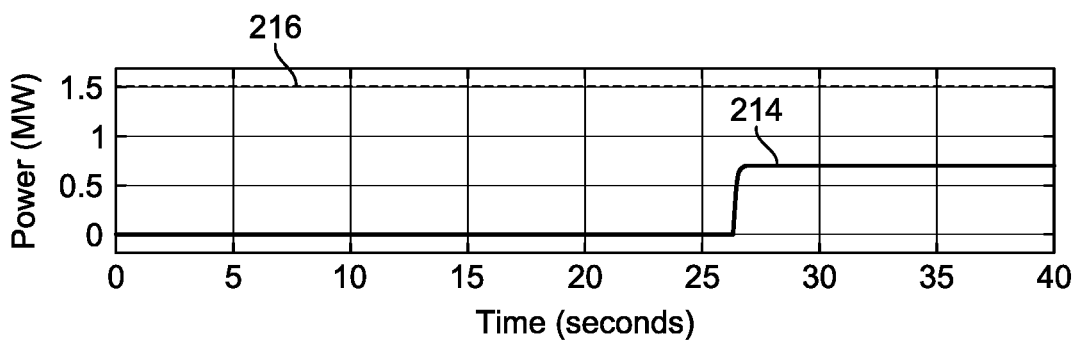
FIG. 2E is an exemplary graph illustrating a grid power supplied from a utility grid and a power demand at a load of a hybrid microgrid system according to certain embodiments in Scenario 1.

FIG. 2E is an exemplary graph illustrating a grid power 214 supplied from the utility grid to the load 126 via the PCC and a power demand 216 at the load 126 of the HMS 100 according to certain embodiments in the Scenario 1. At the same moment that the BESS 114 stops discharging to the DC-link 132, the grid 130 is configured to start sending the grid power 214 to the load 126, in order to support the power balance of the HMS 100. The power demand 216 at the load 126 was assumed to be in a constant level.

Figure 2F:
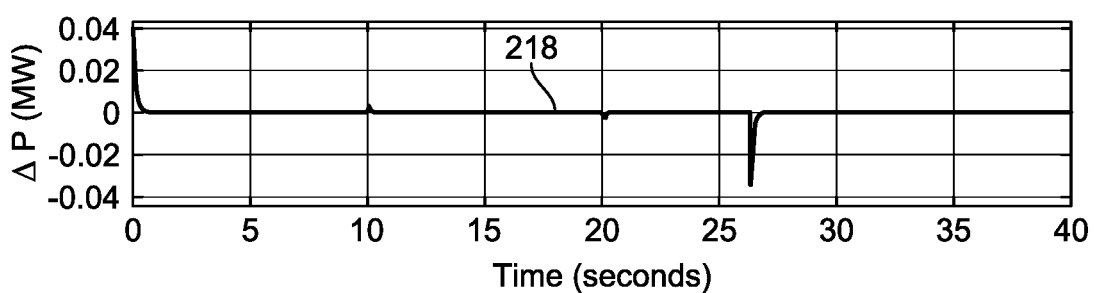
FIG. 2F is an exemplary graph illustrating a power deviation JP of a hybrid microgrid system according to certain embodiments in Scenario 1.

FIG. 2F is an exemplary graph illustrating a power deviation $\Delta P$ 218 of the HMS 100 according to certain embodiments in the Scenario 1. The controller 120 is configured to immediately switch a power sources to a different type of source when required to balance the power in the HMS 100. The power deviation $\Delta P$ is configured to reduce to zero with a short time transient deviation. It is confirmed from FIG. 2F that the power deviation $\Delta P$ 218 due to switching power sources is actually maintained zero with minor transient deviations which vanishes in a short time. The transient deviations observed were with peak values less than 0.04 MW, which is less than about 3% of a sum of switched powers, with no overshoot and a transient time less than about one second.

Figure 2G:
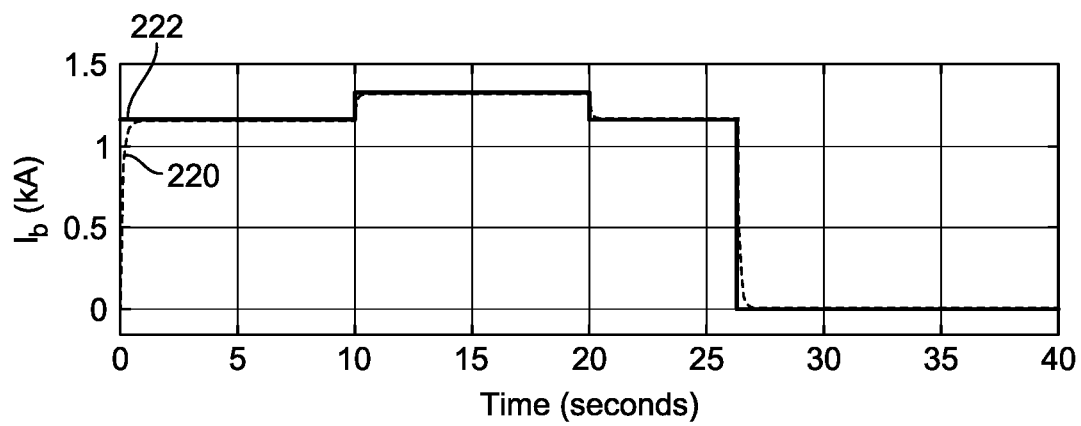
FIG. 2G is an exemplary graph illustrating battery currents provided from a battery energy storage system to DC-link of a hybrid microgrid system according to certain embodiments in Scenario 1.
Figure 2H:
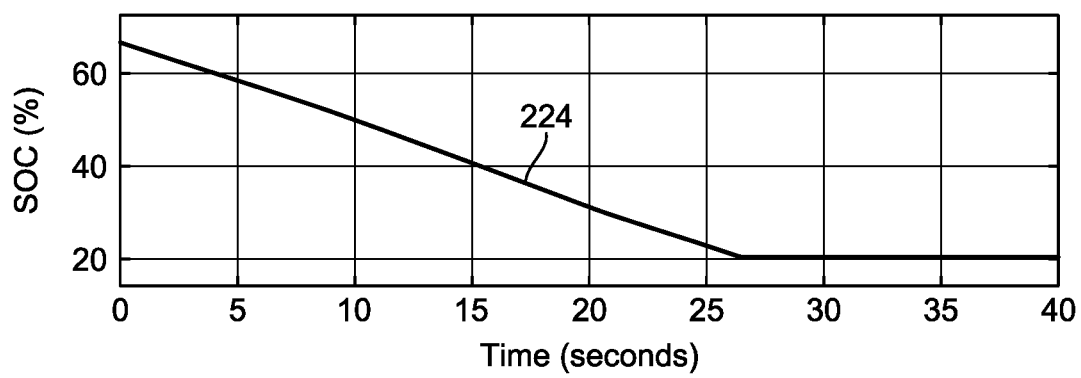
FIG. 2H is an exemplary graph illustrating a state of charge of a battery energy storage system of a hybrid microgrid system according to certain embodiments in Scenario 1.

FIG. 2G is an exemplary graph illustrating the battery current provided from the BESS 114 to the DC-link 132 of the HMS according to certain embodiments in the Scenario 1. The curve 220 represents the actual value and the curve 222 represents the desired value for the battery current discharging from the BESS 114. It is confirmed the actual battery current tracks the desired value exactly with a transient time less than one second and without an overshoot.

FIG. 2H is an exemplary graph illustrating a state of charge (SOC) of the BESS 114 of the HMS 100, according to certain embodiments, in the Scenario 1. During a time period 0≤t (s)≤26, the SOC continues decreasing due to the power supply from the BESS 114 to the load 126 for the power balance of the HMS 100, and at the time t=26 s, the SOC reaches to the SOC$^{Min}$, then the power supply from the BESS is stopped, as illustrated in FIG. 2D. For a time period of 26≤t (s)≤40, the SOC stays at its minimum value of 20%, since the BESS has stopped discharging.

Scenario 2: Power Generation from Wind Only

Figure 3A:
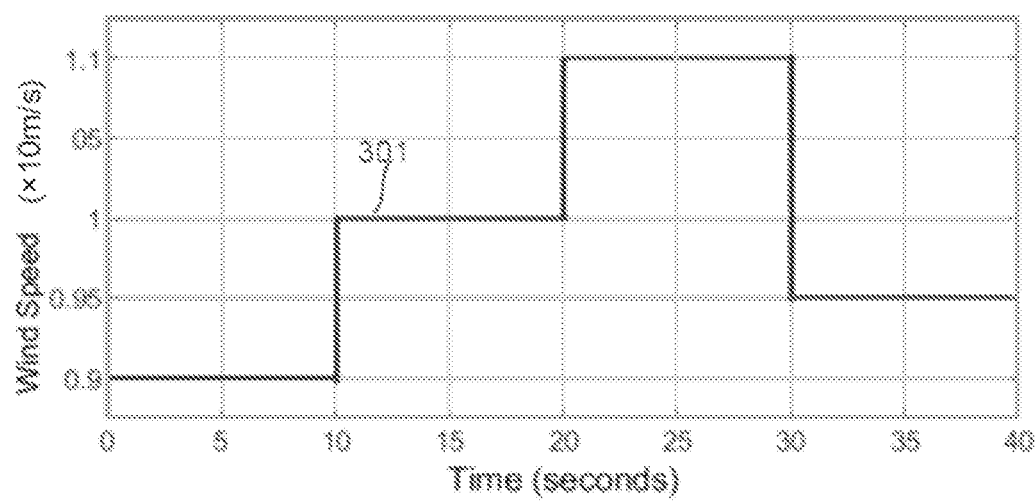
FIG. 3A is an exemplary graph illustrating a variation pattern of wind speed at a hybrid microgrid system according to certain embodiments in Scenario 2.

FIG. 3A is an exemplary graph illustrating a variation pattern of wind speed at the HMS 100 according to certain embodiments in Scenario 2. At night, the PV system 110 does not produce electricity, whereas the wind often blows above the cut in speed. In the Scenario 2, the wind power is the only renewable energy source supplying power to the load 126 with a constant demand. As illustrated in FIG. 3A, the wind speed is assumed to rise from 9 m/s to 10 m/s, further to 11 m/s, and then to decrease to 9.5 m/s at t=10 s, 20 s, and at 30 s, respectively. Thus, a variation range of about ±10% was assumed for the wind speed.

Figure 3B:
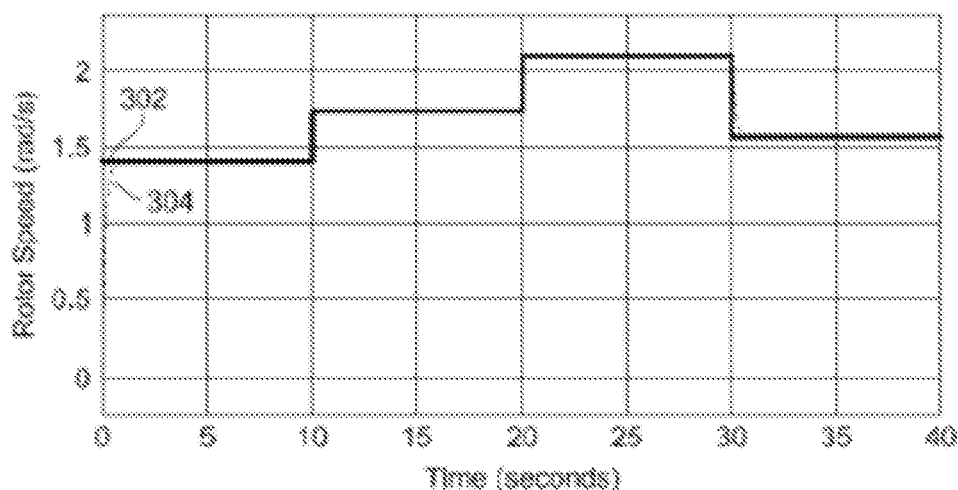
FIG. 3B is an exemplary graph illustrating rotor speeds of an electric generator of a hybrid microgrid system according to certain embodiments in Scenario 2.

FIG. 3B is an exemplary graph illustrating the rotor speed of the electric generator (PMSG) in the HMS 100 according to certain embodiments in the Scenario 2. The solid line 302 represents a desired value of the rotor speed, whereas the dashed line 304, an observed rotor speed. It is confirmed that both of the solid line 302 and the dashed lines 304 track the wind speed variation with stability, with no transient time for the desired value 302 and with transient times of the observed rotor speed 304 less than a second, but without any overshoot. FIG. 3B demonstrates a promising tracking performance of the controller of the HMS observed for the rotor speed when the wind speed varies.

Figure 3C:
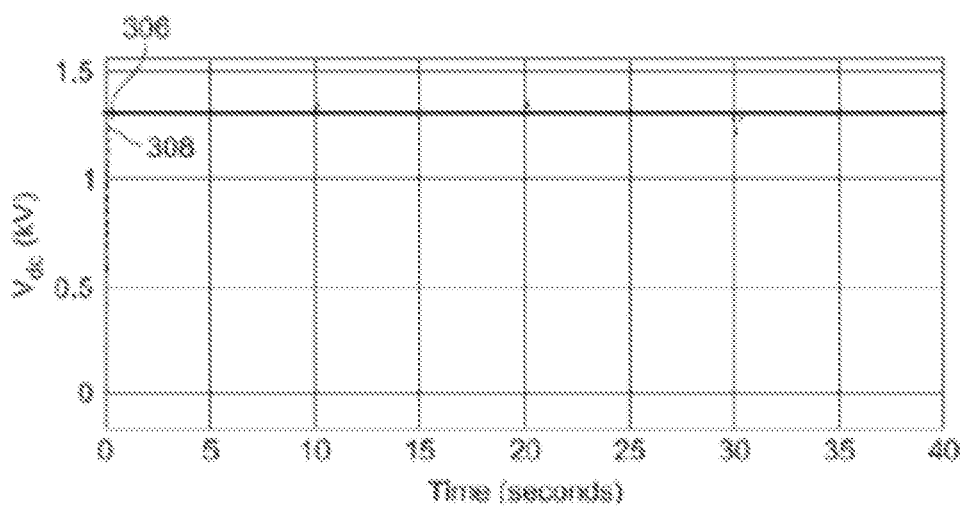
FIG. 3C is an exemplary graph illustrating DC-link voltages $V_{dc}$ of a hybrid microgrid system according to certain embodiments in Scenario 2.

FIG. 3C is an exemplary graph illustrating the DC-link voltages $V_{dc}$ of the HMS 100 according to certain embodiments in the Scenario 2. The solid line 306 represents the desired value ("reference") voltage $V_{dc}*$ of the DC-link 132, whereas the dashed line 308, the observed voltage $V_{dc}$ of the DC-link 132. Despite the ±10% variation of the wind speed, the observed voltage $V_{dc}$ of the DC-link 132 is regulated to the desired value ("reference") voltage $V_{dc}*$. Transition noises peaks are observed in the observed voltage $V_{dc}$, with peak values less than about 10% of the $V_{dc}$, and half-widths less than one second. transients.

Figure 3D:
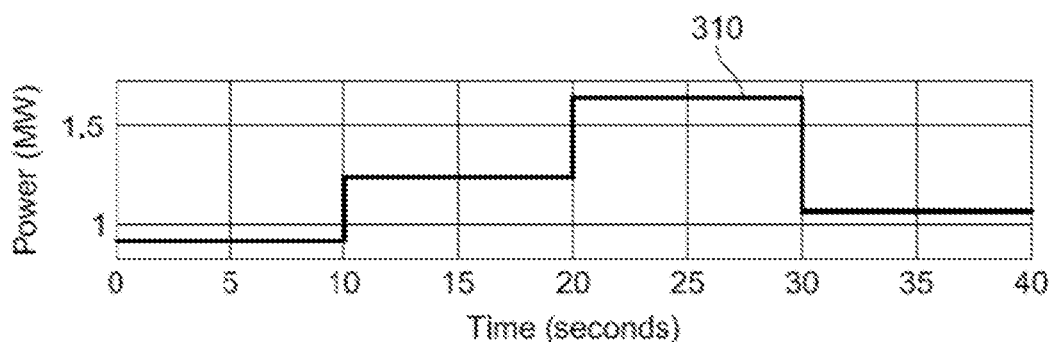
FIG. 3D is an exemplary graph illustrating a power generated from a wind turbine generator of a hybrid microgrid system according to certain embodiments in Scenario 2.

FIG. 3D is an exemplary graph illustrating a power generated from the WT generator 102 and 104 of the HMS 100 according to certain embodiments, in the Scenario 2. Solid line 310 represents wind associated power ("Wind power") generated from the WT 102 and the PMSG 104. FIG. 3D demonstrates that the Wind power tracks the variation of the wind speed in real time with negligible delay.

Figure 3E:
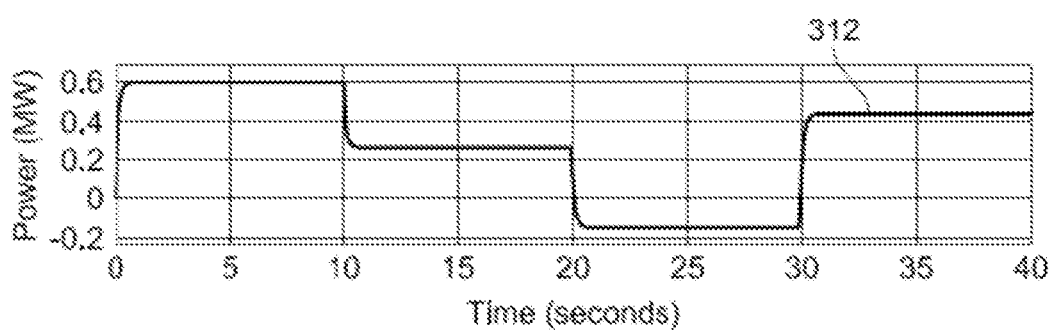
FIG. 3E is an exemplary graph illustrating a battery power generated from or provided to a battery energy storage system of a hybrid microgrid system according to certain embodiments in Scenario 2.

FIG. 3E is an exemplary graph illustrating a power generated from or provided to the BESS 114 of the HMS 100 according to certain embodiments in the Scenario 2. Here, a power flow direction discharging from the BESS is taken as positive in FIG. 3E. FIG. 3E demonstrates that the BESS 114 is configured to fill in gaps when a Wind power is smaller than a power demand at the load 126 by discharging a power from the BESS, and also when a Wind power exceeds the power demand by receiving a redundant amount for charging the BESS. FIG. 3E also demonstrates that transitions between different discharging/charging powers of the BESS occurs with transient time less than a second and without any overshoot.

Figure 3F:
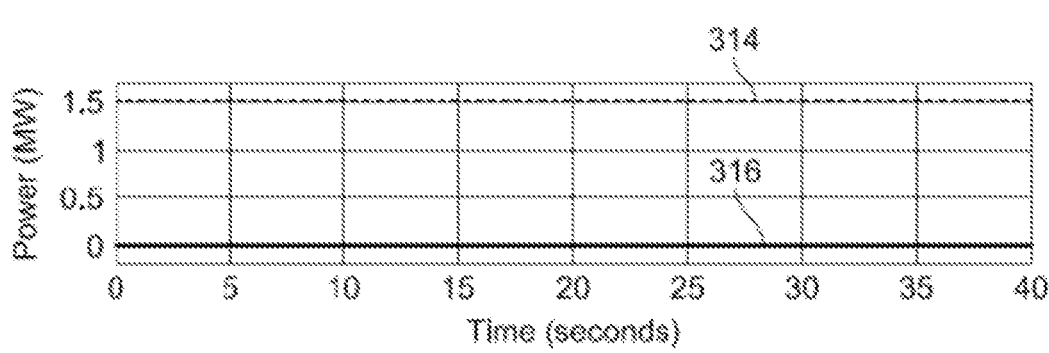
FIG. 3F is an exemplary graph illustrating a load demand and a grid power of a hybrid microgrid system according to certain embodiments in Scenario 2.

FIG. 3F is an exemplary graph illustrating a power demand at the load ("load demand") and the grid power in the HMS in the Scenario 2, according to certain embodiments. Dashed line 314 represents the load demand, solid line 316, the power supplied to the load 126 from the grid 130. The dashed line 314 indicates the power demand at the load 126 remained constant. The solid line 316 indicates the gird 130 exchanged no power between the PCC 128, since the BESS 114 could fill in the gaps within its allowable SOC range, as discussed later in FIG. 3I.

Figure 3G:
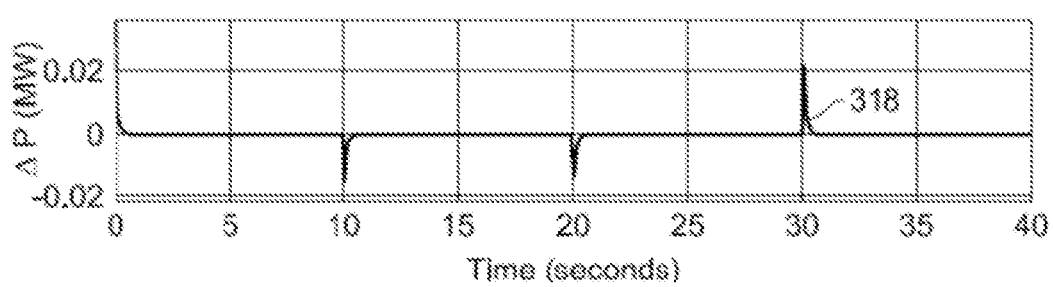
FIG. 3G is an exemplary graph illustrating a power deviation of a hybrid microgrid system according to certain embodiments in Scenario 2.

FIG. 3G is an exemplary illustration of a power deviation of the HMS 100, according to certain embodiments in the Scenario 2. The power deviation (ΔP) remained zero except for transient peaks observed when a transition of the wind speed and hence transition of the Battery power and the Wind power occurred. Peak values of the transient peaks were with less than about 0.02 MW, corresponding to less than about 5% of power transition amount in the Wind power or in the Battery power, while half widths of the transition peaks were enough shorter than a second.

Figure 3H:
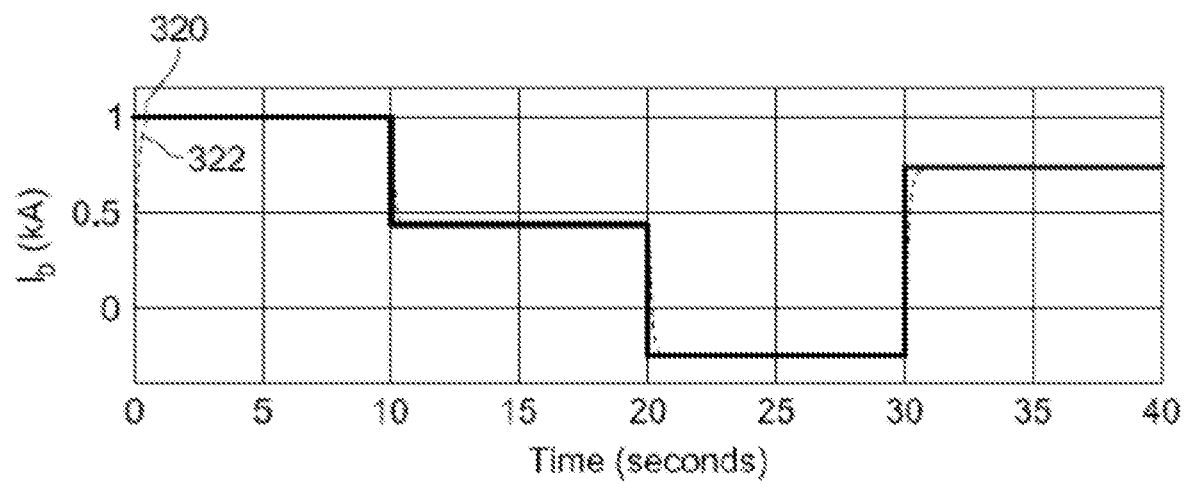
FIG. 3H is an exemplary graph illustrating a battery current of a battery energy storage system of a hybrid microgrid system according to certain embodiments in Scenario 2.

FIG. 3H is an exemplary illustration of a battery current of the BESS 114 in the HMS 100 according to certain embodiments in the Scenario 2. Solid line 320 represents the desired value ("reference") for the current through the BESS 114, dashed line 322, observed current through the BESS 114. It is confirmed that the observed battery current 322 tracks closely the desired value 320 with transient time less than a second.

Figure 3I:
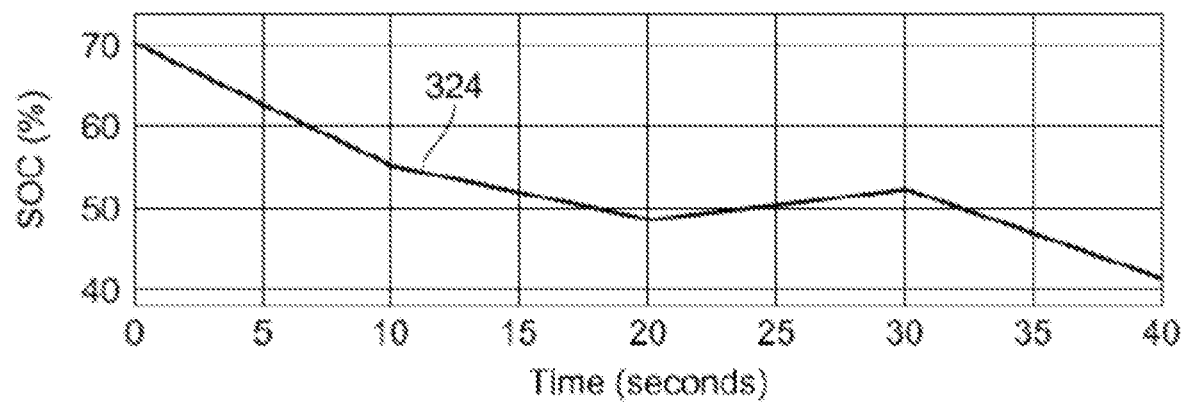
FIG. 3I is an exemplary graph illustrating a state-of-charge (SOC) of a battery energy storage system of a hybrid microgrid system according to certain embodiments in Scenario 2.

FIG. 3I is an exemplary illustration of the SOC of the BESS 114 in the HMS 110, according to certain embodiments in the Scenario 2. It is confirmed that the SOC 324 decreases whenever the BESS 114 supplies the battery power to the load 126, whereas the SOC increases whenever the BESS 114 is constantly receiving power from the other sources of the HMS.

Scenario 3: Power Generation from both Wind and PV System

Figure 4A:
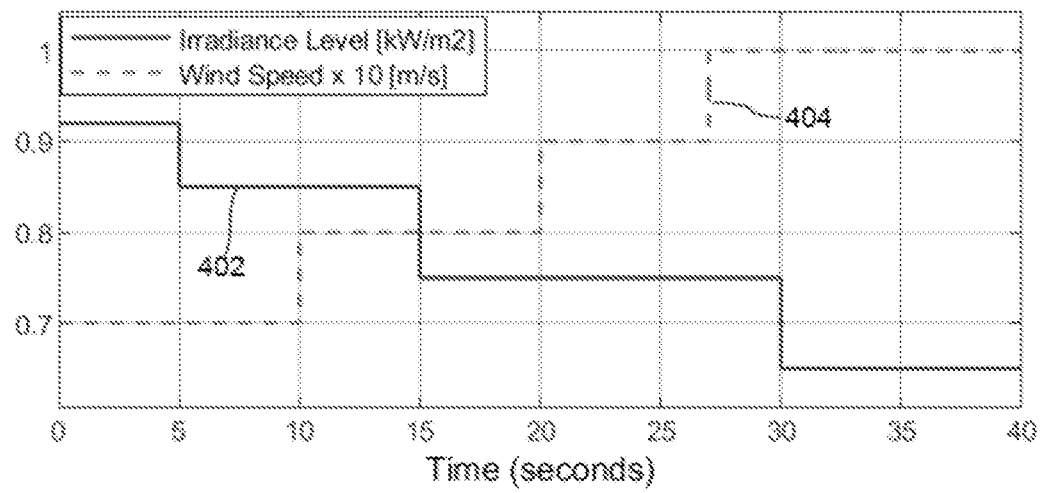
FIG. 4A is an exemplary graph illustrating solar irradiance level and wind speed at a hybrid microgrid system according to certain embodiments in Scenario 3.

Here, complementary property of the solar and wind power sources was examined. FIG. 4A is an exemplary graph illustrating a solar irradiance level and a wind speed at the HMS according to certain embodiments assumed in the Scenario 3.

Solid line 402 and dashed line 404 each represents a solar irradiance level (in kW/m$^2$) and a wind speed (in 10 m/s), respectively. For a time period 0≤t (s)≤5, the solar irradiance level 402 is still high, and the wind speed is above cut-off. From t=5 s, the solar irradiance starts decreasing. While, the wind speed starts increasing from t=10 s.

Figure 4B:
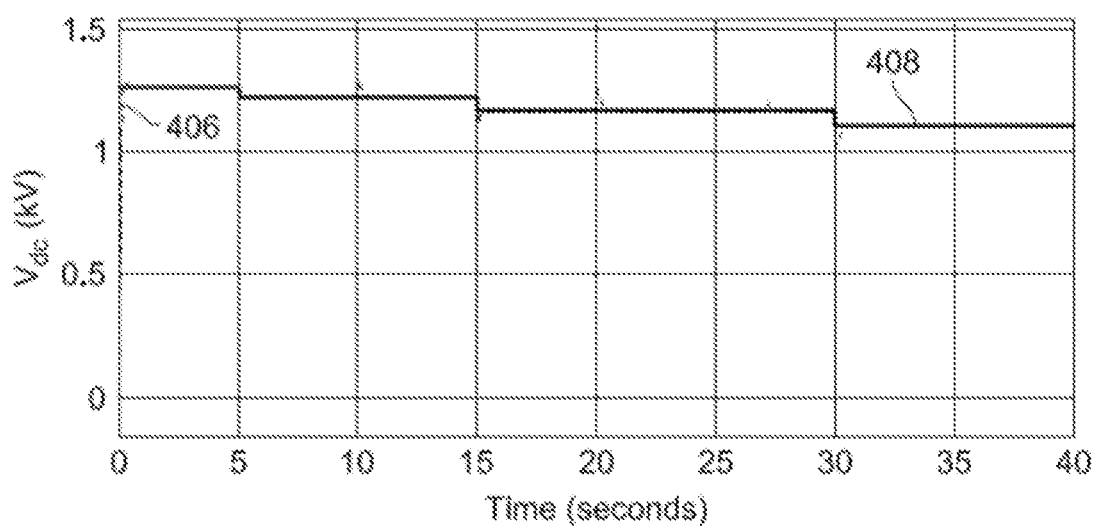
FIG. 4B is an exemplary graph illustrating DC-link voltages of a hybrid microgrid system according to certain embodiments in Scenario 3.

FIG. 4B is an exemplary graph illustrating the DC-link voltages of the HMS 100, according to certain embodiments in the Scenario 3. Dotted line 406 represents an observed value $V_{dc}$ of the DC-link voltage, whereas solid line 408, a desired value ("reference") of the DC-link voltage $V_{dc}*$. Since the MPPT voltage of the PV system $V_{pv}^{MPPT}$ is not below the minimum allowable voltage of the DC-link 132 as for the solar irradiance level 402 in FIG. 4A, the MPPT voltage $V_{pv}^{MPPT}$ was set as the desired "reference" voltage of the DC-link voltage $V_{dc}*$ 408. FIG. 4B demonstrates that the observed value of the DC-link voltage $V_{dc}$ tracks exactly the "reference" value $V_{dc}*=V_{pv}^{MPPT}$ except for negligible transient peaks observed at power transitions, for example at t=5, 15 and 30 s. The transient peaks are less than about 10% of $V_{dc}$ in peak values and diminish in a shorter time than a second.

Figure 4C:
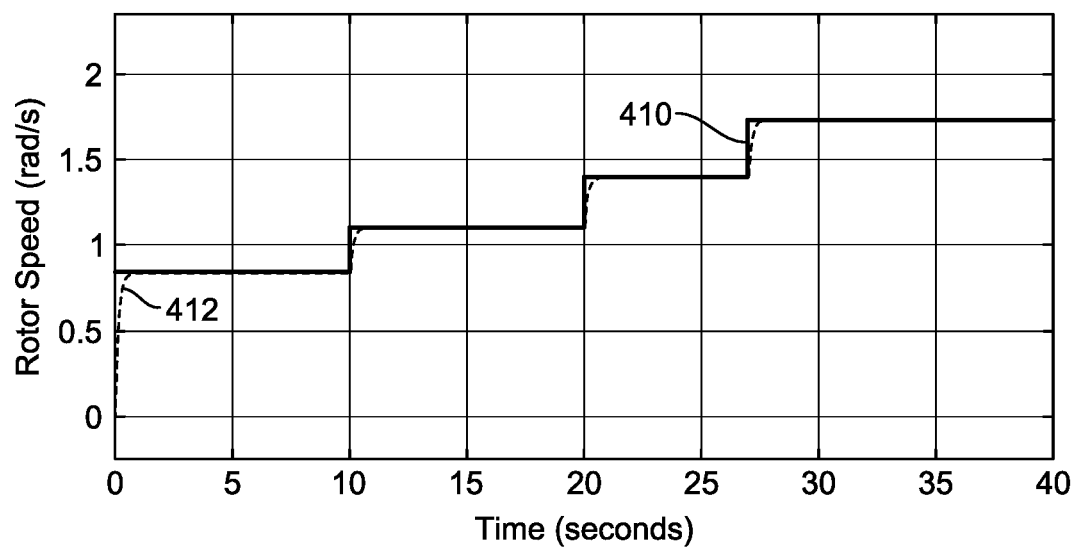
FIG. 4C is an exemplary graph illustrating rotor speeds of a wind turbine generator of a hybrid microgrid system according to certain embodiments in Scenario 3.

FIG. 4C is an exemplary graph illustrating rotor speeds (angular velocity) of the WT generator of the HMS according to certain embodiments in the Scenario 3. Solid line 410 and dashed line 412 each represents a desired (reference) value of the rotor speed $\omega_r*$ and an observed rotor speed $\omega_r$, respectively. FIG. 4C demonstrates that the observed rotor speed 412 exactly tracks the reference value 410, with negligible transition delays shorter than a second.

Figure 4D:
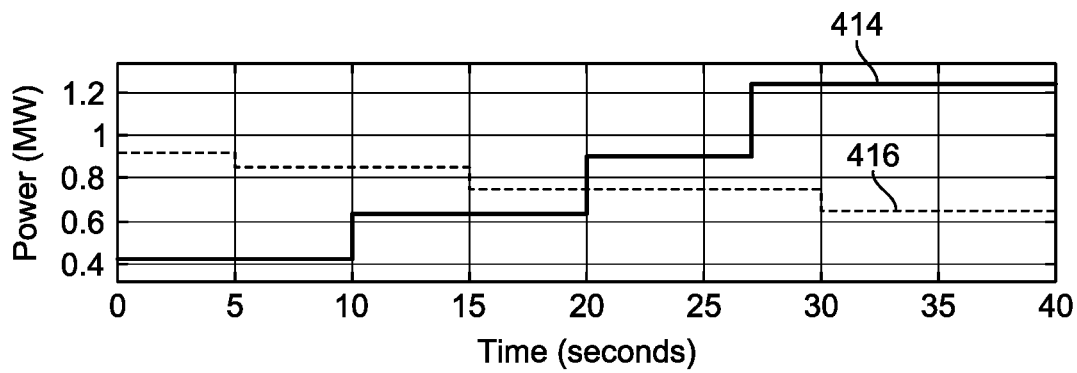
FIG. 4D is an exemplary graph illustrating powers generated by a wind turbine generator and by a solar photovoltaic system of a hybrid microgrid system according to certain embodiments in Scenario 3.

FIG. 4D is an exemplary graph illustrating powers generated by the WT generator and by the solar PV system of the HMS 100 according to certain embodiments in the Scenario 3. Solid line 414 and dotted line 416 each represents a PV power generated by the PV system 110 and a Wind power generated by the WT 102/PMSG 104, respectively. FIG. 4D confirmed that both the PV system 110 and the WT 102/PMSG 104 tracks variations of the ambient irradiance and the wind speed without observable delay time.

Figure 4E:
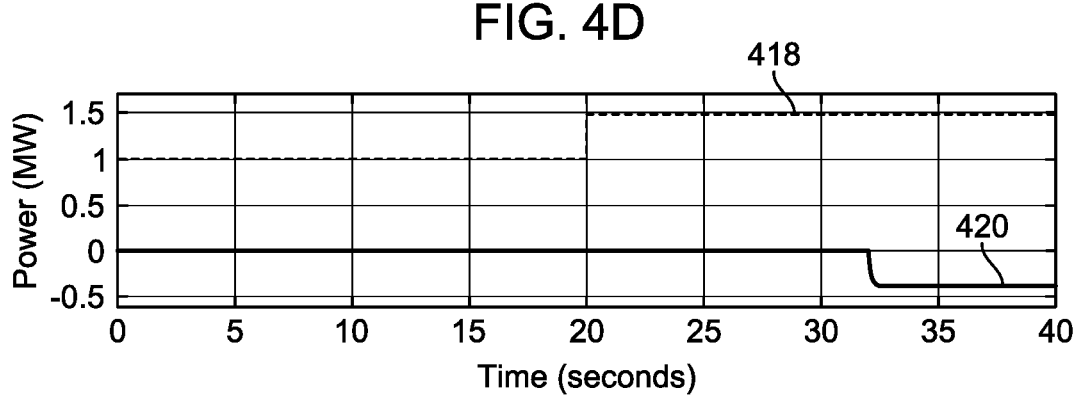
FIG. 4E is an exemplary graph illustrating a load demand and a grid power of a hybrid microgrid system according to certain embodiments in Scenario 3.

FIG. 4E is an exemplary graph illustrating a load demand 418 and a grid power 420 in the HMS 100 according to certain embodiment in the Scenario 3. Dotted line 418 and solid line 420 each represents the load demand and the grid power, that is, a power supplied (>0) from or received (<0) at the grid 130, respectively. The load demand 418 was assumed to increase at time t (s)=20, from 1 MW to 1.5 MW. However, at that moment the PV system 110 and the WT/PMSG 102/104 were both generating powers larger in total than the load demand, as observed in FIG. 4D. Thus, they could meet the load demand. At this moment excess energy was generated and stored to the BESS 114, as discussed in FIG. 4F. At time t (s)=32, the grid power 420 shifted to a minus level. This indicates the grid started to receive an excess power, because the BESS was fully charged up and stopped charging as discussed later in FIG. 4I.

Figure 4F:
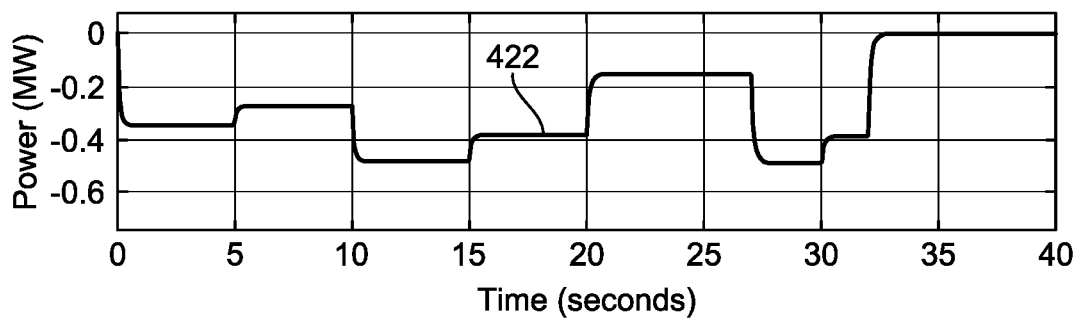
FIG. 4F is an exemplary graph illustrating a battery power generated from or provided to a battery energy storage system of a hybrid microgrid system according to certain embodiments in Scenario 3.

FIG. 4F is an exemplary graph illustrating a battery power 422 generated from or provided to the BESS 114 of the HMS 100 according to certain embodiments in the Scenario 3.

Figure 4G:
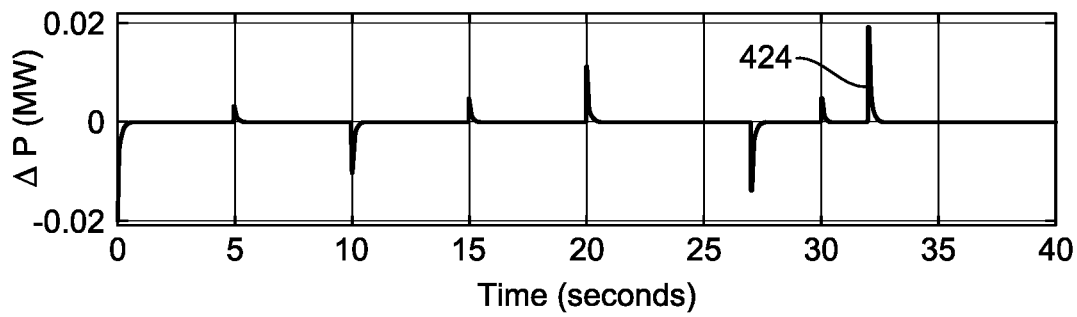
FIG. 4G is an exemplary graph illustrating a power deviation of a hybrid microgrid system according to certain embodiments in Scenario 3.

A variation of the solid line 422 and negative value of the power indicates the BBBC 112 operated in the buck mode to charge an excess power the load demand. When an excess power is generated, the BESS 114 is configured to store the excess power, so far as the SOC of the BESS allows charging. On the other hand, when the SOC reached its maximum value $SOC_{max}$ at t (s)=32.3, the BESS 114 stopped charging and the grid 130 started to absorb the excess power as illustrated in FIG. 4D with the curve 420, and in FIG. 4I discussed later. 5 FIG. 4G is an exemplary graph illustrating a power deviation 424 in the HMS 100 according to certain embodiment in the Scenario 3. Solid line 424 indicates that the power deviation $\Delta P$ is maintained exactly at zero under steady state conditions, while minor transition spikes were observed with peak values less than 5% of switched power values and transient times less than a second. FIGS. 4G and 4E demonstrated that the controller 120 is configured to switch the battery power immediately to a stable new level with acceptable minor transition spikes.

Figure 4H:
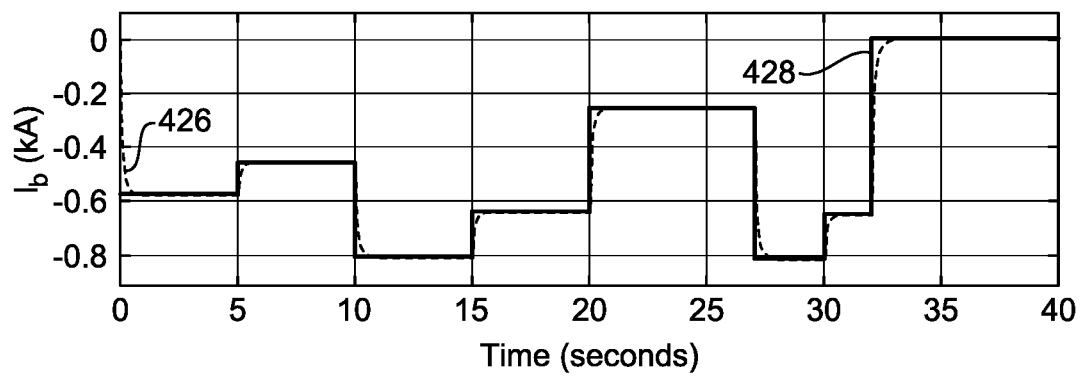
FIG. 4H is an exemplary graph illustrating a battery current of a battery energy storage system of a hybrid microgrid system according to certain embodiments in Scenario 3.

FIG. 4H is an exemplary graph illustrating a battery current of the BESS 114 in the HMS 100 according to an embodiment in the Scenario 3. Dashed line 426 and solid line 428 each represents an observed battery current and a desired (reference) value of the battery current 15 of the BESS 114. FIG. 4H demonstrates that the observed battery current 426 exactly tracks the desired value 428 with minor transient delay less than a second and without transient spikes.

Figure 4I:
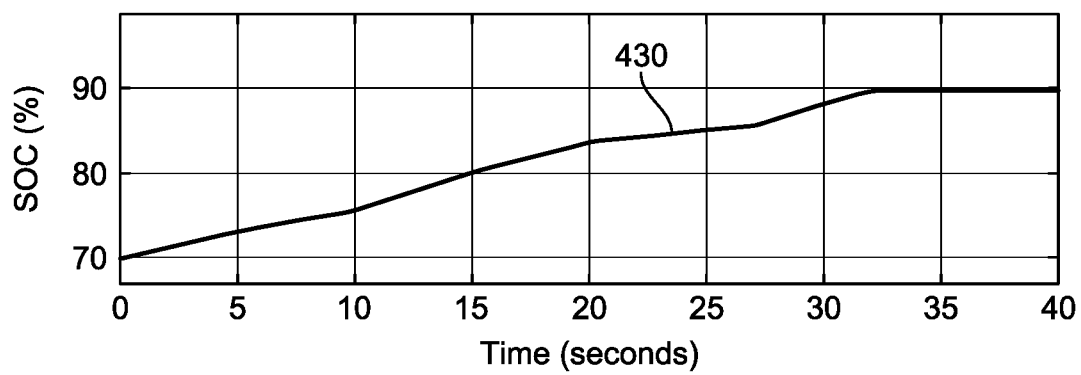
FIG. 4I is an exemplary graph illustrating a state of charge (SOC) of the BESS, according to certain embodiments in the Scenario 3.

FIG. 4I is an exemplary graph illustrating a state of charge (SOC) 430 of BESS 114 of the HMS 100 according to an embodiment, in the Scenario 3. Observed variation of the SOC 430 demonstrates that the BESS 114 continues to receive an exess energy and increase the SOC so far as the excess energy is generated in the HMS and the SOC level allows further charging.

Scenario 4: Comparison with Proportional-Integral (PI) Controller

Here, performances of the HMS 100 with the controller 120 are compared with those of a HMS with a linear PI controller in the known art. The superiority the controller 120 is demonstrated. For performing the comparison, the GSMCFO controller 120 in the HMS 100 under certain embodiments was replaced, at the same parameters, with the PI controller utilized in a following reference: Chishti, F. et al, LMMN-Based Adaptive Control for Power Quality Improvement of Grid Intertie Wind—PV System. *IEEE Trans. Ind. Inform.* 2019, 15, 4900-4912, entire content is incorporated herein by reference. Same power variations as illustrated FIG. 4A in the Scenario 3 were assumed for the solar irradiance and the wind speed. A parametric uncertainty of ±50% and constant disturbances were incorporated in the conditions of the Scenario 4.

Figure 5A:
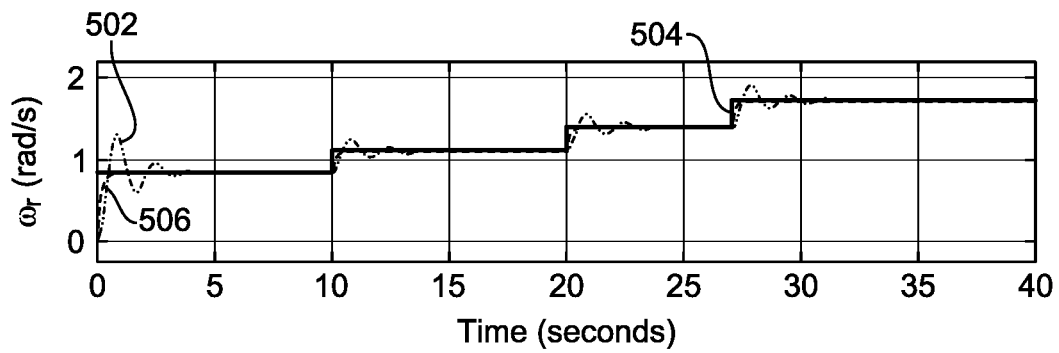
FIG. 5A is an exemplary graph illustrating rotor speeds observed in a hybrid microgrid system with a global sliding mode control with fractional order terms controller according to certain embodiments and observed with a proportional-integral controller in comparison in Scenario 4.

FIG. 5A is an exemplary graph illustrating rotor speeds observed in the HMS 100 with GSMCFO controller 120 under certain embodiments and observed with the PI controller for comparison in the Scenario 4. Solid line 504 represents a desired value (reference) of the rotor speed $\omega_r^*$. Dashed line 506 represents an observed rotor speed for the HMS with the GSMCFO 15 controller 120, where the exact tracking performance was demonstrated again with minor transition delays less than a second, but without any overshoot.

Dashed-two dotted line 502 represents an observed rotor speed for the HMS with the PI controller, where overshoots and damping oscillations were observed. Peak values of the overshoots exhibited about 30 to 50% larger values than the reference values, while the damping oscillation continued for about three seconds.

FIG. 5A demonstrates that the GSMCFO controller 120 tracks the reference of the rotor speed more exactly and settles faster in transitions than the PI controller does.

Figure 5B:
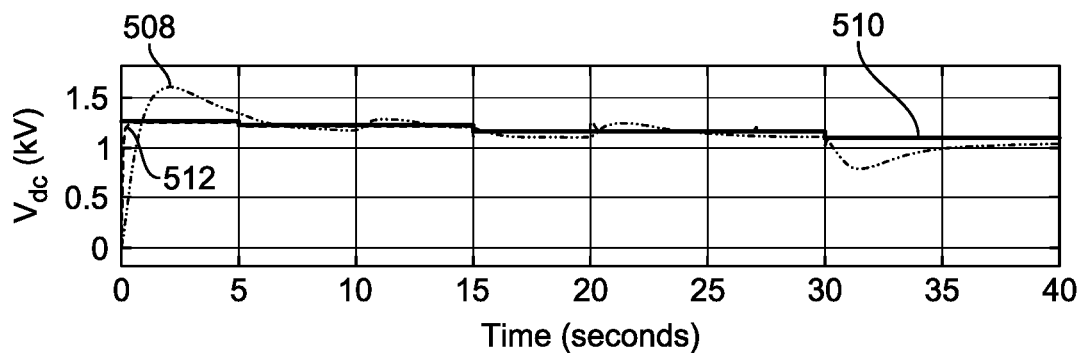
FIG. 5B is an exemplary graph illustrating DC-link voltages observed in a hybrid microgrid system with a global sliding mode control with fractional order terms controller according to certain embodiments and observed with a proportional-integral controller in comparison in Scenario 4.

FIG. 5B is an exemplary graph illustrating DC-link voltages observed for the HMS 100 with GSMCFO controller 120 under certain embodiments and observed with the PI controller in the Scenario 4 in comparison. Solid line 510 represents a desired value (reference) of the DC-link voltage $V_{dc}^*$. Dashed line 512 represents an observed DC-link voltage for the HMS with the GSMCFO Controller 120 which demonstrated an exact tracking performance with minor transition delays less than a second and without any overshoot. Dashed-two dotted line 508 represents an observed DC-link voltage for the HMS with the PI controller which exhibited transition delays longer than a second, overshoots reaching about 20 to 30% larger or smaller $V_{dc}$ values than the reference values, and overshoot damping continuing more than three seconds. FIG. 5B demonstrates that the GSMCFO controller tracks the DC-link voltage more exactly and settles faster in transitions than the PI controller does.

Figure 5C:
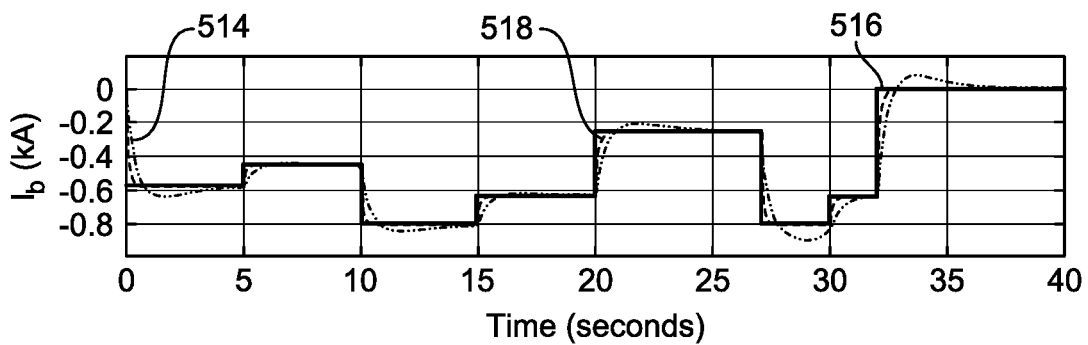
FIG. 5C is an exemplary graph illustrating battery currents observed in a hybrid microgrid system with a global sliding mode control with fractional order terms controller according to certain embodiments and observed with a proportional-integral controller in comparison in Scenario 4.

FIG. 5C is an exemplary graph illustrating battery currents observed in the HMS 100 with GSMCFO controller 120 under certain embodiments and observed with the PI controller in the Scenario 4 in comparison.

Solid line 516 represents a desired value (reference) of the battery current $I_b^*$. Dashed line 518 represents an observed battery current for the HMS with the GSMCFO Controller 120. The dashed line 518 demonstrated the exact tracking performance again with minor transition delays less than a second and without overshoots at transitions. Dashed-two dotted line 514 represents an observed battery current for the HMS with the PI controller. Here, the dashed-two dotted line 514 exhibited transition delays longer than a second, overshoots reaching about 10% larger or smaller $I_b$ values than the reference, and overshoot damping continuing more than a few seconds. FIG. 5C also demonstrates that the GSMCFO controller tracks the battery current exactly and settles faster in transitions than the PI controller does.

Figure 5D:
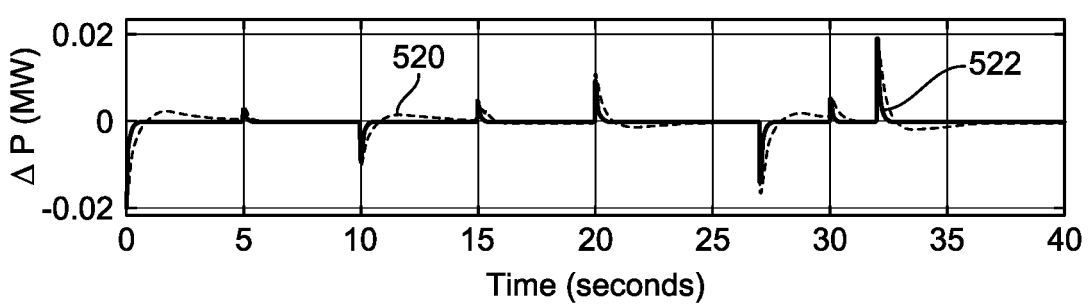
FIG. 5D is an exemplary graph illustrating power deviations observed in a hybrid microgrid system with a global sliding mode control with fractional order terms controller according to certain embodiments and observed with a proportional-integral controller in comparison in Scenario 4.

FIG. 5D is an exemplary graph illustrating power deviations observed for the HMS 100 with GSMCFO controller 120 under certain embodiments and observed with the PI controller in the Scenario 4 in comparison.

Solid line 522 represents an observed power deviation $\Delta P$ for the HMS with the GSMCFO Controller 120. Dashed-line 520 represents an observed power deviation $\Delta P$ for the HMS with the PI controller. Both lines 520 and 522 exhibited transition spikes with almost same peak values less than about 5% of switched power values. However, the GSMCFO controller settled within a second without overshooting, on the other hand, the PI controller struggled to maintain $\Delta P=0$, due to overshooting and longer damping time.

Based on the performance comparison above described, it was confirmed that the GSMCFO controller 120 provides superior transient and steady-state performances to the PI controller. Moreover, the GSMCFO controller 120 demonstrated capability to keep the power balance ($\Delta P=0$) of the HMS 100 despite the lumped disturbances in the system and sudden changes of the load demand and power generations.

The settling time and the overshoot comparison between the GSMCFO Controller 120 and the PI controller are presented in Tables 4 and 5, as below.

TABLE 4

Settling time (s) comparison: the PI
controller and the GSMCFO controller.

|  | $\omega_r$ | $V_{dc}$ | $I_b$ | $\Delta P$ |
|---|---|---|---|---|
| PI | 3.6 | 7.3 | 3.6 | 4.5 |
| GSMCFO | 0.7 | 0.2 | 0.8 | 0.8 |

TABLE 5

Overshoot (%) comparison: the PI
controller and the GSMCFO controller

|  | $\omega_r$ | $V_{dc}$ | $I_b$ | $\Delta P$ |
|---|---|---|---|---|
| PI | 51.2.0% | 32.7% | 15.3% | 12.8% |
| GSMCFO | 0.0% | 0.0% | 0.0% | 0.0% |

The above tables 4 and 5 further corroborate superior tracking performances of the GSMCFO to the PI controller in the presence of parametric uncertainties and external disturbances.

Figure 6:
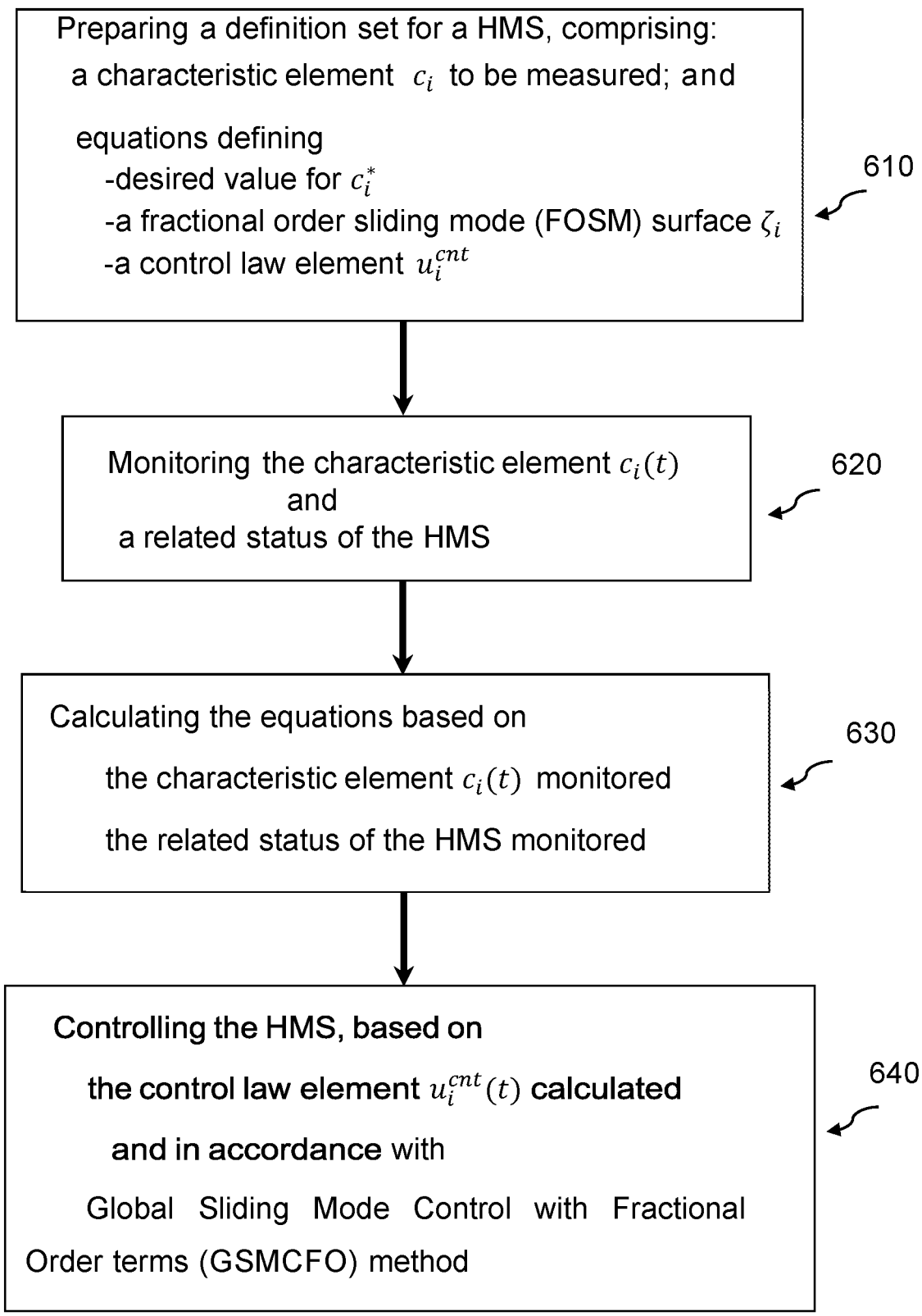
FIG. 6 is an exemplary illustration of a flowchart for a method of controlling a hybrid microgrid system, according to certain embodiments.

FIG. 6 is an exemplary illustration of flowchart for a method 600 of controlling a hybrid microgrid system (HMS), according to certain embodiments. The HMS includes a renewable energy source, for example, a wind turbine (WT) generator 102, 104 with a rotor side converter (RSC) 106 and a solar photovoltaic (PV) system 110 configured to output a PV output DC current to a DC-link in FIG. 1, a grid side converter (GSC) 108 configured to output a power to a point of common coupling (PCC) 128; a DC-link 132 configured to receive a power from the renewable energy source and to supply a power to the GSC; a rechargeable battery 114 configured to exchange a power via the DC-link; a load 126 configured to receive a power via the PCC 128; a utility grid 130 configured to exchange power via the PCC 128; and a controller 120 configured to control the HMS by executing a program and in accordance with the method defined as a global sliding mode control with fractional order terms (GSMCFO) method. The program comprises a definition set customized for the HMS and to be referred in applying the GSMCFO method to the HMS.

The method 600 includes steps illustrated by blocks in FIG. 6. One or more blocks may be combined or eliminated to achieve method for controlling the HMS 100, without departing from the scope of the present disclosure.

At step 610, a definition set to be referred in performing the GSMCFO method in controlling a HMS system, for example, the HMS 100 according to certain embodiments, is prepared and customized for the HMS 100. The definition set includes: a characteristic element $c_i$ to be monitored, equations defining a desired value $c_i^*$ of the characteristic element $c_i$, a fractional order sliding mode (FOSM) surface $\zeta_i$ for the characteristic element $c_i$, and a control law element $u_i^{cnt}$ of the characteristic element $c_i$. The equation defining the FOSM surface $\zeta_i(t)$ of the characteristic element $c_i(t)$ include a fractional time integral of a tracking error $e_i(t)$ and a fractional time derivative of the tracking error $e_i(t)$. The tracking error $e_i(t)$ for the characteristic element $c_i(t)$ is given by, $$e_i(t) = c_i(t) - c_i^*(t). \tag{101}$$

At step 620, current status of the HMS is monitored and monitored information is gathered and stored in the controller. The current status to be monitored includes the characteristic element $c_i(t)$ and a related status of the HMS appeared in the definition set.

At step 630, calculations of the equations defined in the definition set are performed by the controller 120, based on the characteristic element $c_i(t)$ monitored and the related status of the HMS monitored.

At step 640, the controller 120 controls the HMS based on the control law element $u_i^{cnt}(t)$ calculated and in accordance with the GSMCFO method.

Above steps or part of those steps are iterated until the FOSM surface $\zeta_i(t)$ or the tracking error $e_i(t)$ reduces to values equal to or smaller than each criterion predetermined.

Based upon numerous examples and the experimental observations, an efficient and cost-effective hybrid microgrid system configuration was achieved by linking the PV system directly, that is without any converters, with the DC-link. This reduces the number of electronic converters and thus enhances efficiency and reduces cost of the HMS.

A controlled operation of the HMS was achieved using a GSMCFO controller 120. Four scenarios were provided to demonstrate the performance of the GSMCFO controller 120 under various power generation and load conditions. In each of these scenarios, the GSMCFO controller 120 demonstrated i) excellent transient and steady-state performances, ii) global stability of the HMS subjected to parametric uncertainties, variations of renewable power sources and load demand, iii) regulation of DC-link voltage irrespective of the operating conditions, iv) extracting maximum power from both the wind and PV systems by the RSC and GSC, respectively, and v) active power transfer to the grid, and maintaining the power balance of the hybrid microgrid by effective charging/discharging of the BESS.

Due to the robustness and fast convergence of the GSMCFO controller 120, the overshoots in $\omega_r$, $V_{dc}$, $I_b$, and $\Delta P$ were 0.0%, and all settled at 0.7 s, 0.2 s, 0.8 s, and 0.8 s, respectively. The overshoot and settling time of the GSMCFO controller 120 was found to be highly satisfactory compared to the PI controller. Therefore, the GSMCFO controller 120 can improve the efficiency, the cost and the power balance of the hybrid microgrid.

Numerous modifications and variations of the present disclosure are possible in light of the above teachings. It is therefore to be understood that within the scope of the appended claims, the invention may be practiced otherwise than as specifically described herein.

The invention claimed is:

1. A method for controlling a hybrid microgrid system (HMS), the HMS comprising: a renewable energy source; a grid side converter (GSC) configured to output a power to a point of common coupling (PCC); a DC-link configured to receive a power from the renewable energy source and to supply a power to the GSC; a rechargeable battery configured to exchange a power via the DC-link; a load configured to receive a power via the PCC; a utility grid configured to exchange power via the PCC; and a controller configured to control the HMS by executing a program and in accordance with a global sliding mode control with fractional order terms (GSMCFO) method, wherein the program comprises a definition set customized for the HMS and to be referred in applying the GSMCFO method to the HMS, wherein the method comprises:

preparing the definition set,
  wherein the definition set comprises a characteristic element $c_i$ to be measured; and equations defining a desired value $c_i^*$ of the characteristic element $c_i$, a fractional order sliding mode (FOSM) surface $\zeta_i$ for the characteristic element $c_i$, and a control law element $u_i^{cnt}$ of the characteristic element $c_i$;
monitoring the characteristic element $c_i(t)$ and a related status of the HMS;
calculating at least one of the equations based on the characteristic element $c_i(t)$ monitored and the related status of the HMS monitored; and
controlling the HMS based on the control law element $u_i^{cnt}(t)$ calculated and in accordance with the GSMCFO method,
wherein, the equation defining the FOSM surface $\zeta_i(t)$ of the characteristic element $c_i(t)$ comprises a fractional time integral of a tracking error $e_i(t)$ and a fractional time derivative of the tracking error $e_i(t)$ defined as, $$e_i(t) = c_i(t) - c_i^*(t), \quad (1)$$

and wherein the equation defining the control law element $u_i^{cnt}(t)$ is configured to satisfy a condition, $$\zeta_i(t)\frac{d\zeta_i(t)}{dt} < 0, \quad (2)$$

so far as $\zeta_i(t)$ is not zero.

2. The method of claim 1, wherein the definition set further comprises a minimum value $SOC^{min}$ and a maximum value $SOC^{max}$ of the state of charge (SOC) of the BESS; and equations defining a power imbalance $\Delta P$ and a power balance condition of the HMS, given respectively as $$\Delta P = P_{re} + P_{ug} - P_{dem} - P_b, \quad (3)$$

$$\Delta P = 0, \quad (4)$$

wherein $P_{re}$ represents a total power generated by the renewable energy source, $P_{ug}$, a grid power exchanged between the utility grid and the PCC, $P_{dem}$, a load demand, $P_b$, a battery power exchanged between the BESS and the DC-link,
and wherein the method further comprises:
  monitoring elements required to calculate a power imbalance $\Delta P$ and a SOC;
  calculating a power imbalance $\Delta P$ with the equation given in the definition set; and
  controlling the battery power $P_b$ and the grid power $P_{ug}$ to satisfy and maintain the power balance condition, under a restriction that the SOC of the BESS satisfies a condition, $$SOC^{min} \le SOC \le SOC^{max}. \quad (5)$$

3. The method of claim 2, wherein the HMS further comprises:
  a wind turbine (WT) generator having a wind turbine (WT) and an electric generator having a rotor and a stator;
  a rotor side converter (RSC) configured to receive an AC power from the electric generator and output an RSC output DC current to the DC-link;
  a solar photovoltaic (PV) system configured to output a PV output DC current to the DC-link; and
  a bidirectional buck-boost converter (BBBC) connected between the DC-link and the rechargeable battery and configured to control a power exchanged between the BESS and the DC-link, the definition set further comprises an equation defining an equivalent control law element $u_i^{eqv}$ for the characteristic element $c_i$, wherein the equivalent control law element $u_i^{eqv}$ comprises a maximum disturbance term ${}^R\mathcal{J}_t^{1-\mu}\delta_i$, representing a possible maximum value of a lumped external disturbances and parametric perturbations to the tracking error $e_i(t)$, wherein, ${}^R\mathcal{J}_t^{1-\mu}$ represents a Riemann-Liouville fractional integration, and $\delta_i$, a positive function, and
wherein the equation defining the control law element $u_i^{cnt}(t)$ comprises a function SG $(\zeta_i(t))$ given by a signum function $sgn(\zeta_i(t))$ or one of its smooth approximations including $$\tanh\left(\frac{\zeta_i(t)}{\theta}\right),$$

wherein, $\theta(>0)$.

4. The method of claim 3, wherein the characteristic elements $c_i(t)(i=1, 2)$ are an angular frequency $\omega_r$ of the WT for i=1, and a d-axis stator current $I_{ds}$ of a stator of the electric generator for i=2, respectively,
wherein the desired value $\omega_r^*$ of the angular frequency $\omega_r$ of the WT is given as, $$c_1^*(t) = \omega_r^* = \frac{\lambda^* V_w}{R}, \quad (6)$$

wherein, $\lambda^*$ denotes a desired tip speed ratio giving a maximum power coefficient for the WT with a blade radius R and at a wind speed $V_w$,
the desired value $I_{ds}^*$ for the d-axis stator current $I_{ds}$ of the stator is given as, $$c_2^*(t) = I_{ds}^* = 0, \quad (7)$$

and wherein the equations defining the FOSM surfaces $\zeta_i(t)$ for the angular frequency $\omega_r(i=1)$ and the d-axis stator current $I_{ds}(i=2)$ are given as $$\zeta_1(t) = k_1\,{}^R\mathcal{J}_t^{\mu}e_1(t) + \sigma_1\,{}^R\mathcal{D}_t^{1-\mu}e_1(t) + {}^R\mathcal{D}_t^{2-\mu}e_1(t), \quad (8)$$

$$\zeta_2(t) = k_2\,{}^R\mathcal{J}_t^{\mu}e_2(t) + {}^R\mathcal{D}_t^{1-\mu}e_2(t), \quad (9)$$

wherein, $\mu \in (0, 1)$, $k_1$, $k_2$, and $\sigma_1$ are positive constants, ${}^R\mathcal{J}_t^{\mu}$ denotes a Riemann-Liouville fractional integration, ${}^R\mathcal{D}_t^{1-\mu}$ and ${}^R\mathcal{D}_t^{2-\mu}$ denote Riemann-Liouville fractional derivations, and
wherein the equations defining the equivalent control law element $u_1^{eqv}(t)$ and the control law element $u_1^{cnt}(t)$ of the angular frequency $\omega_4$ of the WT are given by q-axis stator voltages $V_{qs}^{eqv}(t)$ and $V_{qs}^{cnt}(t)$, and defined respectively as, $$u_1^{eqv}(t) = V_{qs}^{eqv}(t) = -\frac{1}{a}\begin{pmatrix} k_1 e_1(t) + \sigma_1 \dot{e}_1(t) + {}^R\mathcal{J}_t^{1-\mu}\delta_1 - \dot{\omega}_r^* \\ + a[L_q\omega_r I_{ds} + R_s I_{qs} + \lambda_r \omega_r] \end{pmatrix}, \quad (10)$$

$$u_1^{cnt}(t) = \quad (11)$$

$$V_{qs}^{cnt}(t) = V_{qs}^{eqv}(t) - \frac{1}{a}\left[\varrho_1\,{}^R\mathcal{J}_t^{1-\mu}SG(\zeta_1(t))|\zeta_1(t)|^{\alpha} + \gamma_1\,{}^R\mathcal{J}_t^{1-\mu}\zeta_1(t)\right],$$

wherein the equations defining the equivalent control law element $u_2^{eqv}(t)$ and the control law element $u_2^{cnt}(t)$ of the d-axis stator current $I_{ds}$ of the rotor are given by d-axis stator voltages $V_{ds}^{eqv}(t)$ and $V_{ds}^{cnt}(t)$, and defined respectively as, $$u_2^{eqv}(t) = V_{ds}^{eqv}(t) = -L_d\left(k_2 e_2(t) + \frac{[L_q \omega_r I_{qs} - R_s I_{ds}]}{L_d} + {}^R\mathcal{J}_t^{1-\mu}\delta_2 - \dot{I}_{ds}^*\right), \quad (12)$$

$$u_2^{cnt}(t) = \quad (13)$$
$$V_{ds}^{cnt}(t) = V_{ds}^{eqv}(t) - L_d\left[\varrho_2\,{}^R\mathcal{J}_t^{1-\mu}SG(\zeta_2(t))|\zeta_2(t)|^\alpha + \gamma_2\,{}^R\mathcal{J}_t^{1-\mu}\zeta_2(t)\right],$$

wherein $\alpha$ is given by, $$a = \frac{3P^2\Lambda_r}{2JL_q}, \quad (14)$$

wherein P denotes a number of pole pairs of the rotor, $\Lambda_r$, a rotor flux, J, an inertia of mechanical shaft of the WT generator, $L_q$, a q-axis self-inductance of the stator, Rs, a stator resistance, $I_{qs}$, a q-axis stator current, $\Lambda_r$, a rotor flux, $L_d$, a d-axis self-inductance of the stator, ${}^R\mathcal{J}_t^{1-\mu}\delta_1$ and ${}^R\mathcal{J}_t^{1-\mu}\delta_2$ represents the maximum disturbance terms, respectively, $\alpha \in (0, 1)$, $\varrho_i$ and $\gamma_i$(i=1, 2) are positive constants.

5. The method of claim 4, wherein the DC-link further comprises a DC-bus and a DC-link capacitor, and wherein the characteristic element $c_3$ is a DC-link voltage $V_{dc}$,
the desired value $V_{dc}^*$ defined for the DC-link voltage $V_{dc}$ is given as $$c_3^*(t) = V_{dc}^* = \begin{cases} V_{pv}^{MPPT}; & \text{when } V_{dc}^{min} \leq V_{pv}^{MPPT} \leq V_{dc}^{max}, \\ V_{dc}^{nom}; & \text{when } V_{pv}^{MPPT} < V_{dc}^{min}, \text{ or } V_{pv}^{MPPT} > V_{dc}^{max}, \end{cases} \quad (15)$$

wherein, $V_{pv}^{MPPT}$ represents an output voltage of the PV system under a maximum power point tracking (MPPT) operation, $V_{dc}^{min}$, $V_{dc}^{max}$ and $V_{dc}^{nom}$ represent a minimum allowable value, a maximum allowable value, and a nominal value of the DC-link voltages, each predetermined respectively,
the equation defining the FOSM surfaces $\zeta_3(t)$ of the DC-link voltage is given as, $$\zeta_3(t) = k_3\,{}^R\mathcal{J}_t^\mu e_3(t) + {}^R\mathcal{D}_t^{1-\mu}e_3(t), \quad (16)$$

wherein, $\mu \in (0, 1)$ and $k_3$ are positive constants, ${}^R\mathcal{J}_t^{1-\mu}$ denotes a Riemann-Liouville fractional integration, ${}^R\mathcal{D}_t^{1-\mu}$ denotes a Riemann-Liouville fractional derivation, and
wherein the equations defining the equivalent control law element $u_3^{eqv}(t)$ and the control law element $u_3^{cnt}(t)$ of the DC-link voltage $V_{dc}$ are given by d-axis AC output currents $I_d^{eqv}(t)$ and $I_d^{cnt}(t)$ from the GSC, and defined respectively as, $$u_3^{eqv}(t) = I_d^{eqv}(t) = \frac{2}{3}\frac{C_{dc}V_{dc}}{V_d}\left(k_3 e_3(t) + \frac{P_w}{C_{dc}V_{dc}} + \frac{I_{pv}}{C_{dc}} + \frac{(1-D)}{C_{dc}}I_b + {}^R\mathcal{J}_t^{1-\mu}\delta_3 - \dot{V}_{dc}^*(t)\right), \quad (17)$$

$$u_3^{cnt}(t) = \quad (18)$$
$$I_d^{cnt}(t) = I_d^{eqv}(t) + \frac{2}{3}\frac{C_{dc}V_{dc}}{V_d}\left[\varrho_3\,{}^R\mathcal{J}_t^{1-\mu}SG(\zeta_3(t))|\zeta_3(t)|^\alpha + \gamma_3\,{}^R\mathcal{J}_t^{1-\mu}\zeta_3(t)\right],$$

wherein, $C_{dc}$ denotes a capacitance of the DC-link capacitor, $V_d$, a voltage of the AC output from the GSC, $P_w$, an output power from the RSC, $I_{pv}$, an output current from the PV system, D, a duty cycle ratio of the BBBC, $I_b$, a battery output current, ${}^R\mathcal{J}_t^{1-\mu}\delta_3$ is the maximum disturbance term, $\alpha \in (0, 1)$, $\varrho_3$ and $\gamma_3$ are positive constants.

6. he method of claim 5, wherein the GSC is further configured to output an AC output to a point of common coupling (PCC) via a grid side filter, and
wherein the characteristic elements $c_i(t)$(i=4, 5) are a d-axis AC current $I_d$(i=4) of the AC output from the GSC, and a q-axis AC current $I_q$(i=5) of the AC output from the GSC for, respectively,
the desired values defined for the d-axis AC current and the q-axis AC current are given respectively as, $$c_4^*(t) = I_d^* = I_d = \frac{2}{3}\frac{P_{dem} - P_{ug}}{V_d}, \quad (19)$$

$$c_5^*(t) = I_q^* = 0, \quad (20)$$

wherein $P_{dem}$ and $P_{ug}$ represent a load demand at the load and a power exchanged between the PCC and the utility grid, respectively, wherein $P_{ug} > 0$, when provided from the utility grid to the PCC, $P_{ug} < 0$, when provided from the GSC to the utility grid, $V_d$, a d-axis AC voltage of the AC output from the GSC,
the equations defining the FOSM surfaces $\zeta_i(t)$ for the d-axis AC current $I_d$(i=4) and the q-axis AC current $I_q$(i=5) are given respectively as, $$\zeta_4(t) = k_4\,{}^R\mathcal{J}_t^\mu e_4(t) + {}^R\mathcal{D}_t^{1-\mu}e_4(t), \quad (21)$$

$$\zeta_5(t) = k_5\,{}^R\mathcal{J}_t^\mu e_5(t) + {}^R\mathcal{D}_t^{1-\mu}e_5(t), \quad (22)$$

wherein, $\mu \in (0, 1)$, $k_4$, and $k_5$ are positive constants, ${}^R\mathcal{J}_t^\mu$ and ${}^R\mathcal{D}_t^{1-\mu}$ each denotes a Riemann-Liouville fractional integration and a Riemann-Liouville fractional derivation, respectively,
wherein, the equations defining the equivalent control law element $u_4^{eqv}(t)$ and the control law element $u_4^{cnt}(t)$ of the d-axis AC current $I_d$ are given by d-axis AC voltages $V_d^{eqv}(t)$ and $V_d^{cnt}(t)$ of the AC output from the GSC, and defined respectively as, $$u_4^{eqv}(t) = \quad (23)$$
$$V_d^{eqv}(t) = -L_f\left(k_4 e_4(t) - \dot{I}_{d^*} - \frac{1}{L_f}\left[R_f I_d + U_d - L_f \omega_g I_q - {}^R\mathcal{J}_t^{1-\mu}\delta_4\right]\right),$$

$$u_4^{cnt}(t) = \quad (24)$$
$$V_d^{cnt}(t) = V_d^{eqv}(t) - L_f\left[\varrho_4\,{}^R\mathcal{J}_t^{1-\mu}SW(\zeta_4(t))|\zeta_4(t)|^\alpha + \gamma_4\,{}^R\mathcal{J}_t^{1-\mu}\zeta_4(t)\right],$$

wherein the equations defining the equivalent control law element $u_5^{eqv}(t)$ and the control law element $u_5^{cnt}(t)$ of the q-axis AC current $I_q$ are given by q-axis AC voltages $V_q^{eqv}(t)$ and $V_q^{cnt}(t)$ of the AC output from the GSC, and defined respectively as, $$u_5^{eqv}(t) = \qquad (25)$$
$$V_q^{eqv}(t) = -L_f\left(k_5 e_5(t) - I_q^* - \frac{1}{L_f}[R_f I_q + U_q + L_f \omega_g I_d - {}^R\mathcal{J}_t^{1-\mu}\delta_5]\right),$$

$$u_5^{cnt}(t) = \qquad (26)$$
$$V_q^{cnt}(t) = V_q^{eqv}(t) - L_f[\varrho_5 {}^R\mathcal{J}_t^{1-\mu} SG(\zeta_5(t))|\zeta_5(t)|^\alpha + \gamma_5 {}^R\mathcal{J}_t^{1-\mu}\zeta_5(t)],$$

wherein $L_f$ and $R_f$ denote a grid side filter inductance and a grid side filter resistance, respectively, $U_d$ and $U_q$, a d-axis and a q-axis voltages at a point of common coupling (PCC), respectively, $\omega_g$, an electrical angular frequency of the AC output from the GSC, ${}^R\mathcal{J}_t^{1-\mu}\delta_i$, (i=4, 5) are the maximum disturbance terms, $\alpha \in (0, 1)$, $\varrho_i$ and $\gamma_i$ (i=4, 5) are positive constants.

7. The method of claim 6, wherein the BBBC is configured to facilitate charging of the rechargeable battery while operating as a buck converter, and to facilitate discharging to the DC- link while operating as a boost converter, wherein the characteristic element $c_i$ (i=6) is a battery current $I_b$, the desired value $I_b^*$ defined for the battery current $I_b$ is given as, $$c_6^*(t) = I_b^* = \frac{P_b}{V_b} = \frac{P_{re} + P_{ug} - P_{dem}}{V_b}, \qquad (27)$$

wherein $P_{re}$ represents a sum of powers generated by the renewable energy sources, $P_{ug}$, a power supplied by the utility grid, $P_{dem}$, a load demand, and $V_b$, a battery voltage, the equation defining the FOSM surfaces $\zeta_6(t)$ of the battery current is given as, $$\zeta_6(t) = k_6 {}^R\mathcal{J}_t^{1-\mu} e_6 + {}^R\mathcal{D}_t^{1-\mu}, \qquad (28)$$

wherein, $\mu \in (0, 1)$ and $k_6$ are positive constants, ${}^R\mathcal{J}_t^{1-\mu}$ denotes a Riemann-Liouville fractional integration, ${}^R\mathcal{D}_t^{1-\mu}$ denotes a Riemann-Liouville fractional derivation, and wherein the equations defining the equivalent control law element $u_6^{eqv}(t)$ and the control law element $u_6^{cnt}(t)$ of the battery current $I_b$ are given by duty cycles $D^{eqv}(t)$ and $D^{cnt}(t)$ of the BBBC, and defined respectively as, $$u_6^{eqv}(t) = D^{eqv}(t) = \frac{L_b}{V_{dc}}\left(k_6 e_6(t) + \frac{V_b}{L_b} - \frac{I_b R_b}{L_b} + {}^R\mathcal{J}_t^{1-\mu}\delta_6 - I_b^*\right) \qquad (29)$$

$$u_6^{cnt}(t) = \qquad (30)$$
$$D^{cnt}(t) = D^{eqv}(t) - L_b[\varrho_6 {}^R\mathcal{J}_t^{1-\mu} SG(\zeta_6(t))|\zeta_6(t)|^\alpha + \gamma_6 {}^R\mathcal{J}_t^{1-\mu}\zeta_6(t)],$$

wherein, $L_b$ denotes a battery inductance, $R_b$, a battery resistance, $V_{dc}$, a DC-link voltage, ${}^R\mathcal{J}_t^{1-\mu}\delta_6$ represents the maximum disturbance term, $\delta_6$, $\alpha \in (0, 1)$, $\varrho_6$ and $\gamma_6$ are positive constants.

8. A hybrid microgrid system (HMS) comprising:
a renewable energy source;
a grid side converter (GSC) configured to output a power to a point of common coupling (PCC);
a DC-link configured to receive a power from the renewable energy source and to supply a power to the GSC;
a rechargeable battery configured to exchange a power between the DC-link;
a load configured to receive a power via the PCC;
a utility grid configured to exchange power via the PCC; and
a controller comprising: a processor; a memory; a bus-line; and I/O port, wherein, the controller is configured to control the HMS by executing a program installed in the memory and in accordance with a global sliding mode control with fractional order terms (GSMCFO) method, and wherein, the program comprises a definition set customized for the HMS and to be referred in applying the GSMCFO method to the HMS,
wherein the definition set comprises: a characteristic element $c_i$ to be measured; and equations defining a desired value $c_i^*$ of the characteristic element $c_i$, a fractional order sliding mode (FOSM) surface $\zeta_i$ of the characteristic element $c_i$, and a control law element $u_i^{cnt}$ of the characteristic element $c_i$, and
wherein the controller is further configured to
monitor the characteristic element $c_i(t)$ and a related status of the HMS,
calculate at least one of the equations defined in the definition set based on the characteristic element $c_i(t)$ monitored and the status of the HMS monitored, and
control the HMS based on the control law element $u_i^{cnt}(t)$ calculated,
wherein the equation defining the FOSM surface $\zeta_i(t)$ for the characteristic element $c_i(t)$ comprises a fractional time integral of a tracking error $e_i(t)$ and a fractional time derivative of the tracking error $e_i(t)$, wherein the tracking error $e_i(t)$ for the characteristic element $c_i(t)$ is defined as, $$e_i(t) = c_i(t) - c_i^*(t), \qquad (31)$$

wherein the equation defining the control law element $u_i^{cnt}(t)$ is configured to satisfy a condition $$\zeta_i(t)\frac{d\zeta_i(t)}{dt} < 0, \qquad (32)$$

so far as $\zeta_i(t)$ is not zero.

9. The hybrid microgrid system of claim 8, wherein the definition set further comprises: a minimum value $SOC^{min}$ and a maximum value $SOC^{max}$ of the state of charge (SOC) of the rechargeable battery; and equations defining a power imbalance $\Delta P$ and a power balance condition of the HMS, given respectively as, $$\Delta P = P_{re} + P_{ug} - P_{dem} - P_b, \qquad (33)$$

$$\Delta P = 0, \qquad (34)$$

wherein $P_{re}$ represents a total power generated by the renewable energy source, $P_{ug}$, a grid power exchanged between the utility grid and the PCC, $P_{dem}$, a load demand, $P_b$, a battery power exchanged between the rechargeable battery and the DC-link, wherein the controller is further configured to
monitor elements required to calculate a power imbalance ΔP and a SOC,
calculate a power imbalance ΔP with the equation given in the definition set, and
control the battery power $P_b$ and the grid power $P_{ug}$ to satisfy and maintain the power balance condition, under a restriction that the SOC of the rechargeable battery satisfies a condition, $$SOC^{min} \leq SOC \leq SOC^{max}. \tag{35}$$

10. The hybrid microgrid system of claim 9, wherein the HMS further comprises:
a wind turbine (WT) generator further comprising a wind turbine (WT) and an electric generator further comprising a rotor and a stator;
a rotor side converter (RSC) configured to receive an AC power from the electric generator and output an RSC output DC current to the DC-link;
a solar photovoltaic (PV) system configured to output a PV output DC current to the DC-link; and
a bidirectional buck-boost converter (BBBC) connected between the DC-link and the rechargeable battery and configured to control a power exchanged between the rechargeable battery and the DC-link,
and wherein, the definition set further comprises an equation defining an equivalent control law element $u_i^{eqv}$ for the characteristic element $c_i$, wherein the equivalent control law element $u_i^{eqv}$ comprises a maximum disturbance term ${}^R \mathcal{J}_t^{1-\mu} \delta_i$, representing a possible maximum value of a lumped external disturbances and parametric perturbations to the tracking error $e_i(t)$, wherein, ${}^R \mathcal{J}_t^{1-\mu}$ represents a Riemann-Liouville fractional integration, and $\delta_i$, a positive function,
wherein, the equation defining the control law element $u_i^{cnt}(t)$ comprises a function $SG(\zeta_i(t))$ given by a signum function $\text{sgn}(\zeta_i(t))$ or one of its smooth approximations including $$\tanh\left(\frac{\zeta_i(t)}{\theta}\right),$$

wherein, $\theta(>0)$.

11. The hybrid microgrid system of claim 10, wherein the characteristic element $c_1$ is an angular frequency $\omega_r$ of the WT, and the characteristic element $c_2$ is a d-axis stator current $I_{ds}$, wherein the desired value $\omega_r^*$ for the angular frequency $\omega_r$ of the WT is defined as, $$c_1^*(t) = \omega_r^* = \frac{\lambda^* V_w}{R}, \tag{36}$$

wherein $\lambda^*$ denotes a desired tip speed ratio, giving a maximum power coefficient for the turbine with a blade radius R, at a wind speed $V_w$,
wherein the desired value $I_{ds}^*$ for the d-axis stator current $I_{ds}$ of the rotor is given as, $$c_2^*(t) = I_{ds}^* = 0 \tag{37}$$

wherein the equations defining the FOSM surfaces $\zeta_i(t)$ for the characteristic elements $c_i(i=1, 2)$ are given as, $$\zeta_1(t) = k_1 {}^R \mathcal{J}_t^\mu e_1(t) + \sigma_1 {}^R \mathcal{D}_t^{1-\mu} e_1(t) + {}^R \mathcal{D}_t^{2-\mu} e_1(t), \tag{38}$$

$$\zeta_2(t) = k_2 {}^R \mathcal{J}_t^\mu e_2(t) + {}^R \mathcal{D}_t^{1-\mu} e_2(t), \tag{39}$$

wherein, $0<\mu<1$, $k_1$, $k_2$, and of are positive constants, ${}^R \mathcal{J}_t^\mu$ denotes a Riemann-Liouville fractional integration, ${}^R \mathcal{D}_t^{1-\mu}$ and ${}^R \mathcal{D}_t^{2-\mu}$ denote Riemann-Liouville fractional derivations,
wherein the equivalent control law element $u_1^{eqv}(t)$ and the control law element $u_1^{cnt}(t)$ of the angular frequency $\omega_r$ are given by q-axis stator voltages $V_{qs}^{eqv}(t)$ and $V_{qs}^{cnt}(t)$, and defined respectively as, $$u_1^{eqv}(t) = V_{qs}^{eqv}(t) = -\frac{1}{a}\begin{pmatrix} k_1 e_1(t) + \sigma_1 \dot{e}_1(t) + {}^R \mathcal{J}_t^\mu \delta_1 - \dot{\omega}_r^* \\ + a[L_q \omega_r I_{ds} + R_s I_{qs} + \lambda_r \omega_r] \end{pmatrix}, \tag{40}$$

$$u_1^{cnt}(t) = \tag{41}$$

$$V_{qs}^{cnt}(t) = V_{qs}^{eqv}(t) - \frac{1}{a}\left[\varrho_1 {}^R \mathcal{J}_t^{1-\mu} SG(\zeta_1(t))|\zeta_1(t)|^\alpha + \gamma_1 {}^R \mathcal{J}_t^{1-\mu} \zeta_1(t)\right],$$

wherein the equivalent control law element $u_2^{eqv}(t)$ and the control law element $u_2^{cnt}(t)$ of the d-axis stator current $I_{ds}$ of the rotor are given by d-axis stator voltages $V_{ds}^{eqv}(t)$ and $V_{ds}^{cnt}(t)$, and defined respectively as $$u_2^{eqv}(t) = V_{ds}^{eqv}(t) = -L_d\begin{pmatrix} k_2 e_2(t) + \frac{[L_q \omega_r I_{qs} - R_s I_{ds}]}{L_d} \\ + {}^R \mathcal{J}_t^{1-\mu} \delta_2 - \dot{I}_{ds}^* \end{pmatrix}, \tag{42}$$

$$u_2^{cnt}(t) = \tag{43}$$

$$V_{ds}^{cnt}(t) = V_{ds}^{eqv}(t) - L_d\left[\varrho_1 {}^R \mathcal{J}_t^{1-\mu} SG(\zeta_2(t))|\zeta_2(t)|^\alpha + \gamma_2 {}^R \mathcal{J}_t^{1-\mu} \zeta_2(t)\right],$$

wherein $\alpha$ is given by $$a = \frac{3P^2 \Lambda_r}{2JL_q}, \tag{44}$$

wherein P denotes a number of pole pairs of the rotor, $\Lambda_r$, a rotor flux, J, an inertia of mechanical shaft of the wind turbine generator, $L_q$, a q-axis self-inductance of the stator, Rs, a stator resistance, $I_{qs}$, a q-axis stator current, $\Lambda_r$, a rotor flux, $L_d$, a d-axis self-inductance of the stator, ${}^R \mathcal{J}_t^{1-\mu} \delta_1$ and ${}^R \mathcal{J}_t^{1-\mu} \delta_2$ represent the maximum disturbance terms, $\alpha \in (0, 1)$, $\varrho_i$ and $\gamma_i (i =1, 2)$ are positive constants.

12. The hybrid microgrid system of claim 10, wherein the DC-link further comprises a DC-bus and a DC-link capacitor, and wherein the characteristic element $c_3$ is a DC-link voltage $V_{dc}$,
the desired value $V_{dc}^*$ defined for the DC-link voltage $V_{dc}$ is given as $$c_3^*(t) = V_{dc}^* = \begin{cases} V_{pv}^{MPPT} & ; \text{when } V_{dc}^{min} \leq V_{pv}^{MPPT} \leq V_{dc}^{max}, \\ V_{dc}^{nom} & ; \text{when } V_{pv}^{MPPT} < V_{dc}^{min}, \text{ or } V_{pv}^{MPPT} > V_{dc}^{max}, \end{cases} \tag{45}$$

wherein $V_{pv}^{MPPT}$ represents an output voltage of the PV system under a maximum power point tracking (MPPT) operation, $V_{dc}^{min}$, $V_{dc}^{max}$ and $V_{dc}^{nom}$ represent a minimum allowable value, a maximum allowable value, and a nominal value of the DC-link voltages, each predetermined respectively, the equation defining the FOSM surfaces $\zeta_3(t)$ of the DC-link voltage is given as, $$\zeta_3(t)=k_3{}^R\mathcal{J}_t^\mu e_3(t)+{}^R\mathcal{D}_t^{1-\mu}e_3(t), \quad (46)$$

wherein, $\mu \in (0, 1)$ and $k_3$ are positive constants, ${}^R\mathcal{J}_t^{1-\mu}$ denotes a Riemann-Liouville fractional integration, ${}^R\mathcal{D}_t^{1-\mu}$ denotes a Riemann-Liouville fractional derivation, wherein the equations defining the equivalent control law element $u_3^{eqv}(t)$ and the control law element $u_3^{cnt}(t)$ of the DC-link voltage $V_{dc}$ are given by d-axis AC output currents $I_d^{eqv}(t)$ and $I_d^{cnt}(t)$ from the GSC, and defined respectively as, $$u_3^{eqv}(t) = I_d^{eqv}(t) = \frac{2}{3}\frac{C_{dc}V_{dc}}{V_d}\left(\begin{array}{c}k_3e_3(t) + \frac{P_w}{C_{dc}V_{dc}} + \frac{I_{pv}}{C_{dc}} \\ +\frac{(1-D)}{C_{dc}}I_b + {}^R\mathcal{J}_t^{1-\mu}\delta_3 - \dot{V}_{dc}^*(t)\end{array}\right), \quad (47)$$

$$u_3^{cnt}(t) = \quad (48)$$

$$I_d^{cnt}(t) = I_d^{eqv}(t) + \frac{2}{3}\frac{C_{dc}V_{dc}}{V_d}\left[\varrho_3{}^R\mathcal{J}_t^{1-\mu}SG(\zeta_3(t))|\zeta_3(t)|^\alpha + \gamma_3{}^R\mathcal{J}_t^{1-\mu}\zeta_3(t)\right],$$

wherein $C_{dc}$ denotes a capacitance of the DC-link capacitor, $V_d$, a voltage of the AC output from the GSC, $P_w$, an output power from the RSC, $I_{pv}$, an output current from the PV system, D, a duty cycle ratio of the BBBC, $I_b$, a battery output current, ${}^R\mathcal{J}_t^{1-\mu}\delta_3$ is the maximum disturbance term, $\alpha \in (0, 1)$, $\varrho_3$ and $\gamma_3$ are positive constants.

13. The hybrid microgrid system of claim 10, wherein the GSC is further configured to output an AC output to a point of common coupling (PCC) via a grid side filter, wherein the characteristic elements $c_i(t)(i=4, 5)$ are a d-axis AC current $I_d(i=4)$ of the AC output from the GSC, and a q-axis AC current $I_q(i=5)$ of the AC output from the GSC for, respectively, the desired values defined for the d-axis AC current and the q-axis AC current are given respectively as $$c_4^*(t) = I_d^* = I_d = \frac{2}{3}\frac{P_{dem}-P_{ug}}{V_d}, \quad (49)$$

$$c_5^*(t) = I_q^* = 0, \quad (50)$$

wherein $P_{dem}$ and $P_{ug}$ represent a power demand at the load and a power exchanged between the PCC and the utility grid, respectively, wherein $P_{ug}>0$, when provided from the utility grid to the PCC, $P_{ug}<0$, when provided from the GSC to the utility grid, $V_d$, a d-axis AC voltage of the AC output from the GSC, the equations defining the FOSM surfaces $\zeta_i(t)$ for the d-axis AC current $I_d(i=4)$ and the q-axis AC current $I_q(i=5)$ are given respectively as, $$\zeta_4(t) = k_4{}^R\mathcal{J}_t^\mu e_4(t) + {}^R\mathcal{D}_t^{1-\mu}e_4(t), \quad (51)$$

$$\zeta_5(t) = k_5{}^R\mathcal{J}_t^\mu e_5(t) + {}^R\mathcal{D}_t^{1-\mu}e_5(t), \quad (52)$$

wherein $\mu \in (0, 1)$, $k_4$, and $k_5$ are positive constants, ${}^R\mathcal{J}_t^\mu$ and ${}^R\mathcal{D}_t^{1-\mu}$ each denotes a Riemann-Liouville fractional integration and a Riemann-Liouville fractional derivation, respectively, wherein the equations defining the equivalent control law element $u_4^{eqv}(t)$ and the control law element $u_4^{cnt}(t)$ of the d-axis AC current $I_d$ are given by d-axis AC voltages $V_d^{eqv}(t)$ and $V_d^{cnt}(t)$ of the AC output from the GSC, and defined respectively as, $$u_4^{eqv}(t) = V_d^{eqv}(t) = -L_f\left(k_4e_4(t) - \dot{I}_d^* - R_fI_d + U_d - L_f\omega_gI_q{}^R\mathcal{J}_t^{1-\mu}\delta_4\right]), \quad (53)$$

$$u_4^{cnt}(t) = \quad (54)$$

$$V_d^{cnt}(t) = V_d^{eqv}(t) - L_f\left[\varrho_4{}^R\mathcal{J}_t^{1-\mu}SW(\zeta_4(t))|\zeta_4(t)|^\alpha + \gamma_4{}^R\mathcal{J}_t^{1-\mu}\zeta_4(t)\right],$$

wherein the equations defining the equivalent control law element $u_5^{eqv}(t)$ and the control law element $u_5^{cnt}(t)$ of the q-axis AC current $I_q$ are given by q-axis AC voltages $V_q^{eqv}(t)$ and $V_q^{cnt}(t)$ of the AC output from the GSC, and defined respectively as, $$u_5^{eqv}(t) = \quad (55)$$

$$V_q^{eqv}(t) = -L_f\left(k_5e_5(t) - \dot{I}_q^* - \frac{1}{L_f}\left[R_fI_q + U_q + L_f\omega_gI_d - {}^R\mathcal{J}_t^{1-\mu}\delta_5\right]\right),$$

$$u_5^{cnt}(t) = \quad (56)$$

$$V_q^{cnt}(t) = V_q^{eqv}(t) - L_f\left[\varrho_5{}^R\mathcal{J}_t^{1-\mu}SG(\zeta_5(t))|\zeta_5(t)|^\alpha + \gamma_5{}^R\mathcal{J}_t^{1-\mu}\zeta_5(t)\right],$$

wherein $L_f$ and $R_f$ denote a grid side filter inductance and a grid side filter resistance, respectively, $U_d$ and $U_q$, a d-axis and a q-axis voltages at a point of common coupling (PCC), respectively, $\omega_g$, an electrical angular frequency of the AC output from the GSC, ${}^R\mathcal{J}_t^{1-\mu}\delta_i$, (i=4, 5) are the maximum disturbance terms, $\alpha \in (0, 1)$, $\varrho_i$ and $\gamma_i$(i=4, 5) are positive constants.

14. The HMS of claim 10, wherein the BBBC is configured to facilitate charging of the rechargeable battery while operating as a buck converter, and to facilitate discharging to the DC-link while operating as a boost converter, and wherein the characteristic element $c_i(i=6)$ is a battery current $I_b$, the desired value $I_b^*$ defined for the battery current $I_b$ is given as, $$c_6^*(t) = I_b^* = \frac{P_b}{V_b} = \frac{P_{re}+P_{ug}-P_{dem}}{V_b}, \quad (57)$$

wherein $P_{re}$ represents a sum of powers generated by the renewable energy sources, $P_{ug}$, a power supplied by the utility grid, $P_{dem}$, a load demand, and $V_b$, a battery voltage, the equation defining the FOSM surfaces $\zeta_6(t)$ of the battery current is given as, $$\zeta_6(t)=k_6{}^R\mathcal{J}_t^{1-\mu}e_6+{}^R\mathcal{D}_t^{1-\mu}e_6, \quad (58)$$

wherein, $\mu \in (0, 1)$ and $k_6$ are positive constants, ${}^R\mathcal{J}_t^\mu$ denotes a Riemann-Liouville fractional integration, ${}^R\mathcal{D}_t^{1-\mu}$ denotes a Riemann-Liouville fractional derivation, wherein the equations defining the equivalent control law element $u_6^{eqv}(t)$ and the control law element $u_6^{cnt}(t)$ of the battery current $I_b$ are given by duty cycles $D^{eqv}(t)$ and $D^{cnt}(t)$ of the BBBC, and defined respectively as, $$u_6^{eqv}(t) = D^{eqv}(t) = \frac{L_b}{V_{dc}}\left(k_6 e_6(t) + \frac{V_b}{L_b} - \frac{I_b R_b}{L_b} + {}^R\mathcal{J}_t^{1-\mu}\delta_6 - I_b^*\right), \quad (59)$$

$$u_6^{cnt}(t) = \quad (60)$$

$$D^{cnt}(t) = D^{eqv}(t) - L_b\left[\varrho_6 {}^R\mathcal{J}_t^{1-\mu} SG(\zeta_6(t))|\zeta_6(t)|^\alpha + \gamma_6 {}^R\mathcal{J}_t^{1-\mu}\zeta_6(t)\right],$$

wherein $L_b$ denotes a battery inductance, $V_b$, a battery voltage, $R_b$, a battery resistance, $V_{dc}$, a DC-link voltage, ${}^R\mathcal{J}_t^{1-\mu}\delta_6$ represents the maximum disturbance term, $\alpha \in (0, 1)$, $\varrho_6$ and $\gamma_6$ are positive constants.

15. A controller of a hybrid microgrid system (HMS), the HMS comprising: a renewable energy source; a grid side converter (GSC) configured to output a power to a point of common coupling (PCC); a DC-link configured to receive a power from the renewable energy source and to supply a power to the GSC; a rechargeable battery configured to exchange a power via the DC-link; a load configured to receive a power via the PCC; a utility grid configured to exchange power via the PCC; and a controller comprising: a processor; a memory; a bus-line; and I/O port,
wherein the controller is configured to control the HMS by executing a program installed in the memory and in accordance with a global sliding mode control with fractional order terms (GSMCFO) method,
wherein the program comprises a definition set customized for the HMS and to be referred in applying the GSMCFO method to the HMS,
wherein the definition set comprises: a characteristic element $c_i$ to be measured; and equations defining a desired value $c_i^*$ of the characteristic element $c_i$, a fractional order sliding mode (FOSM) surface $\zeta_i$ of the characteristic element $c_i$, and a control law element $u_i^{cnt}$ of the characteristic element $c_i$,
wherein the controller is further configured to
monitor the characteristic element $c_i(t)$ and a related status of the HMS,
calculate at least one of the equations defined in the definition set based on the characteristic element $c_i(t)$ monitored and the related status of the HMS monitored, and
control the HMS based on the control law element $u_i^{cnt}(t)$ calculated, and in accordance with the GSMCFO,
wherein the equation defining the FOSM surface $\zeta_i(t)$ for the characteristic element $c_i(t)$ comprises a fractional time integral of a tracking error $e_i(t)$ and a fractional time derivative of the tracking error $e_i(t)$, wherein the tracking error $e_i(t)$ for the characteristic element $c_i(t)$ is defined as, $$e_i(t) = c_i(t) - c_i^*(t), \quad (61)$$

wherein the equation defining the control law element $u_i^{cnt}(t)$ is configured to satisfy a condition $$\zeta_i(t)\frac{d\zeta_i(t)}{dt} < 0, \quad (62)$$

so far as $\zeta_i(t)$ is not zero.

16. The controller of claim 15, wherein the definition set further comprises: a minimum value $SOC^{min}$ and a maximum value $SOC^{max}$ of the state of charge (SOC) of the rechargeable battery; and equations defining a power imbalance $\Delta P$ and a power balance condition of the HMS, given respectively as $$\Delta P = P_{re} + P_{ug} - P_{dem} - P_b, \quad (63)$$

$$\Delta P = 0, \quad (64)$$

wherein $P_{re}$ represents a total power generated by the renewable energy source, $P_{ug}$, a grid power exchanged between the utility grid and the PCC, $P_{dem}$, a load demand, $P_b$, a battery power exchanged between the rechargeable battery and the DC-link,
and wherein the controller is further configured to
monitor elements required to calculate a power imbalance $\Delta P$ and a SOC,
calculate the power imbalance $\Delta P$ with the equation given in the definition set, and
controlling the battery power $P_b$ and the grid power $P_{ug}$ to satisfy and maintain the power balance condition, under a restriction that the SOC of the rechargeable battery satisfies a condition, $$SOC^{min} \leq SOC \leq SOC^{max}. \quad (65)$$

17. The controller of claim 16, wherein the HMS further comprises:
a wind turbine (WT) generator further comprises a wind turbine (WT) and an electric generator further, wherein the electric generator further comprises a rotor and a stator;
a rotor side converter (RSC) configured to receive an AC power from the electric generator and output an RSC output DC current to the DC-link;
a solar photovoltaic (PV) system configured to output a PV output DC current to the DC-link; and
a bidirectional buck-boost converter (BBBC) connected between the DC-link and the rechargeable battery and configured to control a power exchanged between the rechargeable battery and the DC-link, and
wherein the definition set further comprises an equation defining an equivalent control law element $u_i^{eqv}$ for the characteristic element $c_i$, wherein the equivalent control law element $u_i^{eqv}$ comprises a maximum disturbance term ${}^R\mathcal{J}_t^{1-\mu}\delta_i$, representing a possible maximum value of a lumped external disturbances and parametric perturbations to the tracking error $e_i(t)$, wherein, ${}^R\mathcal{J}_t^{1-\mu}$ represents a Riemann-Liouville fractional integration, and $\delta_i$, a positive function,
and wherein the equation defining the control law element $u_i^{cnt}(t)$ comprises a function $SG(\zeta_i(t))$ given by a signum function $sgn(\zeta_i(t))$ or one of its smooth approximations including $$\tanh\left(\frac{\zeta_i(t)}{\theta}\right),$$

wherein, $\theta(>0)$,
and wherein the characteristic element $c_1$ is an angular frequency $\omega_r$ of the WT, and the characteristic element $c_2$ is a d-axis stator current $I_{ds}$,
wherein the desired value $\omega_r^*$ for the angular frequency $\omega_r$ of the WT is defined as, $$c_1^*(t) = \omega_r^* = \frac{\lambda^* V_w}{R}, \quad (66)$$

wherein $\lambda^*$ denotes a desired tip speed ratio, giving a maximum power coefficient for the turbine with a blade radius R, at a wind speed $V_w$, and wherein, the desired value $I_{ds}^*$ for the d-axis stator current $I_{ds}$ of the rotor is given as, $$c_2^*(t) = I_{ds}^* = 0 \quad (67)$$

and wherein the equations defining the FOSM surfaces $\zeta_i(t)$ for the characteristic elements $c_i$ (i=1, 2) are given as, $$\zeta_1(t) = k_1 \, {}^R\mathcal{J}_t^\mu e_1(t) + \sigma_1 \, {}^R\mathcal{D}_t^{1-\mu} e_1(t) + {}^R\mathcal{D}_t^{2-\mu} e_1(t), \quad (68)$$

$$\zeta_2(t) = k_2 \, {}^R\mathcal{J}_t^\mu e_2(t) + {}^R\mathcal{D}_t^{1-\mu} e_2(t), \quad (69)$$

wherein, $0 < \mu < 1$, $k_1$, $k_2$, and $\sigma_i$ are positive constants, ${}^R\mathcal{J}_t^\mu$ denotes a Riemann-Liouville fractional integration, ${}^R\mathcal{D}_t^{1-\mu}$ and ${}^R\mathcal{D}_t^{2-\mu}$ denote Riemann-Liouville fractional derivations, and wherein the equivalent control law element $u_1^{eqv}(t)$ and the control law element $u_1^{cnt}(t)$ of the angular frequency $\omega_r$ are given by q-axis stator voltages $V_{qs}^{eqv}(t)$ and $V_{qs}^{cnt}(t)$, and defined respectively as, $$u_1^{eqv}(t) = V_{qs}^{eqv}(t) = \quad (70)$$
$$-\frac{1}{a}\left(k_1 e_1(t)\sigma_1 \dot{e}_1(t) + {}^R\mathcal{J}_t^{1-\mu}\delta_1 - \ddot{\omega}_r^* + a[L_q\omega_r I_{ds} + R_s I_{qs} + \lambda_r\omega_r]\right),$$

$$u_1^{cnt}(t) = \quad (71)$$
$$V_{qs}^{cnt}(t) = V_{qs}^{eqv}(t) - \frac{1}{a}\left[\varrho_1 \, {}^R\mathcal{J}_t^{1-\mu} SG(\zeta_1(t))|\zeta_1(t)|^\alpha + \gamma_1 \, {}^R\mathcal{J}_t^{1-\mu}\zeta_1(t)\right],$$

and wherein the equivalent control law element $u_2^{eqv}(t)$ and the control law element $u_2^{cnt}(t)$ of the d-axis stator current $I_{ds}$ of the rotor are given by d-axis stator voltages $V_{ds}^{eqv}(t)$ and $V_{ds}^{cnt}(t)$, and defined respectively as, $$u_2^{eqv}(t) = V_{ds}^{eqv}(t) = -L_d \left( k_2 e_2(t) + \frac{[L_q\omega_r I_{qs} - R_s I_{ds}]}{L_d} + {}^R\mathcal{J}_t^{1-\mu}\delta_2 - \dot{I}_{ds}^* \right), \quad (72)$$

$$u_2^{cnt}(t) = \quad (73)$$
$$V_{ds}^{cnt}(t) = V_{ds}^{eqv}(t) - L_d\left[\varrho_2 \, {}^R\mathcal{J}_t^{1-\mu} SG(\zeta_2(t))|\zeta_2(t)|^\alpha + \gamma_2 \, {}^R\mathcal{J}_t^{1-\mu}\zeta_2(t)\right],$$

wherein, $\alpha$ is given by, $$a = \frac{3P^2 \Lambda_r}{2JL_q}, \quad (74)$$

wherein P denotes a number of pole pairs of the rotor, $\Lambda_r$, a rotor flux, J, an inertia of mechanical shaft of the wind turbine generator, $L_q$, a q-axis self-inductance of the stator, Rs, a stator resistance, $I_{qs}$, a q-axis stator current, $\Lambda_r$, a rotor flux, $L_d$, a d-axis self-inductance of the stator, ${}^R\mathcal{J}_t^{1-\mu}\delta_1$ and ${}^R\mathcal{J}_t^{1-\mu}\delta_2$ represent the maximum disturbance terms, $\alpha \in (0, 1)$, $\varrho_i$ and $\gamma_i$ (i =1, 2) are positive constants.

18. The controller of claim 17, wherein the DC-link further comprises a DC-bus and a DC-link capacitor, and wherein the characteristic element $c_3$ is a DC-link voltage $V_{dc}$, the desired value $V_{dc}^*$ defined for the DC-link voltage $V_{dc}$ is given as $$c_3^*(t) = V_{dc}^* = \begin{cases} V_{pv}^{MPPT} & ; \text{when } V_{dc}^{min} \le V_{pv}^{MPPT} \le V_{dc}^{max}, \\ V_{dc}^{nom} & ; \text{when } V_{pv}^{MPPT} < V_{dc}^{min}, \text{ or } V_{pv}^{MPPT} > V_{dc}^{max}, \end{cases} \quad (75)$$

wherein, $V_{pv}^{MPPT}$ represents an output voltage of the PV system under a maximum power point tracking (MPPT) operation, $V_{dc}^{min}$, $V_{dc}^{max}$ and $V_{dc}^{nom}$ represent a minimum allowable value, a 10 maximum allowable value, and a nominal value of the DC-link voltages, each predetermined respectively, the equation defining the FOSM surfaces $\zeta_3(t)$ of the DC-link voltage is given as, $$\zeta_3(t) = k_3 \, {}^R\mathcal{J}_t^\mu e_3(t) + {}^R\mathcal{D}_t^{1-\mu} e_3, \quad (76)$$

wherein, $\mu \in (0, 1)$ and $k_3$ are positive constants, ${}^R\mathcal{J}_t^{1-\mu}$ denotes a Riemann-Liouville fractional integration, ${}^R\mathcal{D}_t^{1-\mu}$ denotes a Riemann-Liouville fractional derivation, and wherein the equations defining the equivalent control law element $u_3^{eqv}(t)$ and the control law element $u_3^{cnt}(t)$ of the DC-link voltage $V_{dc}$ are given by d-axis AC output currents $I_d^{eqv}(t)$ and $I_d^{cnt}(t)$ from the GSC, and defined respectively as, $$u_3^{eqv}(t) = I_d^{eqv}(t) = \frac{2}{3}\frac{C_{dc}V_{dc}}{V_d}\left( \begin{array}{c} k_3 e_3(t) + \frac{P_w}{C_{dc}V_{dc}} + \frac{I_{pv}}{C_{dc}} \\ + \frac{(1-D)}{c_{dc}}I_b + {}^R\mathcal{J}_t^{1-\mu}\delta_3 - \dot{V}_{dc}^*(t) \end{array} \right), \quad (77)$$

$$u_3^{cnt}(t) = \quad (78)$$
$$I_d^{cnt}(t) = I_d^{eqv}(t) + \frac{2}{3}\frac{C_{dc}V_{dc}}{V_d}\left[\varrho_3 \, {}^R\mathcal{J}_t^{1-\mu} SG(\zeta_3(t))|\zeta_3(t)|^\alpha + \gamma_3 \, {}^R\mathcal{J}_t^{1-\mu}\zeta_3(t)\right],$$

wherein, $C_{dc}$ denotes a capacitance of the DC-link capacitor, $V_d$, a voltage of the AC output from the GSC, $P_w$, an output power from the RSC, $I_{pv}$, an output current from the PV system, D, a duty cycle ratio of the BBBC, $I_b$, a battery output current, ${}^R\mathcal{J}_t^{1-\mu}\delta_3$ is the maximum disturbance term, $\alpha \in (0, 1)$, $\varrho_3$ and $\gamma_3$ are positive constants.

19. The controller of claim 17, wherein the GSC is further configured to output an AC output to a point of common coupling (PCC) via a grid side filter, and wherein the characteristic elements $c_i(t)$(i=4, 5) are a d-axis AC current $I_d$(i=4) of the AC output from the GSC, and a q-axis AC current $I_q$(I=5) of the AC output from the GSC for, respectively, the desired values defined for the d-axis AC current and the q-axis AC current are given respectively as, $$c_4^*(t) = I_d^* = I_d = \frac{2}{3}\frac{P_{dem} - P_{ug}}{V_d}, \quad (79)$$

$$c_5^*(t) = I_q^* = 0, \quad (80)$$

wherein $P_{dem}$ and $P_{ug}$ represent a power demand at the load and a power exchanged between the PCC and the utility grid, respectively, wherein $P_{ug}>0$, when provided from the utility grid to the PCC, $P_{ug}<0$, when provided from the GSC to the utility grid, $V_d$, a d-axis AC voltage of the AC output from the GSC, the equations defining the FOSM surfaces $\zeta_i(t)$ for the d-axis AC current $I_d$(i=4) and the q-axis AC current $I_q$(i=5) are given respectively as, $$\zeta_4(t) = k_4{}^R\mathcal{J}_t^\mu e_4(t) + {}^R\mathcal{D}_r^{1-\mu} e_4(t), \quad (81)$$

$$\zeta_5(t) = k_5{}^R\mathcal{J}_t^\mu e_5(t) + {}^R\mathcal{D}_r^{1-\mu} e_5(t), \quad (82)$$

wherein, $\mu \in (0, 1)$, $k_4$, and $k_5$ are positive constants, ${}^R\mathcal{J}_t^\mu$ and ${}^R\mathcal{D}_t^{1-\mu}$ each denotes a Riemann-Liouville fractional integration and a Riemann-Liouville fractional derivation, respectively, and wherein the equations defining the equivalent control law element $u_4^{eqv}(t)$ and the control law element $u_4^{cnt}(t)$ of the d-axis AC current $I_d$ are given by d-axis AC voltages $V_d^{eqv}(t)$ and $V_d^{cnt}(t)$ of the AC output from the GSC, and defined respectively as, $$u_4^{eqv}(t) = \quad (83)$$

$$V_d^{eqv}(t) = -L_f\left(k_4 e_4(t) - \dot{I}_d^* - \frac{1}{L_f}\left[R_f I_d + U_d - L_f \omega_g I_q - {}^R\mathcal{J}_t^{1-\mu}\delta_4\right]\right),$$

$$u_4^{cnt}(t) = \quad (84)$$

$$V_d^{cnt}(t) = V_d^{eqv}(t) - L_f\left[\varrho_4{}^R\mathcal{J}_t^{1-\mu} SW(\zeta_4(t))|\zeta_4(t)|^\alpha + \gamma_4{}^R\mathcal{J}_t^{1-\mu}\zeta_4(t)\right],$$

and wherein the equations defining the equivalent control law element $u_5^{eqv}(t)$ and the control law element $u_5^{cnt}(t)$ of the q-axis AC current $I_q$ are given by q-axis AC voltages $V_q^{eqv}(t)$ and $V_q^{cnt}(t)$ of the AC output from the GSC, and defined respectively as, $$u_5^{eqv}(t) = \quad (85)$$

$$V_q^{eqv}(t) = -L_f\left(k_5 e_5(t) - \dot{I}_q^* - \frac{1}{L_f}\left[R_f I_q + U_q + L_f \omega_g I_d - {}^R\mathcal{J}_t^{1-\mu}\delta_5\right]\right),$$

$$u_5^{cnt}(t) = \quad (86)$$

$$V_q^{cnt}(t) = V_q^{eqv}(t) - L_f\left[\varrho_5{}^R\mathcal{J}_t^{1-\mu} SG(\zeta_5(t))|\zeta_5(t)|^\alpha + \gamma_5{}^R\mathcal{J}_t^{1-\mu}\zeta_5(t)\right],$$

wherein $L_f$ and $R_f$ denote a grid side filter inductance and a grid side filter resistance, respectively, $U_d$ and $U_q$, a d-axis and a q-axis voltages at a point of common coupling (PCC), respectively, $\omega_g$, an electrical angular frequency of the AC output from the GSC, ${}^R\mathcal{J}_t^{1-\mu}\delta_i$, (i=4, 5) are the maximum disturbance terms, $\alpha \in (0, 1)$, $\varrho_i$ and $\gamma_i$(i=4, 5) are positive constants.

20. The controller of claim 17, wherein the BBBC is configured to facilitate charging of the rechargeable battery while operating as a buck converter, and to facilitate discharging to the DC-link while operating as a boost converter, and wherein:

the characteristic element $c_i$(i=6) is a battery current $I_b$, the desired value $I_b^*$ defined for the battery current $I_b$ is given as, $$c_6^*(t) = I_b^* = \frac{P_b}{V_b} = \frac{P_{re} + P_{ug} - P_{dem}}{V_b}, \quad (87)$$

wherein $P_{re}$ represents a sum of powers generated by the renewable energy sources, $P_{ug}$, a power supplied by the utility grid, $P_{dem}$, a load demand, and $V_b$, a battery voltage, the equation defining the FOSM surfaces $\zeta_6(t)$ of the battery current is given as, $$\zeta_6(t) = k_6{}^R\mathcal{J}_t^{1-\mu} e_6 + {}^R\mathcal{D}_t^{1-\mu} e_6, \quad (88)$$

wherein, $\mu \in (0, 1)$ and $k_6$ are positive constants, ${}^R\mathcal{J}_t^{1-\mu}$ denotes a Riemann-Liouville fractional integration, ${}^R\mathcal{D}_t^{1-\mu}$ denotes a Riemann-Liouville fractional derivation, and wherein the equations defining the equivalent control law element $u_6^{eqv}(t)$ and the control law element $u_6^{cnt}(t)$ of the battery current $I_b$ are given by duty cycles $D^{eqv}(t)$ and $D^{cnt}(t)$ of the BBBC, and defined respectively as, $$u_6^{eqv}(t) = D^{eqv}(t) = \frac{L_b}{V_{dc}}\left(k_6 e_6(t) + \frac{V_b}{L_b} - \frac{I_b R_b}{L_b} + {}^R\mathcal{J}_t^{1-\mu}\delta_6 - \dot{I}_b^*\right), \quad (89)$$

$$u_6^{cnt}(t) = \quad (90)$$

$$D^{cnt}(t) = D^{eqv}(t) - L_b\left[\varrho_6{}^R\mathcal{J}_t^{1-\mu} SG(\zeta_6(t))|\zeta_6(t)|^\alpha + \gamma_6{}^R\mathcal{J}_t^{1-\mu}\zeta_6(t)\right],$$

wherein, $L_b$ denotes a battery inductance, $R_b$, a battery resistance, $V_{dc}$, a DC-link voltage, ${}^R\mathcal{J}_t^{1-\mu}\delta_6$ represents the maximum disturbance term, $\delta_6$, $\alpha \in (0, 1)$, $\varrho_6$ and $\gamma_6$ are positive constants.

\* \* \* \* \*